US011312851B2

(12) United States Patent
Kim et al.

(10) Patent No.: US 11,312,851 B2
(45) Date of Patent: Apr. 26, 2022

(54) FABRICATING IONIC/POLYIMTDE MEMBRANES

(71) Applicant: The Board Of Regents Of The Nevada System Of Higher Education On Behalf Of The University of Nevada, Las Vegas, Las Vegas, NV (US)

(72) Inventors: Kwang Jin Kim, Henderson, NV (US); Dong-Chan Lee, Henderson, NV (US); Jungsoo Nam, Las Vegas, NV (US); Tae Seon Hwang, Las Vegas, NV (US)

(73) Assignee: THE BOARD OF REGENTS OF THE NEVADA SYSTEM OF HIGHER EDUCATION ON BEHALF OF THE UNIVERSITY OF NEVADA, LAS VEGAS, Las Vegas, NV (US)

( * ) Notice: Subject to any disclaimer, the term of this patent is extended or adjusted under 35 U.S.C. 154(b) by 452 days.

(21) Appl. No.: 16/322,051

(22) PCT Filed: Jul. 31, 2017

(86) PCT No.: PCT/US2017/044667
§ 371 (c)(1),
(2) Date: Jan. 30, 2019

(87) PCT Pub. No.: WO2018/026708
PCT Pub. Date: Feb. 8, 2018

(65) Prior Publication Data
US 2019/0169416 A1    Jun. 6, 2019

Related U.S. Application Data

(60) Provisional application No. 62/371,622, filed on Aug. 5, 2016.

(51) Int. Cl.
| | |
|---|---|
| *C08L 27/22* | (2006.01) |
| *B01D 53/22* | (2006.01) |
| *B01D 67/00* | (2006.01) |
| *B01D 69/02* | (2006.01) |
| *B01D 71/36* | (2006.01) |
| *B01D 71/64* | (2006.01) |
| *C08J 5/22* | (2006.01) |
| *C08L 79/08* | (2006.01) |
| *B01D 71/32* | (2006.01) |

(52) U.S. Cl.
CPC .............. *C08L 27/22* (2013.01); *B01D 53/22* (2013.01); *B01D 67/009* (2013.01); *B01D 67/0088* (2013.01); *B01D 67/0093* (2013.01); *B01D 69/02* (2013.01); *B01D 71/36* (2013.01); *B01D 71/64* (2013.01); *C08J 5/225* (2013.01); *C08J 5/2268* (2013.01); *C08J 5/2281* (2013.01); *C08J 5/2293* (2013.01); *C08L 79/08* (2013.01); *B01D 53/228* (2013.01); *B01D 67/0086* (2013.01); *B01D 71/32* (2013.01); *B01D 2325/14* (2013.01); *B01D 2325/42* (2013.01); *C08J 2327/18* (2013.01); *C08J 2327/22* (2013.01); *C08J 2379/08* (2013.01); *C08J 2427/18* (2013.01); *C08J 2479/08* (2013.01); *C08L 2203/20* (2013.01)

(58) Field of Classification Search
CPC ...... C08L 27/22; C08L 79/08; C08L 2203/20; B01D 53/22; B01D 67/0088; B01D 67/009; B01D 67/0093; B01D 69/02; B01D 71/36; B01D 71/64; B01D 52/228; B01D 67/0086; B01D 71/32; B01D 2325/14; B01D 2325/42; C08J 5/225; C08J 5/2268; C08J 5/2281; C08J 5/2293; C08J 2327/18; C08J 2327/22; C08J 2379/08; C08J 2427/18; C08J 2479/08
USPC .......................................................... 427/508
See application file for complete search history.

(56) References Cited

U.S. PATENT DOCUMENTS

| | | | |
|---|---|---|---|
| 4,405,550 A * | 9/1983 | Hungerford | ................ C08J 5/18 264/216 |
| 8,057,952 B2 | 11/2011 | Jung et al. | |
| 2005/0031925 A1* | 2/2005 | Ofer | ..................... H01M 8/1039 429/431 |
| 2007/0231588 A1 | 10/2007 | Kanakarajan et al. | |
| 2014/0120431 A1 | 5/2014 | Roelofs et al. | |

FOREIGN PATENT DOCUMENTS

| | | |
|---|---|---|
| CN | 20178054011.X | 3/2019 |
| EP | 17837468.2 | 3/2019 |
| JP | 2005336475 | 12/2005 |

(Continued)

OTHER PUBLICATIONS

Woo et al., "Synthesis and characterization of sulfonated polyimide membranes for direct methanol fuel cell", Journal of Membrane Science, 2003, vol. 220, pp. 31-45. (Year: 2003).*

(Continued)

*Primary Examiner* — Ling Siu Choi
*Assistant Examiner* — Ronald Grinsted
(74) *Attorney, Agent, or Firm* — Ballard Spahr LLP

(57) ABSTRACT

Disclosed are polyimide blends and methods of making and using same. The disclosed polyimide blends are prepared by first blending an ionic polymer and a poly(amic acid) to form a poly(amic acid) precursor, followed by cyclization. This abstract is intended as a scanning tool for purposes of searching in the particular art and is not intended to be limiting of the present invention.

41 Claims, 14 Drawing Sheets

(56) References Cited

FOREIGN PATENT DOCUMENTS

| JP | 2005350658 A | 12/2005 |
|---|---|---|
| JP | 2007035315 | 2/2007 |
| JP | 2007227385 | 9/2007 |
| WO | PCT/US2017/044667 | 7/2017 |

OTHER PUBLICATIONS

U.S. Appl. No. 62/371,622, filed Aug. 5, 2016, Kwang Jin Kim (Univ. Nevada, Las.
Ajayan, P.M. and Tour, J.M., Materials Science: Nanotube Composites. Nature. 2007; 447(7148):1066-8.
Bashaiwoldu, A.B. et al., Application of Dynamic Mechanical Analysis (DMA) to Determine the Mechanical Properties of Pellets. Int J Pharm. 2004; 269(2):329-42.
Chen, Q. et al., Identification of the Testing Parameters in High Frequency Dynamic Shear Measurement on Agarose Gels. J Biomech. 2005; 38(4):959-63.
Giannelis, E.P., Polymer Layered Silicate Nanocomposites. Adv Mater. 1996; 8:29-35.
Hickner, M.A. et al., Alternative Polymer Systems for Proton Exchange Membranes (PEMs). Chem Rev. 2004; 104(10):4587-612.
Hwang, T. et al., A New Ionic Polymer-Metal Composite based on Nafion/Poly(Vinyl Alcohol-co-ethylene) Blends. Smart Mater Struct. 2015; 24:105011 (8 pages).
Jeon, T.I. et al., Optical and Electrical Properties of Preferentially Anisotropic Single-Walled Carbon-Nanotube Films in Terahertz Region. J Appl Phys. 2004; 95(10):5736-40.
Jo, C. et al., Recent Advances in Ionic Polymer-Metal Composite Actuators and Their Modeling and Applications. Progress in Polymer Sci. 2013; 38(7):1037-66.
Jung, K. et al., A Self-Sensing Dielectric Elastomer Actuator. Sens Actuators A Phys. 2008; 143(2):343-51.
Jung, K. et al., Investigations on Actuation Characteristics of IPMC Artificial Muscle Actuator. Sens Actuators A Phys. 2003; 107(2):183-92.
Kim, D. and Kim, K.J., Palladium Buffer-Layered High Performance Ionic Polymer-Metal Composites. Smart Mater Struct. 2008; 17:035011 (6 pages).
Kim, D. et al., Electro-Chemical Operation of Ionic Polymer-Metal Composites. Sens Actuators B Chem. 2011; 155(1):106-13.
Kim, J.H. et al., Fabrication and Electrochemical Properties of Carbon Nanotube Film Electrodes. Carbon. 2006; 44:1963-8.
Kim, K.J. and Shahinpoor, M., A Novel Method of manufacturing Three-Dimensional Ionic Polymer-Metal Composites (IPMCs) Biomemtic Sensors, Actuators and Artificial Muscles. Polymer. 2002; 43:797-802.
Kim, S.J. et al., A Bio-Inspired Multi Degree of Freedom Actuator Based on a Novel Cylindrical Ionic Polymer-Metal Composite Material. Robot Auton Syst. 2014; 62:53-60.
Kim, S.J. et al., Enhancement of the Electromechanical Behavior of IPMCs Based on Shitosan/Polyaniline Ion Exchange membranes Fabricated by Freeze-Drying. Smart Mater Struct. 2005; 14:889-94.
Kotov, N.A., Materials Science: Carbon Sheet Solutions. Nature. 2006; 442:254-5.
Krishen, K., Space Applications for Ionic Polymer-Metal Composite Sensors, Actuators, and Artificial Muscles. Acta Astronautica. 2009; 64(11-12):1160-6.
Kumar, A. et al., 1H NMR and FT-IR Dataset based Structural Investigation of Poly(Amic Acid)s and Polyimides froom 4,4'-Diaminostilbene. Data in Brief. 2016; 7:123-8.
Laporta, M. et al., Perfluorosulfonated Membrane (Nation): Ft-IR Study of the State of Water with Increasing Humidity. Phys Chem Chem Phys. 1999; 19:4619-28.
Lee, J.H et al., Water Uptake and Migration Effects of Electroactive Ion-Exchange Polymer metal Composite (IPMC) Actuator. Sens Actuators A. 2005; 118(1):98-106.
Lee, S. and Kim, K.J., Design of IPMC Actuator-Driven Valve-less Micropump and Its Flow Rate Estimation at Low Reynolds Numbers. Smart Mater Struct. 2006; 15(4):1103-9.
Lee, S. et al., Equivalent Modeling for Ionic Polymer-Metal Composite Actuators Based on Beam Theories. Smart Mater Struct. 2005; 14(6):1363-8.
Liu, Z. and Calvert, P., Multilayer Hydrogels as Muscle-Like Actuators. Adv Mater. 2000; 12(4):288-91.
Lu, J. et al., A Biomemetic Actuator Based on an Ionic Networking Membrane of Poly(Styrene-alt-maleinide)-Incorporated Poly(Vinylidene Fluoride). Adv Func Mater. 2008; 18(8):1290-8.
Palmre, V. et al., An IPMC-Enabled Bio-Inspired Bending/Twisting Fin for Underwater Applications. Smart Mater Struct. 2013; 22:014003 (11 pages).
Palmre, V. et al., Nanothorn Electrodes for Ionic Polymer-Metal Composite Artificial Muscles. Scientific Reports. 2014; 4:6176 (10 pages).
Park, S. et al. (2011) Blend Membranes for Ionic Polymer-Metal Composite Actuators. SPE Plastics Res Online DOI: 10.1002/spepro.003706 (2 pages).
Pelrine, R. et al., High-Speed Electrically Actuates Elastomer with Strain Greater Than 100%. Science. 2000; 287:836-9.
Shahinpoor, M. and Kim, K.J., Ionic Polymer-Metal Composites: I. Fundamentals. Smart Mater Struct. 2001; 10:819-33.
Shahinpoor, M. and Kim, K.J., Ionic Polymer-Metal Composites: IV. Industrial and Medical Applications. Smart Mater Struct. 2005; 14:197-214.
Shahinpoor, M. and Kim, K.J., The Effect of Surface-Electrode Resistance on the Performance of Ionic Polymer-Metal Composite (IPMC) Artificial Muscles. Smart Mater Struct. 2000; 9(4):543-51.
Shahinpoor, M., Conceptual Design, Kinematices and Dynamics of Swimming Robotic Structures Using Ionic Polymeric Gel Muscles. Smart Mater Struct. 1992; 1:91-4.
Shen, Q. et al., A Biomimetic Underwater Vehicle Actuated by Waves with Ionic Polymer-Metal Composite Soft Sensors. Bioinspir Biomim. 2015; 10(5):055007.
Shiga, T. et al., Bending of Ionic Polymer Gel Caused by Swelling Under Sinusoidally Varying Electric Fields. J Appl Polym Sci. 1993; 47:113-9.
Terasawa, N. et al., High-Performance Polymer Actuators Based on Poly(Ethylene Oxide) and Single-Walled Carbon Nanotube-Ionic Liquid-Based Gels. Sens Actuators B Chem. 2014; 202:382-7.
Xie, Z. et al., Dynamic Mechanical Properties of Aged Filled Rubbers. J Macromol Sci B. 2004; 43(4):805-17.
Woo et al., Synthesis and Characterization of Sulfonated Polyimide Membranes for Direct Methanol Fuel Cell. J Membrane Sci. 2003; 220:31-45.
International Search Report dated Oct. 18, 2017 by the International Searching Authority for Patent Application No. PCT/US2017/044667, which was filed on Jul. 31, 2017 and published as WO 2018/026708 on Feb. 8, 2018 (Inventor—Kim et al.; Applicant—Board of Regents of the Nevada System of Higher Education on Behalf of the University of Nevada, Las Vegas; (9 pages).
International Preliminary Report on Patentability dated Feb. 5, 2019 by the International Searching Authority for Patent Application No. PCT/US2017/044667, which was filed on Jul. 31, 2017 and published as WO 2018/026708 on Feb. 8, 2018 (Inventor—Kim et al.; Applicant—Board of Regents of the Nevada System of Higher Education on Behalf of the University of Nevada, Las Vegas; (8 pages).

* cited by examiner

FABRICATING IONIC/POLYIMIDE MEMBRANES

CROSS-REFERENCE TO RELATED APPLICATIONS

This Application is a national stage filing under 35 U.S.C. § 371 of International Application No. PCT/US2017/044667, filed on Jul. 31, 2017, which claims the benefit of U.S. Provisional Application No. 62/371,622, filed on Aug. 5, 2016, the contents of which are incorporated herein by reference in their entireties.

STATEMENT REGARDING FEDERALLY SPONSORED RESEARCH

This invention was made with Government support under Grant No. NNX13AN15a, awarded by the National Aeronautics and Space Administration (NASA). The Government has certain rights in the invention.

BACKGROUND

Ionic polymer-metal composite (IPMC) is a synthetic composite that typically consists of an ionomeric membrane (ion exchange membrane) plated with thin layers of noble metal electrode, such as platinum on both sides (Kim et al. (2014) *Robotics and Autonomous Systems* 62: 53-60). IPMC is a unique active (smart) material which is a type of electroactive polymer (EAP). There are many types of EAPs such as ionic polymer gel (Terasawa et al. (2014) *Sensors and Actuators B* 202: 382-387; Liu and Calvert (2000) *Adv. Mater.* 12: 288-291; Shiga et al. (1993) *Journal of Applied Polymer Science* 47: 113-291; Shahinpoor (1992) *Smart Mater. Struct.* 1: 91-94), dielectric elastomer (Jung et al. (2008) *Sensors and Actuators A* 143: 343-351; Pelrine et al. (2000) *Science* 287: 836-839), carbon nanotube films (Jeon et al. (2004) *Journal of Applied Physics* 95: 5736-5740; Kim et al. (2006) *Carbon* 44: 1963-1968), ionic polymer-metal composites (IPMCs) (Shahinpoor and Kim (2001) *Smart Mater. Struct.* 10: 819-833; Lee et al. (2005) *Smart Mater. Struct.* 14: 1363-1368; Kim and Kim (2008) *Smart Mater. Struct.* 17: 035011), etc. Among these EAPs, IPMCs have drawn enormous research interest over the past decades due to its flexibility since they use polymers as base materials, require low operating voltage (less than 5V), high strain rate, and have the ability to operate in water (Kim et al. (2014) *Robotics and Autonomous Systems* 62: 53-60; Kim et al. (2011) *Sensors and Actuators B* 155: 106-113). These properties make the IPMC an attractive research subject for use in underwater robotic applications (Shen et al. (2015) *Bioinspir. Biomim.* 10: 055007; Palmre et al. (2013) *Smart Mater. Struct.* 22: 014003), fluid flow sensor applications (Lee and Kim (2006) *Smart Mater. Struct.* 15: 1103-1109), biomedical and biomimetic application such as artificial muscles (Lu et al. (2008) *Adv. Func. Mater.* 18: 1290-1298; Shahinpoor and Kim (2005) *Smart Mater. Struct.* 14: 197-214; Jung et al. (2003) *Sensors and Actuators A* 107: 183-192), space utilization (Krishen (2009) *Acta Astronautica* 64: 1160-1166, and more.

An ion exchange membrane is a fundamental base material for IPMC fabrication and an essential component that largely influences the performance of IPMCs. Among numerous commercially available ion exchange membranes, Nafion® has been and still is the most widely used ion exchange membrane material for IPMCs (Kim et al. (2014) *Robotics and Autonomous Systems* 62: 53-60; Kim et al. (2011) *Sensors and Actuators B* 155: 106-113; Kim and Shahinpoor (2002) *Polymer* 43: 797-802; Lee et al. (2005) *Sensors and Actuators A* 118: 98-106; Hwang et al. (2015) *Smart Mater. Struct.* 24: 105011) owing to its advantages such as high proton conductivity, commercial availability, and good chemical stability (Ju et al. (2013) *Progress in Polymer Science* 38: 1037-1066; Palmre et al. (2014) *Scientific Reports* 4: 6176). Although Nafion-based IPMC actuators show good performance under low operating voltage, there are some drawbacks of Nafion that restrict its applications: reduced performance above 80° C., high cost, and low storage modulus (Hickner et al. (2004) *Chem. Rev.* 104: 4587-4612; Park et al. (2011) *SPE Plastics Research Online* DOI: 10.1002/spepro.003706). Many attempts have been done to lower the manufacturing cost by replacing Nafion (Hwang et al. (2015) *Smart Mater. Struct.* 24: 105011; Kim et al. (2005) *Smart Mater. Struct.* 14: 889-894), but they have only been partially successful. In addition, there have been some studies done with nanoparticles, such as layered silicates or carbon nanotubes, which can dramatically improve thermal stability and mechanical performance compared to Nafion-based IPMC actuators (Ajayan and Tour (2007) *Nature* 447: 254-255; Kotov (2006) *Nature* 442: 254-255; Giannelis (1996) *Adv. Mater.* 8: 29-35). It is still imperative to continue to explore new ionic polymers with improved properties to be used in high performance IPMC actuators.

Despite the excellent electromechanical performance of Nafion, the high cost and physical properties of IPMC actuators prepared using Nafion leave much to be desired. Thus, there remains a need for ionic polymer-based IPMCs having improved thermal and mechanical properties. These needs and others are met by the present invention.

SUMMARY

In accordance with the purpose(s) of the invention, as embodied and broadly described herein, the invention, in one aspect, relates to blend ion exchange membranes comprising an ionic polymer and a poly(amic acid) and their uses.

Disclosed are methods of making a polyimide blend, the method comprising: (a) mixing an ionic polymer selected from a perfluorinated ionomer membrane, a poly(acrylic acid) salt, sulfonated polystyrene, sulfonated poly(arylene ether sulfone), sulfonated poly(arylene thioether sulfone), cross-linked poly(styrene-ran-ethylene), sulfonated poly(styrene-b-ethylene-co-butylene-b-styrene), poly(fluoroalkyl methyacrylate-co-acrylic acid), poly(fluoroalkyl methacrylate-co-2-acylamido-2-methyl-1-propanesulfonic acid), poly(fluoroalkyl methacrylate-co-sulfonic acid), poly(fluoroalkyl methacrylate-co-sulfonic acid-co-2-hydroxyethyl methacrylate), poly(vinylidene-g-sulfonated N-ethylenecarbazole), poly(vinylidene fluoride-co-hexafluoropropylene), poly(ethylene-co-tetrafluoroethylene), and Nafion, and a poly(amic acid) comprising at least one residue having a structure represented by a formula selected from:

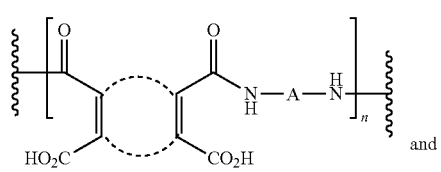

and

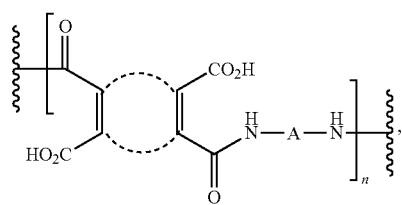
wherein
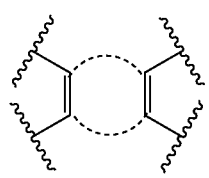
comprises a structure represented by a formula selected from:
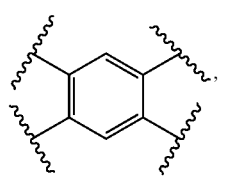 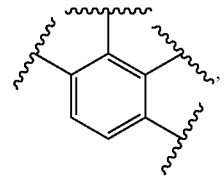
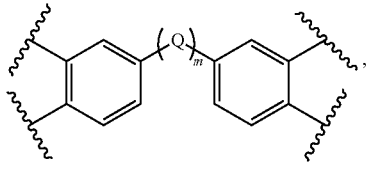
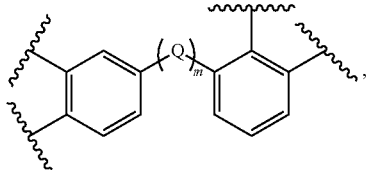
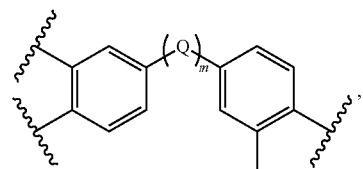
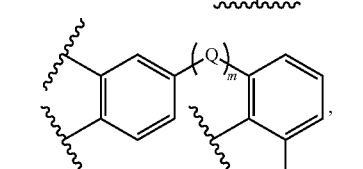
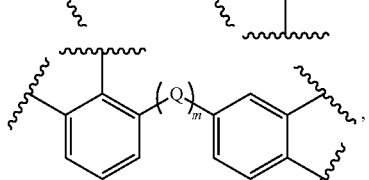
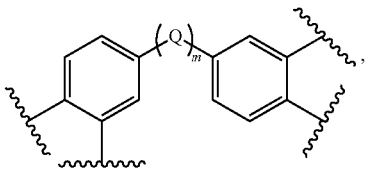
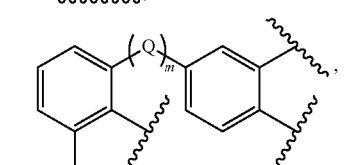
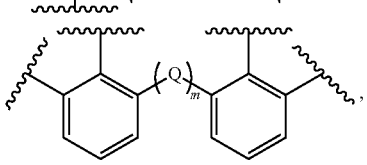
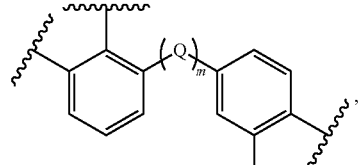
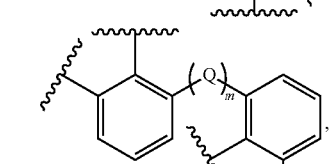
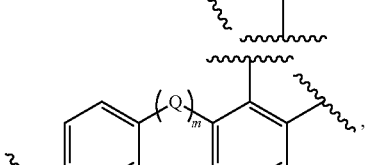
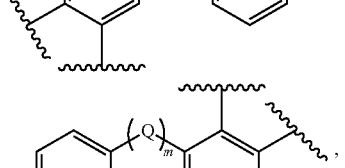
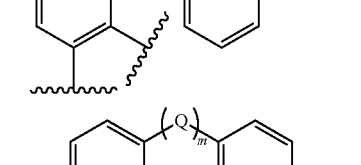
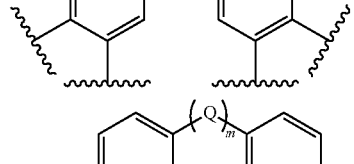
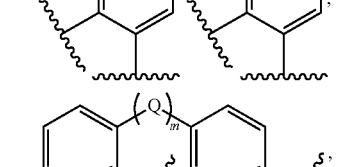

-continued
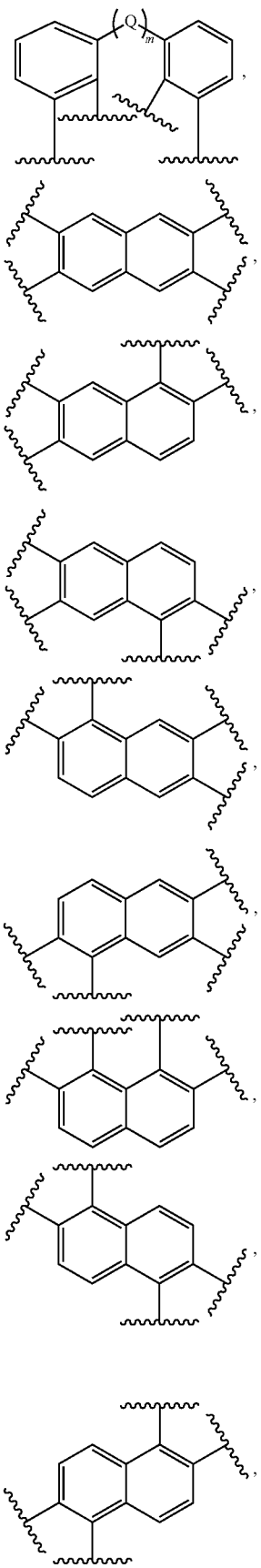
-continued
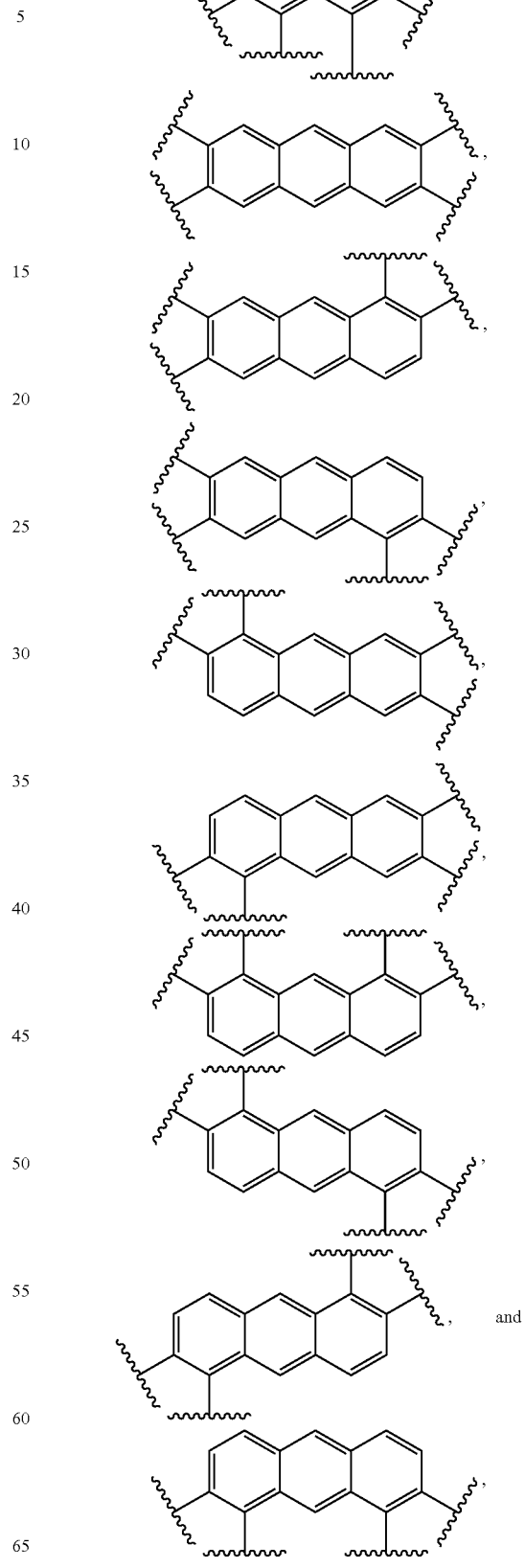
and wherein n is an integer greater than 1; wherein m is 0 or 1; wherein A is selected from —Ar¹— and a structure represented by a formula:

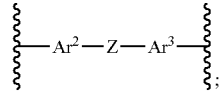

wherein Z, when present, is selected from O, $NR^3$, $CR^{4a}R^{4b}$, CO, and $SO_2$; wherein each of $R^3$, $R^{4a}$, and $R^{4b}$, when present, is independently selected from hydrogen, C1-C4 alkyl, and C1-C4 haloalkyl; wherein $Ar^1$, when present, is selected from aryl, 5-membered heteroaryl, and 6-membered heteroaryl and substituted with 0, 1, 2, or 3 groups independently selected from halogen, —OH, —CN, —$NH_2$, C1-C4 alkyl, C1-C4 haloalkyl, and C1-C4 alkoxy; wherein each of $Ar^2$ and $Ar^3$, when present, is independently selected from aryl, 5-membered heteroaryl, and 6-membered heteroaryl and substituted with 0, 1, 2, or 3 groups independently selected from halogen, —OH, —CN, —$NH_2$, C1-C4 alkyl, C1-C4 haloalkyl, and C1-C4 alkoxy; wherein Q, when present, is selected from O, $NR^1$, SO, $SO_2$, C(O), and $CR^{2a}R^{2b}$; and wherein each of $R^1$, $R^{2a}$, and $R^{2b}$, when present, is independently selected from hydrogen, C1-C4 alkyl, and C1-C4 haloalkyl, thereby making a poly(amic acid) blend; and (b) cyclizing the poly(amic acid) blend.

Also disclosed are poly(amic acid) blends comprising: (a) an ionic polymer selected from a perfluorinated ionomer membrane, a poly(acrylic acid) salt, sulfonated polystyrene, sulfonated poly(arylene ether sulfone), sulfonated poly(arylene thioether sulfone), cross-linked poly(styrene-ran-ethylene), sulfonated poly(styrene-b-ethylene-co-butylene-b-styrene), poly(fluoroalkyl methyacrylate-co-acrylic acid), poly(fluoroalkyl methacrylate-co-2-acylamido-2-methyl-1-propanesulfonic acid), poly(fluoroalkyl methacrylate-co-sulfonic acid), poly(fluoroalkyl methacrylate-co-sulfonic acid-co-2-hydroxyethyl methacrylate), poly(vinylidene-g-sulfonated N-ethylenecarbazole), poly(vinylidene fluoride-co-hexafluoropropylene), poly(ethylene-co-tetrafluoroethylene), and Nafion; and (b) a poly(amic acid) comprising at least one residue having a structure represented by a formula selected from:

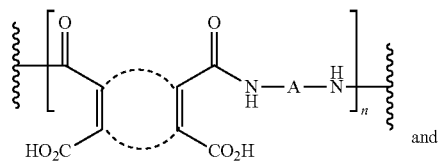

and

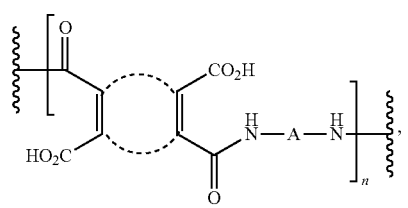

wherein

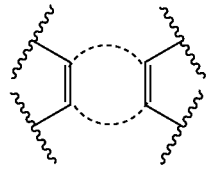

comprises a structure represented by a formula selected from:

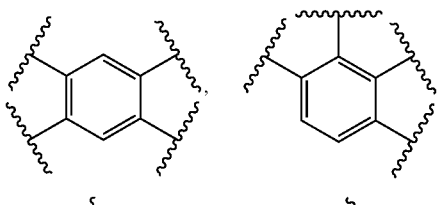

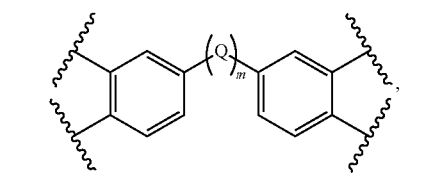

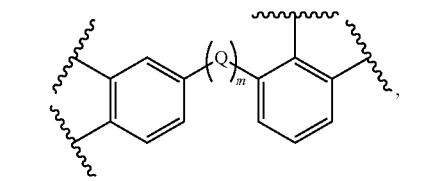

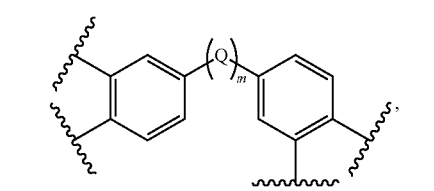

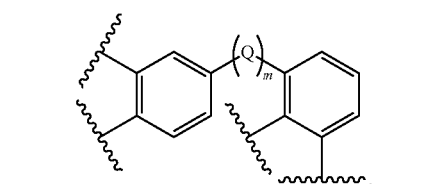

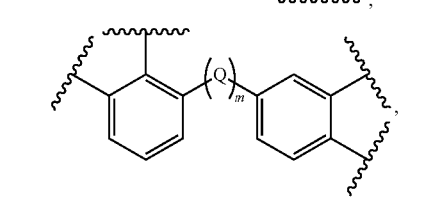

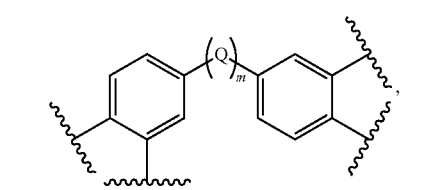

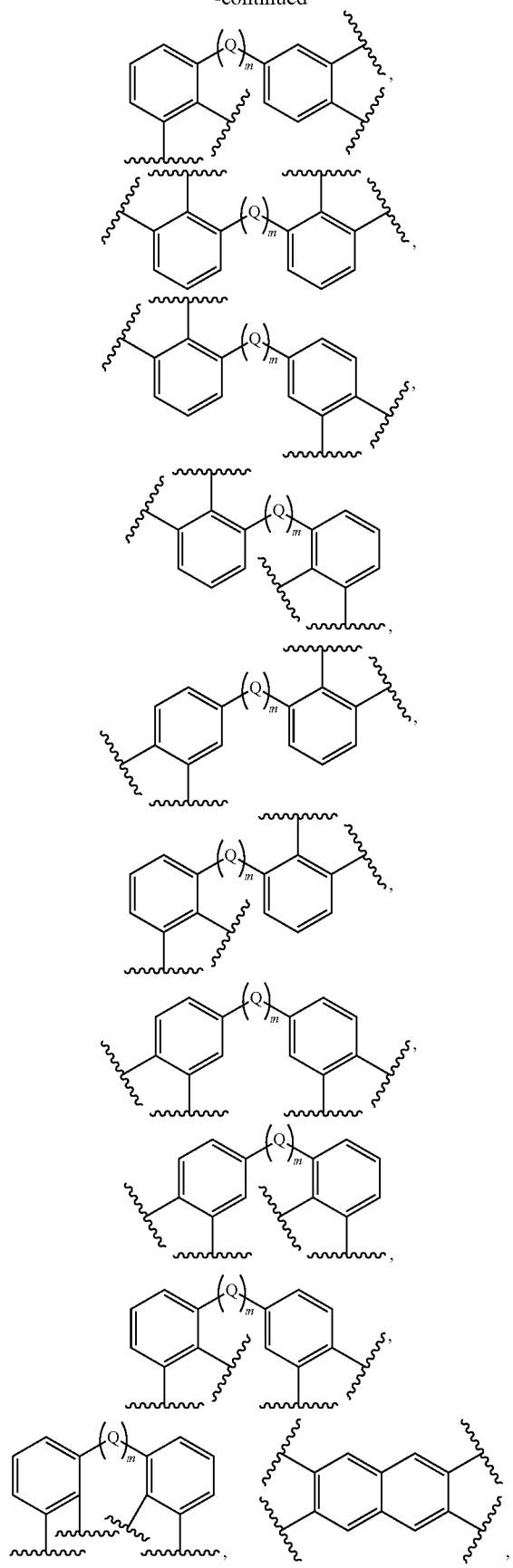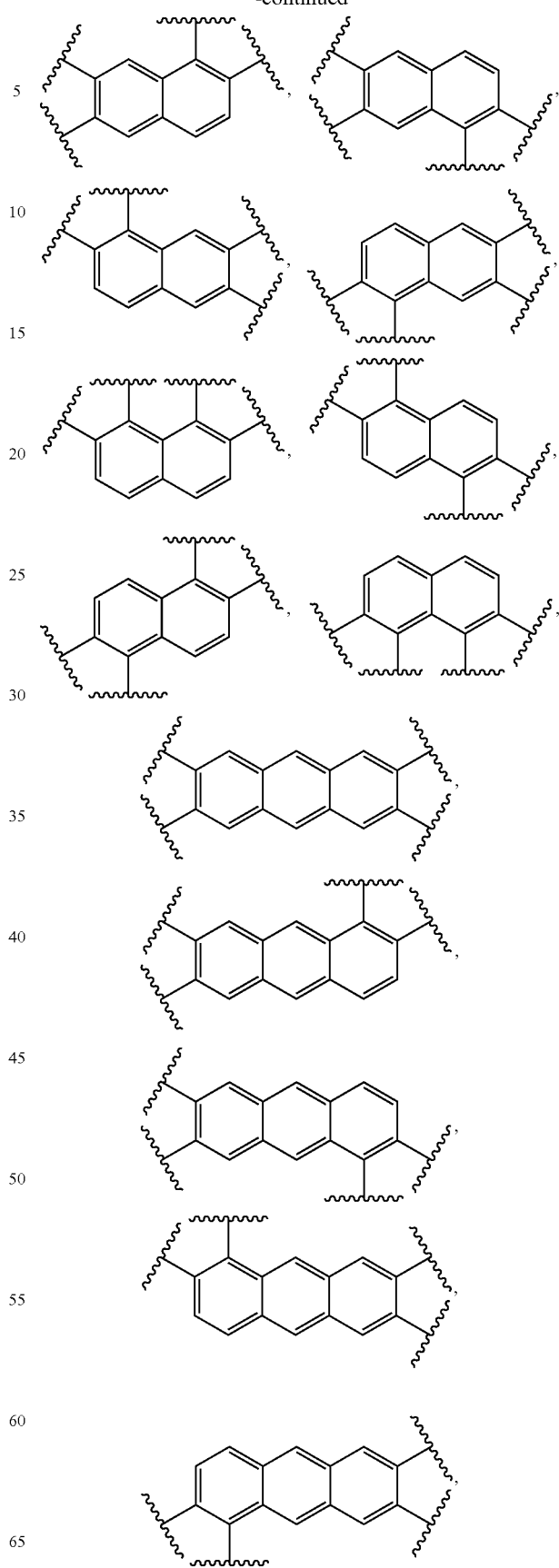

-continued

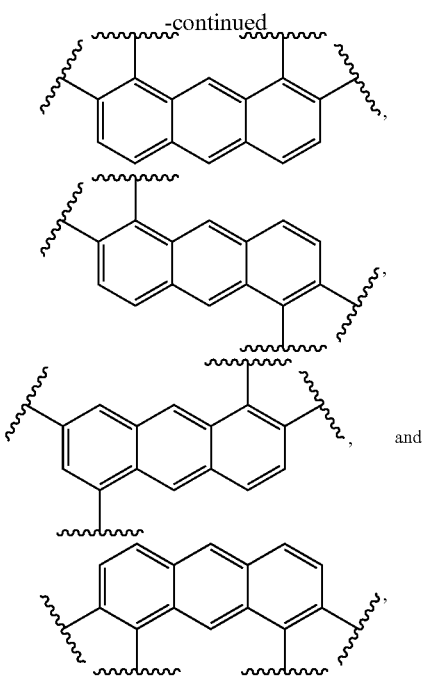

wherein n is an integer greater than 1; wherein m is 0 or 1; wherein A is selected from —Ar$^1$— and a structure represented by a formula:

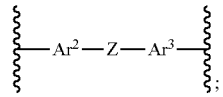

wherein Z, when present, is selected from O, NR$^3$, CR$^{4a}$R$^{4b}$, CO, and SO$_2$; each of R$^3$, R$^{4a}$, and R$^{4b}$, when present, is independently selected from hydrogen, C1-C4 alkyl, and C1-C4 haloalkyl; wherein Ar$^1$, when present, is selected from aryl, 5-membered heteroaryl, and 6-membered heteroaryl and substituted with 0, 1, 2, or 3 groups independently selected from halogen, —OH, —CN, —NH$_2$, C1-C4 alkyl, C1-C4 haloalkyl, and C1-C4 alkoxy; wherein each of Ar$^2$ and Ar$^3$, when present, is independently selected from aryl, 5-membered heteroaryl, and 6-membered heteroaryl and substituted with 0, 1, 2, or 3 groups independently selected from halogen, —OH, —CN, —NH$_2$, C1-C4 alkyl, C1-C4 haloalkyl, and C1-C4 alkoxy; wherein Q, when present, is selected from O, NR$^1$, SO, SO$_2$, C(O), and CR$^{2a}$R$^{2b}$; and wherein each of R$^1$, R$^{2a}$, and R$^{2b}$, when present, is independently selected from hydrogen, C1-C4 alkyl, and C1-C4 haloalkyl.

Also disclosed are polyimide blends comprising: (a) an ionic polymer selected from a perfluorinated ionomer membrane, a poly(acrylic acid) salt, sulfonated polystyrene, sulfonated poly(arylene ether sulfone), sulfonated poly(arylene thioether sulfone), cross-linked poly(styrene-ran-ethylene), sulfonated poly(styrene-b-ethylene-co-butylene-b-styrene), poly(fluoroalkyl methyacrylate-co-acrylic acid), poly(fluoroalkyl methacrylate-co-2-acylamido-2-methyl-1-propanesulfonic acid), poly(fluoroalkyl methacrylate-co-sulfonic acid), poly(fluoroalkyl methacrylate-co-sulfonic acid-co-2-hydroxyethyl methacrylate), poly(vinylidene-g-sulfonated N-ethylenecarbazole), poly(vinylidene fluoride-co-hexafluoropropylene), poly(ethylene-co-tetrafluoroethylene), and Nafion; and (b) a polyimide comprising at least one residue having a structure represented by a formula:

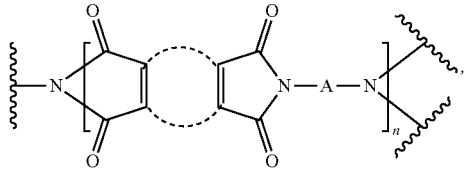

wherein

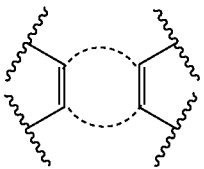

comprises a structure represented by a formula selected from:

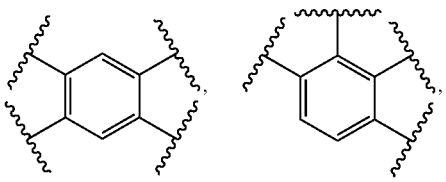

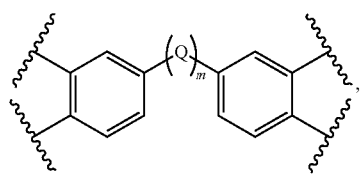

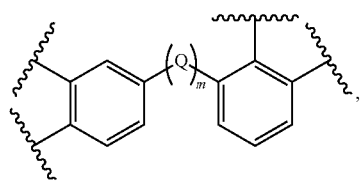

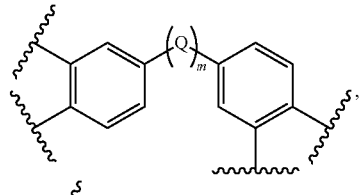

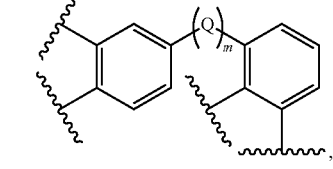

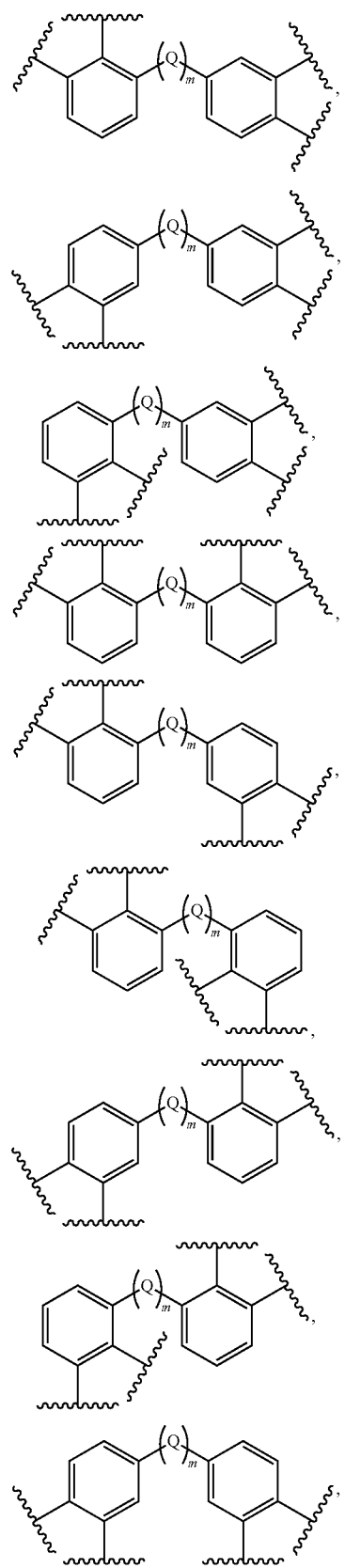
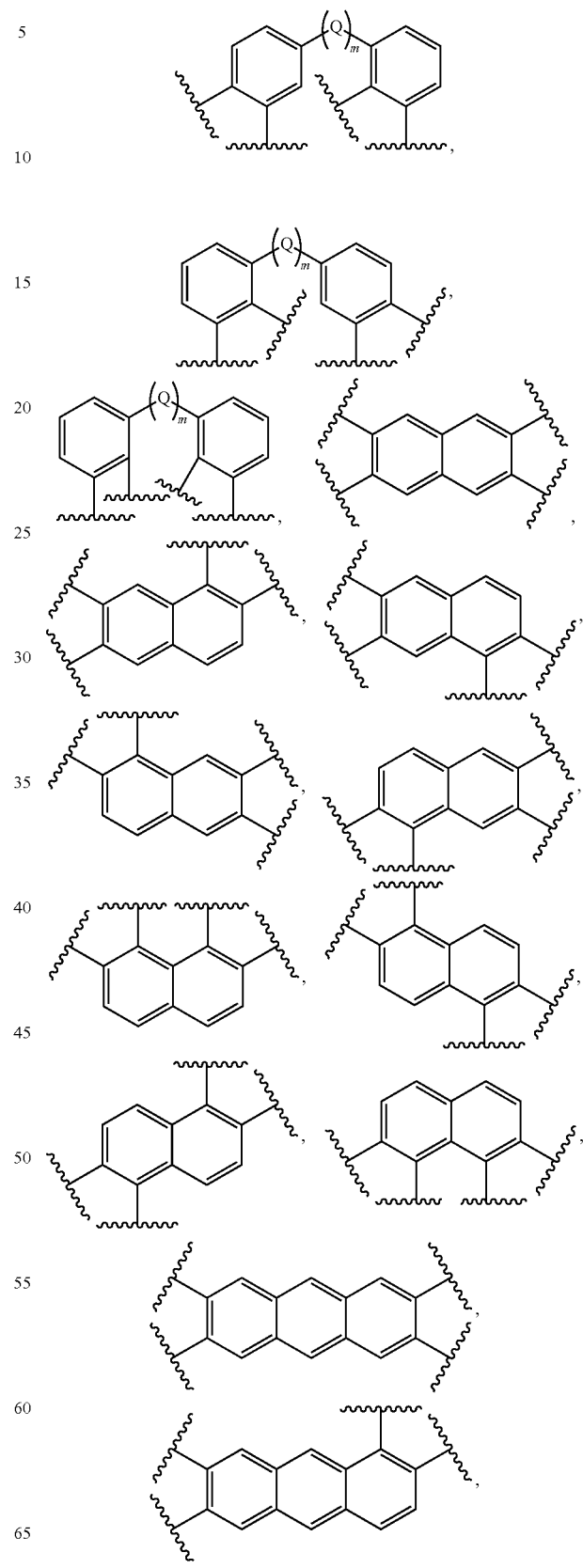

-continued

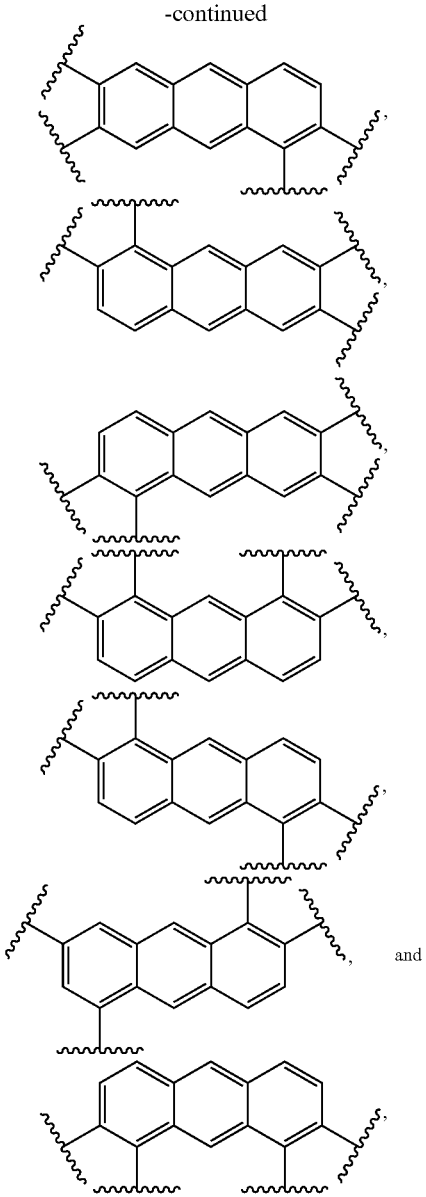

wherein n is an integer greater than 1; wherein m is 0 or 1; wherein A is selected from —Ar¹— and a structure represented by a formula:

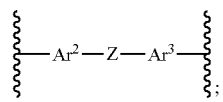

wherein Z, when present, is selected from O, $NR^3$, $CR^{4a}R^{4b}$, CO, and $SO_2$; each of $R^3$, $R^{4a}$, and $R^{4b}$, when present, is independently selected from hydrogen, C1-C4 alkyl, and C1-C4 haloalkyl; wherein $Ar^1$, when present, is selected from aryl, 5-membered heteroaryl, and 6-membered heteroaryl and substituted with 0, 1, 2, or 3 groups independently selected from halogen, —OH, —CN, —$NH_2$, C1-C4 alkyl, C1-C4 haloalkyl, and C1-C4 alkoxy; wherein each of $Ar^2$ and $Ar^3$, when present, is independently selected from aryl, 5-membered heteroaryl, and 6-membered heteroaryl and substituted with 0, 1, 2, or 3 groups independently selected from halogen, —OH, —CN, —$NH_2$, C1-C4 alkyl, C1-C4 haloalkyl, and C1-C4 alkoxy; wherein Q, when present, is selected from O, $NR^1$, SO, $SO_2$, C(O), and $CR^{2a}R^{2b}$; and wherein each of $R^1$, $R^{2a}$, and $R^{2b}$, when present, is independently selected from hydrogen, C1-C4 alkyl, and C1-C4 haloalkyl.

While aspects of the present invention can be described and claimed in a particular statutory class, such as the system statutory class, this is for convenience only and one of skill in the art will understand that each aspect of the present invention can be described and claimed in any statutory class. Unless otherwise expressly stated, it is in no way intended that any method or aspect set forth herein be construed as requiring that its steps be performed in a specific order. Accordingly, where a method claim does not specifically state in the claims or descriptions that the steps are to be limited to a specific order, it is no way intended that an order be inferred, in any respect. This holds for any possible non-express basis for interpretation, including matters of logic with respect to arrangement of steps or operational flow, plain meaning derived from grammatical organization or punctuation, or the number or type of aspects described in the specification.

BRIEF DESCRIPTION OF THE FIGURES

The accompanying figures, which are incorporated in and constitute a part of this specification, illustrate several aspects and together with the description serve to explain the principles of the invention.

FIG. 6D shows representative storage modulus, loss modulus, and tan δ of samples at 10 Hz.

FIG. 8A shows the measured voltage, current, displacement responses, and bending strain at ±3 V, AC square-wave under 0.1 Hz together with a superimposed image of video captures of NPI-18 actuator at 0.1 Hz. FIG. 8B and FIG. 8C show the measured voltage, current, displacement responses, and bending strain at +3 V, AC square wave under 0.5 Hz and 1.0 Hz, respectively.

Figure 1A:
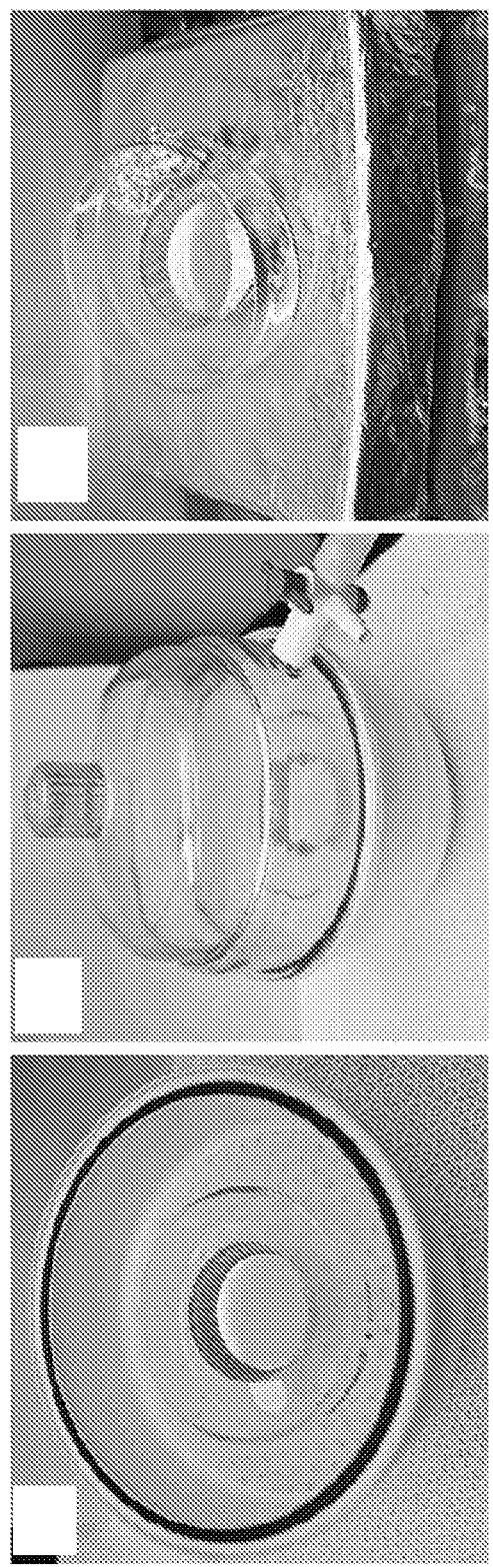
FIG. 1A shows representative images of the sample preparation procedure.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

DETAILED DESCRIPTION

The present invention can be understood more readily by reference to the following detailed description of the invention and the Examples included therein.

Before the present compounds, compositions, articles, devices, and/or methods are disclosed and described, it is to be understood that they are not limited to specific synthetic methods unless otherwise specified, or to particular reagents unless otherwise specified, as such may, of course, vary. It is also to be understood that the terminology used herein is for the purpose of describing particular aspects only and is not intended to be limiting. Although any methods and materials similar or equivalent to those described herein can be used in the practice or testing of the present invention, example methods and materials are now described.

Although any methods and materials similar or equivalent to those described herein can be used in the practice or testing of the present invention, example methods and materials are now described.

All publications mentioned herein are incorporated herein by reference to disclose and describe the methods and/or materials in connection with which the publications are cited. The publications discussed herein are provided solely for their disclosure prior to the filing date of the present application. Nothing herein is to be construed as an admission that the present invention is not entitled to antedate such publication by virtue of prior invention. Further, the dates of publication provided herein may be different from the actual publication dates, which can require independent confirmation.

A. Definitions

As used herein, nomenclature for compounds, including organic compounds, can be given using common names, IUPAC, IUBMB, or CAS recommendations for nomenclature. When one or more stereochemical features are present, Cahn-Ingold-Prelog rules for stereochemistry can be employed to designate stereochemical priority, E/Z specification, and the like. One of skill in the art can readily ascertain the structure of a compound if given a name, either by systemic reduction of the compound structure using naming conventions, or by commercially available software, such as CHEMDRAW™ (Cambridgesoft Corporation, U.S.A.).

As used in the specification and the appended claims, the singular forms "a," "an" and "the" include plural referents unless the context clearly dictates otherwise. Thus, for example, reference to "a component," "a polymer," or "a particle" includes mixtures of two or more such components, polymers, or particles, and the like.

Ranges can be expressed herein as from "about" one particular value, and/or to "about" another particular value. When such a range is expressed, another aspect includes from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that throughout the application, data is provided in a number of different formats and that this data represents endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

References in the specification and concluding claims to parts by weight of a particular element or component in a composition denotes the weight relationship between the element or component and any other elements or components in the composition or article for which a part by weight is expressed. Thus, in a compound containing 2 parts by weight of component X and 5 parts by weight component Y, X and Y are present at a weight ratio of 2:5, and are present in such ratio regardless of whether additional components are contained in the compound.

A weight percent (wt. %) of a component, unless specifically stated to the contrary, is based on the total weight of the formulation or composition in which the component is included.

As used herein, the terms "optional" or "optionally" means that the subsequently described event or circumstance may or may not occur, and that the description includes instances where said event or circumstance occurs and instances where it does not.

As used herein, the terms "effective amount" and "amount effective" refer to an amount that is sufficient to achieve the desired result or to have an effect on an undesired condition.

The term "stable," as used herein, refers to compositions that are not substantially altered when subjected to conditions to allow for their production, detection, and, in certain aspects, their recovery, purification, and use for one or more of the purposes disclosed herein.

As used herein, the term "polymer" refers to a relatively high molecular weight organic compound, natural or synthetic, whose structure can be represented by a repeated small unit, the monomer (e.g., polyethylene, rubber, cellulose). Synthetic polymers are typically formed by addition or condensation polymerization of monomers.

As used herein, the term "homopolymer" refers to a polymer formed from a single type of repeating unit (monomer residue).

As used herein, the term "copolymer" refers to a polymer formed from two or more different repeating units (monomer residues). By way of example and without limitation, a copolymer can be an alternating copolymer, a random copolymer, a block copolymer, or a graft copolymer. It is also contemplated that, in certain aspects, various block segments of a block copolymer can themselves comprise copolymers.

As used herein, the term "oligomer" refers to a relatively low molecular weight polymer in which the number of repeating units is between two and ten, for example, from two to eight, from two to six, or form two to four. In one aspect, a collection of oligomers can have an average number of repeating units of from about two to about ten, for example, from about two to about eight, from about two to about six, or form about two to about four.

As used herein, the term "cross-linked polymer" refers to a polymer having bonds linking one polymer chain to another.

The term "alkyl" as used herein is a branched or unbranched saturated hydrocarbon group of 1 to 24 carbon atoms, such as methyl, ethyl, n-propyl, isopropyl, n-butyl, isobutyl, s-butyl, t-butyl, n-pentyl, isopentyl, s-pentyl, neopentyl, hexyl, heptyl, octyl, nonyl, decyl, dodecyl, tetradecyl, hexadecyl, eicosyl, tetracosyl, and the like. The alkyl group can be cyclic or acyclic. The alkyl group can be branched or unbranched. The alkyl group can also be substituted or unsubstituted. For example, the alkyl group can be substituted with one or more groups including, but not limited to, alkyl, cycloalkyl, alkoxy, amino, ether, halide, hydroxy, nitro, silyl, sulfo-oxo, or thiol, as described herein. A "lower alkyl" group is an alkyl group containing from one to six (e.g., from one to four) carbon atoms. Non-limiting examples of alkyls include C1-18 alkyl, C1-C12 alkyl, C1-C8 alkyl, C1-C6 alkyl, C1-C3 alkyl, and C1 alkyl.

Throughout the specification "alkyl" is generally used to refer to both unsubstituted alkyl groups and substituted alkyl groups; however, substituted alkyl groups are also specifically referred to herein by identifying the specific substituent(s) on the alkyl group. For example, the term "halogenated alkyl" or "haloalkyl" specifically refers to an alkyl group that is substituted with one or more halide, e.g., fluorine, chlorine, bromine, or iodine. The term "alkoxyalkyl" specifically refers to an alkyl group that is substituted with one or more alkoxy groups, as described below. The term "alkylamino" specifically refers to an alkyl group that is substituted with one or more amino groups, as described below, and the like. When "alkyl" is used in one instance and a specific term such as "alkylalcohol" is used in another, it is not meant to imply that the term "alkyl" does not also refer to specific terms such as "alkylalcohol" and the like.

The term "alkenyl" as used herein is a hydrocarbon group of 2 to 24 carbon atoms with a structural formula containing at least one carbon-carbon double bond. The alkenyl group can be unsubstituted or substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein. Non-limiting examples of alkenyls include C2-18 alkenyl, C2-12 alkenyl, C2-8 alkenyl, C2-6 alkenyl, and C2-3 alkenyl.

The term "alkynyl" as used herein is a hydrocarbon group of 2 to 24 carbon atoms with a structural formula containing at least one carbon-carbon triple bond. The alkynyl group can be unsubstituted or substituted with one or more groups including, but not limited to, alkyl, cycloalkyl, alkoxy, alkenyl, cycloalkenyl, alkynyl, cycloalkynyl, aryl, heteroaryl, aldehyde, amino, carboxylic acid, ester, ether, halide, hydroxy, ketone, azide, nitro, silyl, sulfo-oxo, or thiol, as described herein. Non-limiting examples of alkynyls include C2-18 alkynyl, C2-12 alkynyl, C2-8 alkynyl, C2-6 alkynyl, and C2-3 alkynyl.

The terms "amine" or "amino" as used herein are represented by the formula —$NA^1A^2$, where $A^1$ and $A^2$ can be, independently, hydrogen or alkyl, cycloalkyl, alkenyl, cycloalkenyl, alkynyl, cycloalkynyl, aryl, or heteroaryl group as described herein.

The term "ester" as used herein is represented by the formula —$OC(O)A^1$ or —$C(O)OA^1$, where $A^1$ can be alkyl, cycloalkyl, alkenyl, cycloalkenyl, alkynyl, cycloalkynyl, aryl, or heteroaryl group as described herein. The term "polyester" as used herein is represented by the formula -$(A^1O(O)C-A^2-C(O)O)_a$— or -$(A^1O(O)C-A^2-OC(O))_a$—, where $A^1$ and $A^2$ can be, independently, an alkyl, cycloalkyl, alkenyl, cycloalkenyl, alkynyl, cycloalkynyl, aryl, or heteroaryl group described herein and "a" is an integer from 1 to 500. "Polyester" is used to describe a group that is produced by the reaction between a compound having at least two carboxylic acid groups with a compound having at least two hydroxyl groups.

The term "ether" as used herein is represented by the formula $A^1OA^2$, where $A^1$ and $A^2$ can be, independently, an alkyl, cycloalkyl, alkenyl, cycloalkenyl, alkynyl, cycloalkynyl, aryl, or heteroaryl group described herein. The term "polyether" as used herein is represented by the formula -$(A^1O-A^2O)_a$—, where $A^1$ and $A^2$ can be, independently, an alkyl, cycloalkyl, alkenyl, cycloalkenyl, alkynyl, cycloalkynyl, aryl, or heteroaryl group described herein and "a" is an integer of from 1 to 500. Examples of polyether groups include polyethylene oxide, polypropylene oxide, and polybutylene oxide.

The term "azide" as used herein is represented by the formula —$N_3$.

The term "thiol" as used herein is represented by the formula —SH.

Compounds described herein can contain one or more double bonds and, thus, potentially give rise to cis/trans (E/Z) isomers, as well as other conformational isomers. Unless stated to the contrary, the invention includes all such possible isomers, as well as mixtures of such isomers.

Certain materials, compounds, compositions, and components disclosed herein can be obtained commercially or readily synthesized using techniques generally known to those of skill in the art. For example, the starting materials and reagents used in preparing the disclosed compounds and compositions are either available from commercial suppliers such as Aldrich Chemical Co., (Milwaukee, Wis.), Acros Organics (Morris Plains, N.J.), Fisher Scientific (Pittsburgh, Pa.), or Sigma (St. Louis, Mo.) or are prepared by methods known to those skilled in the art following procedures set forth in references such as Fieser and Fieser's Reagents for Organic Synthesis, Volumes 1-17 (John Wiley and Sons, 1991); Rodd's Chemistry of Carbon Compounds, Volumes 1-5 and Supplemental volumes (Elsevier Science Publishers, 1989); Organic Reactions, Volumes 1-40 (John Wiley and Sons, 1991); March's Advanced Organic Chemistry, (John Wiley and Sons, 4th Edition); and Larock's Comprehensive Organic Transformations (VCH Publishers Inc., 1989).

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

Disclosed are the components to be used to prepare the compositions of the invention as well as the compositions themselves to be used within the methods disclosed herein. These and other materials are disclosed herein, and it is understood that when combinations, subsets, interactions, groups, etc. of these materials are disclosed that while specific reference of each various individual and collective combinations and permutation of these compounds may not be explicitly disclosed, each is specifically contemplated and described herein. For example, if a particular compound is disclosed and discussed and a number of modifications that can be made to a number of molecules including the compounds are discussed, specifically contemplated is each and every combination and permutation of the compound and the modifications that are possible unless specifically indicated to the contrary. Thus, if a class of molecules A, B, and C are disclosed as well as a class of molecules D, E, and F and an example of a combination molecule, A-D is disclosed, then even if each is not individually recited each is individually and collectively contemplated meaning combinations, A-E, A-F, B-D, B-E, B—F, C-D, C-E, and C-F are considered disclosed. Likewise, any subset or combination of these is also disclosed. Thus, for example, the sub-group of A-E, B—F, and C-E would be considered disclosed. This concept applies to all aspects of this application including, but not limited to, steps in methods of making and using the compositions of the invention. Thus, if there are a variety of additional steps that can be performed it is understood that each of these additional steps can be performed with any specific aspect or combination of aspects of the methods of the invention.

It is understood that the compositions disclosed herein have certain functions. Disclosed herein are certain structural requirements for performing the disclosed functions, and it is understood that there are a variety of structures that can perform the same function that are related to the disclosed structures, and that these structures will typically achieve the same result.

B. Ionic-Polymer Metal Composites (IPMCs)

Ionic electroactive polymers (EAPs) are polymers that show change in size or shape when electrical stimulation is applied. These EAPs form a composite with metal on the surface which is electrically conductive, undergoing large amounts of bending deformation while sustaining large forces when electrically stimulated. Examples of EAPs include, but are not limited to, ionic polymer gels, dielectric elastomers, carbon nanotube films, and ionic polymer-metal composites (IPMCs).

IPMCs are composed of two parts: ionic polymer membrane and metal electrode. Ionic polymer membranes such as Nafion or Flemion are electrochemically plated on the surface of the membrane with metals such as gold or platinum. When an IPMC is fabricated, it contains cations, anions, and water molecules inside. When a small voltage is applied to it (generally less than 5V), hydrated mobile ions (either cations or anions) in the ion exchange membrane move toward the anode or cathode, respectively, forming a volumetric gradient or a pressure gradient between the electrodes on both sides. This gradient is responsible for the deformation of the IPMC.

Ion exchange membranes are fundamental materials used to fabricate IPMCs and a very significant factor that largely influences the performance of IPMCs. Without wishing to be bound by theory, the term ion exchange membrane may refer to a membrane that is designed to transport ions selectively across the polymeric membrane owing to ionic groups present in the membrane. Depending on the type of ionic groups attached, there are two types of ion exchange membranes: (1) cation exchange membranes; and (2) anion exchange membranes. Cation exchange membranes contain fixed cationic groups that allow the passage of cations and block anions. Conversely, anionic exchange membranes contain fixed cationic groups that allow the passage of anions and block cations.

The most commonly used commercially available material for fabricating IPMCs is Nafion (31, 32). Nafion is a perfluorinated polymer known for its flexibility, light weight, immediate bending response, softness, low actuating voltage (<5 V), large bending deformation, commercial availability, appropriate mechanical robustness, good chemical stability, and high proton conductivity (36). Moreover, Nafion has high ion conductivity of around $0.1$ S cm$^{-1}$ in 1 M $H_2SO_4$ at 20° C. measured using a DC current pulse (37).

Here, IPMC actuators using blend ion exchange membranes comprising an ionic polymer and a polyimide are disclosed. In various aspects, these IPMC actuators may have comparable electromechanical properties to Nafion-only based actuators. In a further aspect, the disclosed IPMC actuators may have improved electromechanical properties to Nafion-only based actuators. In a still further aspect, the disclosed IPMC actuators may have comparable thermal properties to Nafion-only based actuators. In yet a further aspect, the disclosed IPMC actuators may have improved thermal properties to Nafion-only based actuators. In an even further aspect, the disclosed IPMC actuators may have comparable mechanical properties to Nafion-only based actuators. In a still further aspect, the disclosed IPMC actuators may have improved mechanical properties to Nafion-only based actuators.

C. Poly(Amic Acid) Blends

In one aspect, disclosed are poly(amic acid) blends comprising: (a) an ionic polymer selected from a perfluorinated ionomer membrane, a poly(acrylic acid) salt, sulfonated polystyrene, sulfonated poly(arylene ether sulfone), sulfonated poly(arylene thioether sulfone), cross-linked poly(styrene-ran-ethylene), sulfonated poly(styrene-b-ethylene-co-butylene-b-styrene), poly(fluoroalkyl methyacrylate-co-acrylic acid), poly(fluoroalkyl methacrylate-co-2-acylamido-2-methyl-1-propanesulfonic acid), poly(fluoroalkyl methacrylate-co-sulfonic acid), poly(fluoroalkyl methacrylate-co-sulfonic acid-co-2-hydroxyethyl methacrylate), poly(vinylidene-g-sulfonated N-ethylenecarbazole), poly(vinylidene fluoride-co-hexafluoropropylene), poly(ethylene-co-tetrafluoroethylene), and Nafion; and (b) a poly(amic acid) comprising at least one residue having a structure represented by a formula selected from:
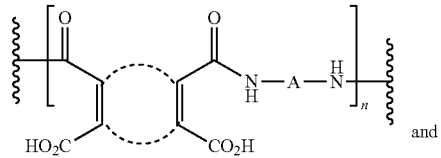
and
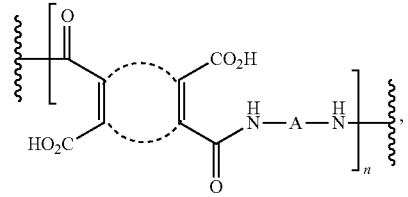
wherein
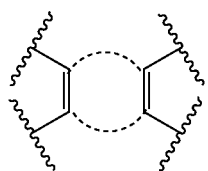
comprises a structure represented by a formula selected from:
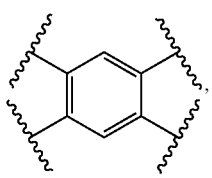 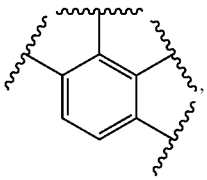
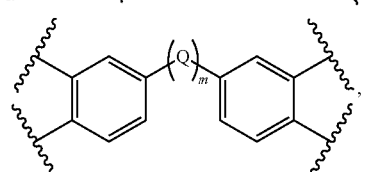,
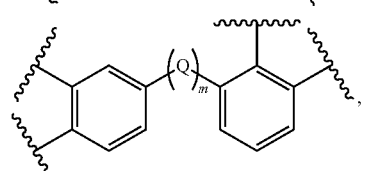,
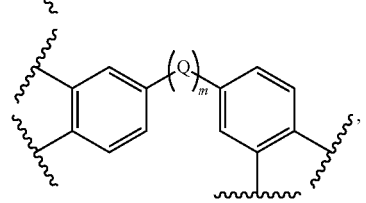,
-continued
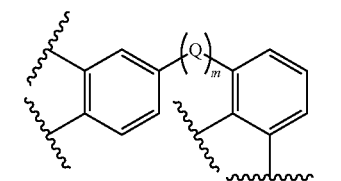,
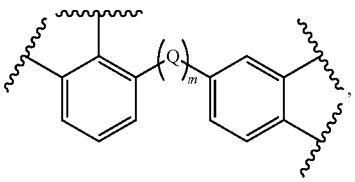,
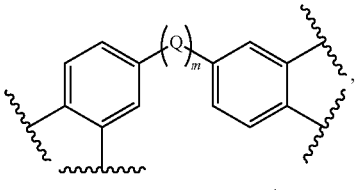,
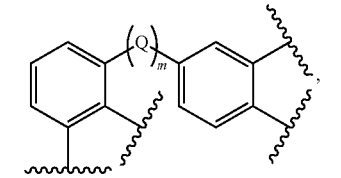,
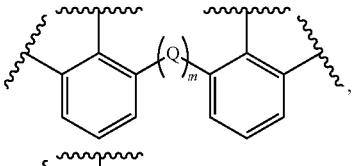,
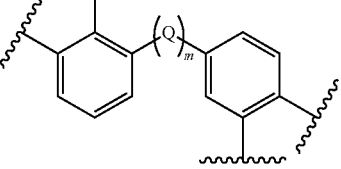,
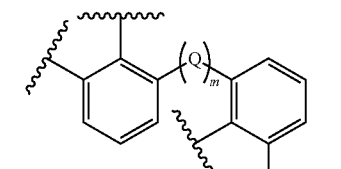,
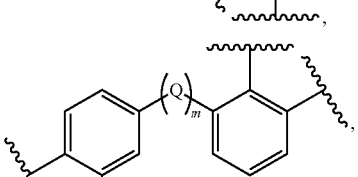,
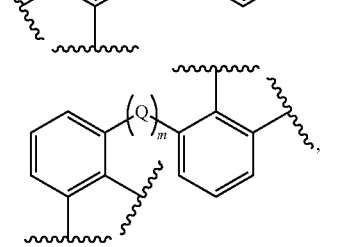,

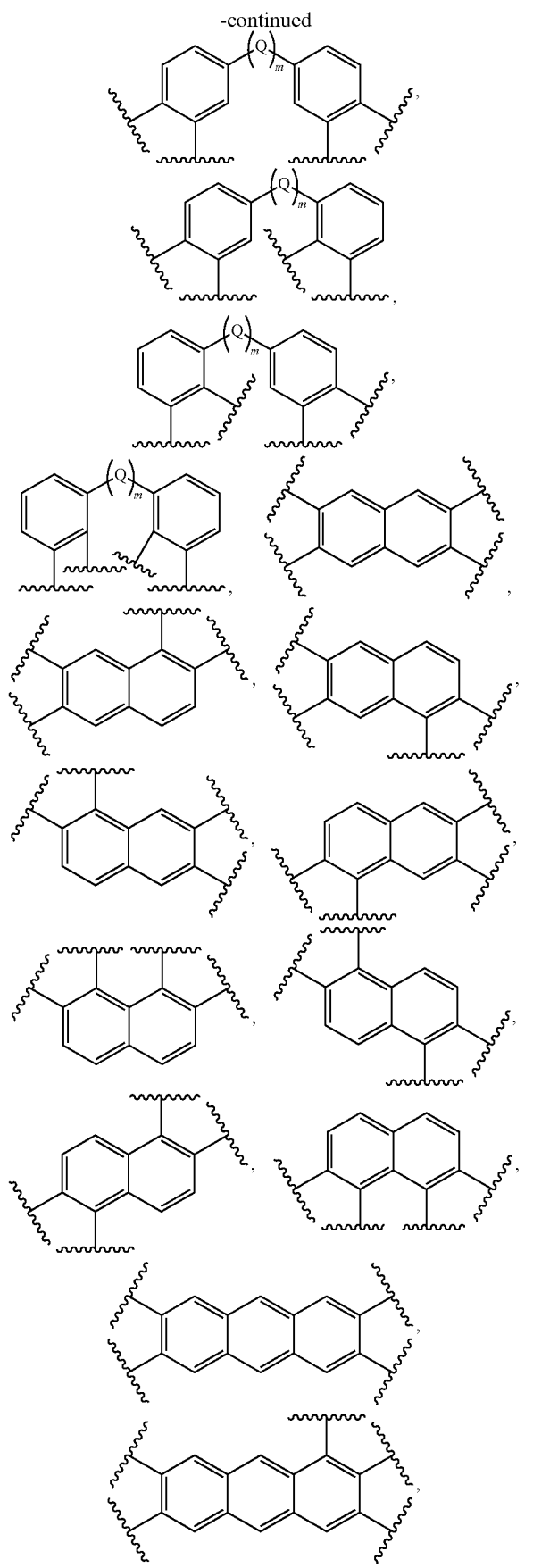
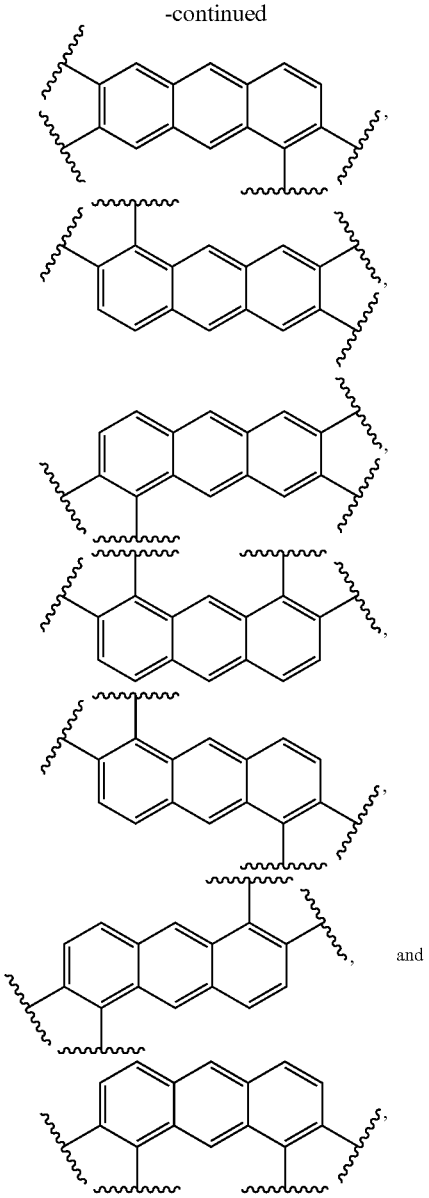

wherein n is an integer greater than 1; wherein m is 0 or 1; wherein A is selected from —Ar$^1$— and a structure represented by a formula:

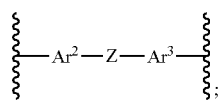

wherein Z, when present, is selected from O, NR$^3$, CR$^{4a}$R$^{4b}$, CO, and SO$_2$; each of R$^3$, R$^{4a}$, and R$^{4b}$, when present, is independently selected from hydrogen, C1-C4 alkyl, and C1-C4 haloalkyl; wherein Ar$^1$, when present, is selected from aryl, 5-membered heteroaryl, and 6-membered heteroaryl and substituted with 0, 1, 2, or 3 groups independently selected from halogen, —OH, —CN, —NH$_2$, C1-C4 alkyl, C1-C4 haloalkyl, and C1-C4 alkoxy; wherein each of Ar$^2$ and Ar$^3$, when present, is independently selected from aryl, 5-membered heteroaryl, and 6-membered heteroaryl and substituted with 0, 1, 2, or 3 groups independently selected from halogen, —OH, —CN, —NH$_2$, C1-C4 alkyl, C1-C4 haloalkyl, and C1-C4 alkoxy; wherein Q, when present, is selected from O, NR$^1$, SO, SO$_2$, C(O), and CR$^{2a}$R$^{2b}$; and wherein each of R$^1$, R$^{2a}$, and R$^{2b}$, when present, is independently selected from hydrogen, C1-C4 alkyl, and C1-C4 haloalkyl.

Due to the rigidity of polymer backbone and strong interchain interactions, most polyimides are insoluble in organic solvents and intractable in their imide forms. Therefore, to make a blend ion exchange membrane of polyimide and ionic polymer, a blend membrane of poly(amic acid) (PAA), the precursor of polyimide (PI), and ionic polymer should be prepared first. This is due to the fact that PAA is soluble in organic solvents such as, for example, N-methyl-2-pyrrolidone (NMP) while PI is not. Once a PAA/ionic polymer membranes has been prepared, the PAA can be transformed to PI, resulting in a blend membrane of PI and ionic polymer.

In a further aspect, the poly(amic acid) is present in an amount of from about 1.0 wt % to about 30 wt % of the pol(amic acid) blend. In a still further aspect, the poly(amic acid) is present in an amount of from about 1.0 wt % to about 25 wt % of the pol(amic acid) blend. In yet a further aspect, the poly(amic acid) is present in an amount of from about 1.0 wt % to about 20 wt % of the pol(amic acid) blend. In an even further aspect, the poly(amic acid) is present in an amount of from about 1.0 wt % to about 15 wt % of the pol(amic acid) blend. In a still further aspect, the poly(amic acid) is present in an amount of from about 1.0 wt % to about 10 wt % of the pol(amic acid) blend. In yet a further aspect, the poly(amic acid) is present in an amount of from about 1.0 wt % to about 5.0 wt % of the pol(amic acid) blend. In an even further aspect, the poly(amic acid) is present in an amount of from about 5.0 wt % to about 30 wt % of the pol(amic acid) blend. In a still further aspect, the poly(amic acid) is present in an amount of from about 10 wt % to about 30 wt % of the pol(amic acid) blend. In yet a further aspect, the poly(amic acid) is present in an amount of from about 15 wt % to about 30 wt % of the pol(amic acid) blend. In an even further aspect, the poly(amic acid) is present in an amount of from about 20 wt % to about 30 wt % of the pol(amic acid) blend. In a still further aspect, the poly(amic acid) is present in an amount of from about 25 wt % to about 30 wt % of the pol(amic acid) blend. In yet a further aspect, the poly(amic acid) is present in an amount of from about 5.0 wt % to about 25 wt % of the pol(amic acid) blend. In an even further aspect, the poly(amic acid) is present in an amount of from about 10 wt % to about 20 wt % of the pol(amic acid) blend. In a still further aspect, the poly(amic acid) is present in an amount of from about 15 wt % to about 20 wt % of the pol(amic acid) blend. In yet a further aspect, the poly(amic acid) is present in an amount of from about 18 wt % to about 20 wt % of the poly(amic acid) blend.

In a further aspect, the poly(amic acid) blend comprises a solvent. Examples of solvents include, but are not limited to, N,N-dimethylformamide, N,N-dimethylacetamide, N,N-diethylacetamide, N-methyl-2-pyrrolidone, N-ethyl-2-pyrrolidone, 1,3-dimethyl-2-imidazolidinone, N-methylcaprolactam, hexamethylphosphorotriamide, 1,2-dimethoxyethane, bis(2-methoxyethyl) ether, 1,2-bis(2-methoxyethoxy)ethane, tetrahydrofuran, bis[2-(2-methoxyethoxy)ethyl] ether, 1,4-dioxane, dimethylsulfoxide, dimethylsulfone, diphenyl ether, sulfolane, diphenylsulfone, tetramethylurea, and anisole. In a still further aspect, the solvent is selected from N,N-dimethylformamide and N-methyl-2-pyrrolidone.

In a further aspect, the solvent is present in amount of from about 10 volume % to about 50 volume % of the poly(amic acid) blend. In a still further aspect, the solvent is present in amount of from about 10 volume % to about 45 volume % of the poly(amic acid) blend. In yet a further aspect, the solvent is present in amount of from about 10 volume % to about 40 volume % of the poly(amic acid) blend. In an even further aspect, the solvent is present in amount of from about 10 volume % to about 35 volume % of the poly(amic acid) blend. In a still further aspect, the solvent is present in amount of from about 10 volume % to about 30 volume % of the poly(amic acid) blend. In yet a further aspect, the solvent is present in amount of from about 10 volume % to about 25 volume % of the poly(amic acid) blend. In an even further aspect, the solvent is present in amount of from about 10 volume % to about 20 volume % of the poly(amic acid) blend. In a still further aspect, the solvent is present in amount of from about 15 volume % to about 50 volume % of the poly(amic acid) blend. In yet a further aspect, the solvent is present in amount of from about 20 volume % to about 50 volume % of the poly(amic acid) blend. In an even further aspect, the solvent is present in amount of from about 25 volume % to about 50 volume % of the poly(amic acid) blend. In a still further aspect, the solvent is present in amount of from about 30 volume % to about 50 volume % of the poly(amic acid) blend. In yet a further aspect, the solvent is present in amount of from about 35 volume % to about 50 volume % of the poly(amic acid) blend. In an even further aspect, the solvent is present in amount of from about 40 volume % to about 50 volume % of the poly(amic acid) blend. In a still further aspect, the solvent is present in amount of from about 15 volume % to about 45 volume % of the poly(amic acid) blend. In yet a further aspect, the solvent is present in amount of from about 18 volume % to about 42 volume % of the poly(amic acid) blend. In an even further aspect, the solvent is present in amount of from about 20 volume % to about 40 volume % of the poly(amic acid) blend. In a still further aspect, the solvent is present in amount of from about 25 volume % to about 35 volume % of the poly(amic acid) blend.

In a further aspect, the poly(amic acid) blend further comprises a co-solvent. Examples of co-solvents include, but are not limited to, water, an alcohol, and other polar solvents.

In a further aspect, the co-solvent is present in amount of from about 50 volume % to about 90 volume % of the poly(amic acid) blend. In a still further aspect, the co-solvent is present in amount of from about 50 volume % to about 80 volume % of the poly(amic acid) blend. In yet a further aspect, the co-solvent is present in amount of from about 50 volume % to about 70 volume % of the poly(amic acid) blend. In an even further aspect, the co-solvent is present in amount of from about 50 volume % to about 60 volume % of the poly(amic acid) blend. In a still further aspect, the co-solvent is present in amount of from about 60 volume % to about 90 volume % of the poly(amic acid) blend. In yet a further aspect, the co-solvent is present in amount of from about 70 volume % to about 90 volume % of the poly(amic acid) blend. In an even further aspect, the co-solvent is present in amount of from about 80 volume % to about 90 volume % of the poly(amic acid) blend. In a still further aspect, the co-solvent is present in amount of from about 55 volume % to about 85 volume % of the poly(amic acid) blend. In yet a further aspect, the co-solvent is present in amount of from about 58 volume % to about 82 volume % of the poly(amic acid) blend. In an even further aspect, the co-solvent is present in amount of from about 60 volume % to about 80 volume % of the poly(amic acid) blend. In a still further aspect, the co-solvent is present in amount of from about 65 volume % to about 75 volume % of the poly(amic acid) blend.

1. Ionic Polymers

In one aspect, the disclosed poly(amic acid) blends comprise an ionic polymer selected from a perfluorinated ionomer membrane, a poly(acrylic acid) salt, sulfonated polystyrene, sulfonated poly(arylene ether sulfone), sulfonated poly(arylene thioether sulfone), cross-linked poly(styrene-ran-ethylene), sulfonated poly(styrene-b-ethylene-co-butylene-b-styrene), poly(fluoroalkyl methyacrylate-co-acrylic acid), poly(fluoroalkyl methacrylate-co-2-acylamido-2-methyl-1-propanesulfonic acid), poly(fluoroalkyl methacrylate-co-sulfonic acid), poly(fluoroalkyl methacrylate-co-sulfonic acid-co-2-hydroxyethyl methacrylate), poly(vinylidene-g-sulfonated N-ethylenecarbazole), poly(vinylidene fluoride-co-hexafluoropropylene), poly(ethylene-co-tetrafluoroethylene), and Nafion.

In various aspects, an ionic polymer can refer to a polymer that comprises at least one charged residue. An ionic polymer can comprise both electrically neutral residues and charged residues. For example, in a further aspect, an ionic polymer can comprise less than 99 mol % charged residues. In a still further aspect, an ionic polymer can comprise less than 90 mol % charged residues. In yet a further aspect, an ionic polymer can comprise less than 75 mol % charged residues. In an even further aspect, an ionic polymer can comprise less than 50 mol % charged residues. In a still further aspect, an ionic polymer can comprise less than 25 mol % charged residues. In yet a further aspect, an ionic polymer can comprise less than 10 mol % charged residues. In an even further aspect, an ionic polymer can comprise less than 5 mol % charged residues. In a still further aspect, an ionic polymer can comprise less than 1 mol % charged residues. In yet a further aspect, an ionic polymer can comprise less than 0.1 mol % charged residues.

Alternatively, an ionic polymer can comprise less than 99 mol % uncharged residues. In a still further aspect, an ionic polymer can comprise less than 90 mol % uncharged residues. In yet a further aspect, an ionic polymer can comprise less than 75 mol % uncharged residues. In an even further aspect, an ionic polymer can comprise less than 50 mol % uncharged residues. In a still further aspect, an ionic polymer can comprise less than 25 mol % uncharged residues. In yet a further aspect, an ionic polymer can comprise less than 10 mol % uncharged residues. In an even further aspect, an ionic polymer can comprise less than 5 mol % uncharged residues. In a still further aspect, an ionic polymer can comprise less than 1 mol % uncharged residues. In yet a further aspect, an ionic polymer can comprise less than 0.1 mol % uncharged residues.

In various aspects, an ionic polymer is selected from a polycation and a polyanion. In a further aspect, the ionic polymer is a polycation. In a still further aspect, the ionic polymer is a polyanion. In yet a further aspect, the ionic polymer can comprise both cationic and anionic repeat groups.

In various aspects, the ionic groups can be covalently attached to the polymer backbone. Alternatively, the ionic group can be incorporated into the polymer backbone.

In various aspects, the ionic polymer can have excellent thermal and mechanical properties such as, for example, highly ion-conductive, highly permeable to water, a super-acid catalyst, temperature resistance, and chemical resistance.

In a further aspect, the ionic polymer is Nafion. In a still further aspect, the ionic polymer is Flemion.

2. Poly(Amic Acids)

In one aspect, the disclosed poly(amic acid) blends comprise a poly(amic acid) comprising at least one residue having a structure represented by a formula selected from:

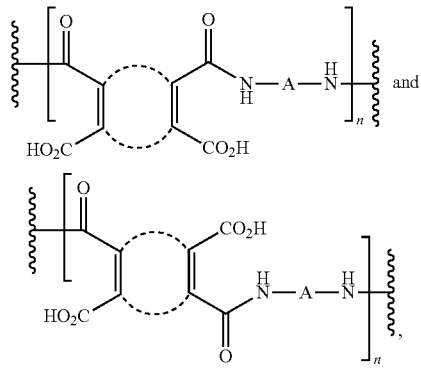

wherein

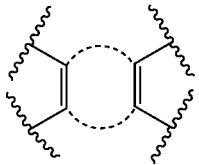

comprises a structure represented by a formula selected from:

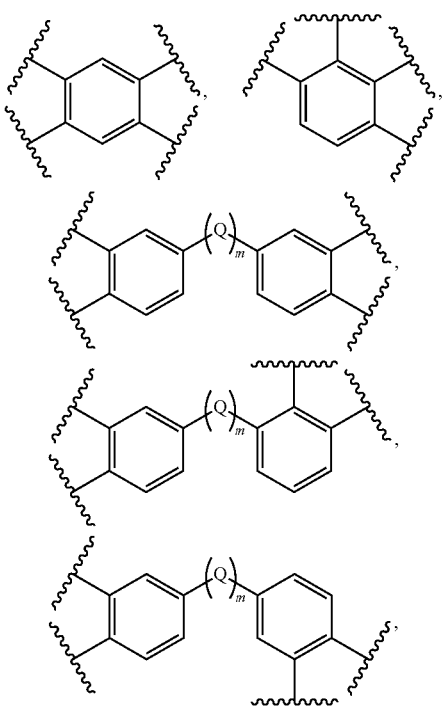

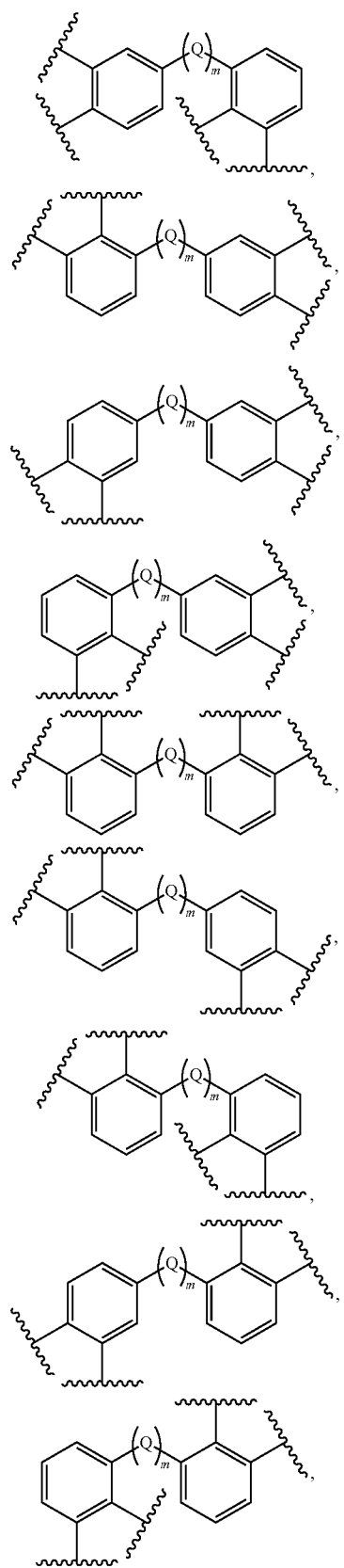
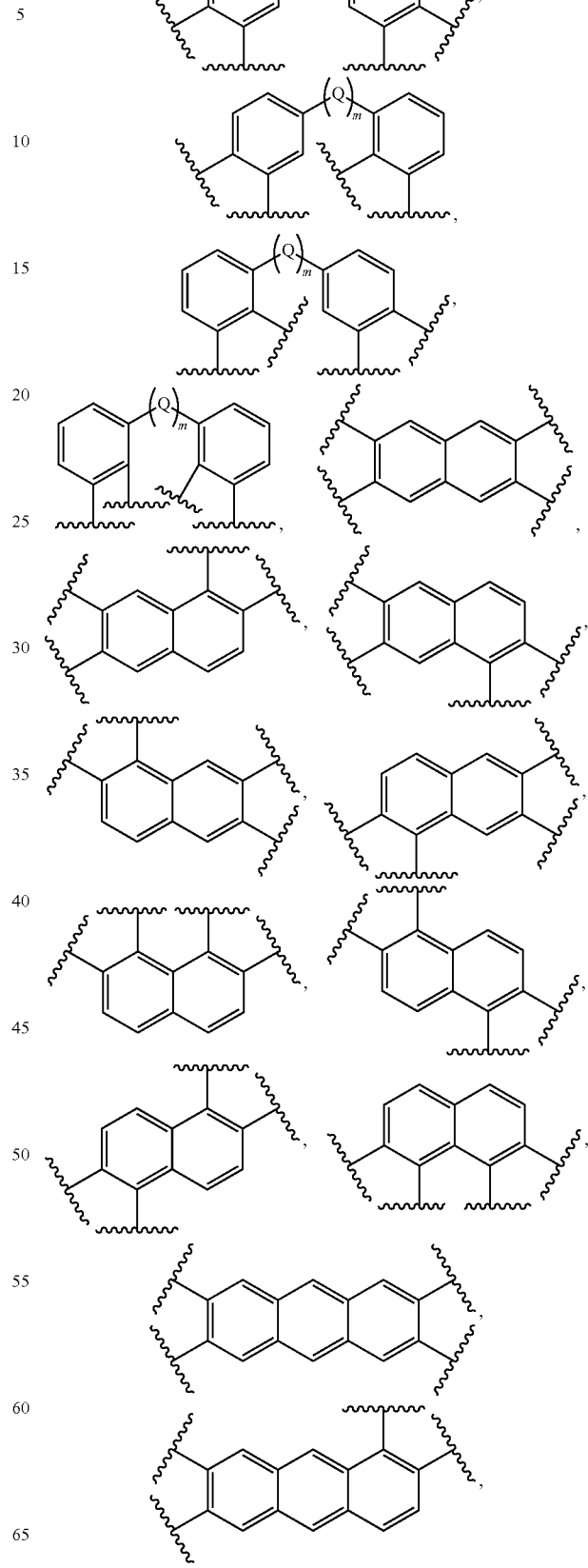

-continued

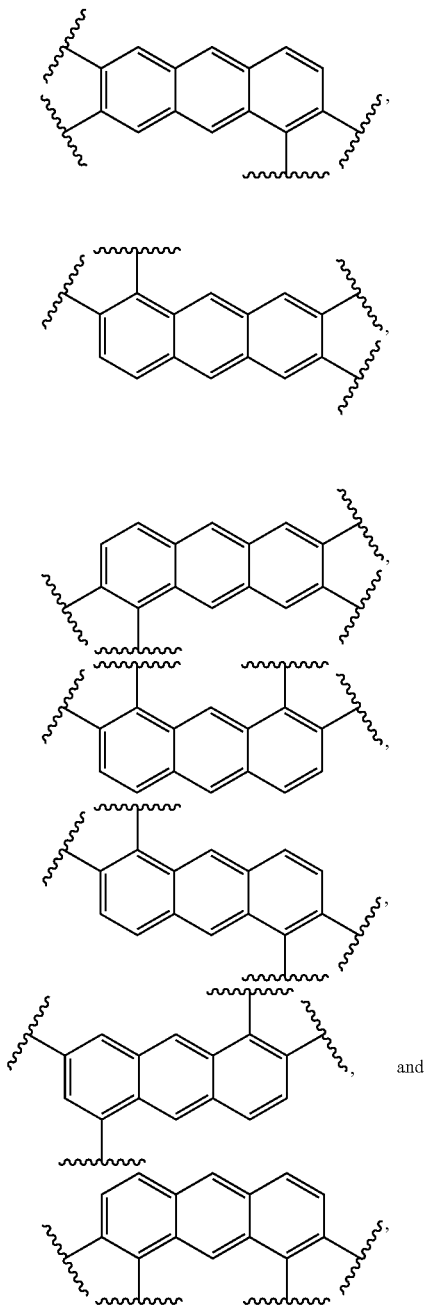

wherein n is an integer greater than 1; wherein m is 0 or 1; wherein A is selected from —Ar¹— and a structure represented by a formula:

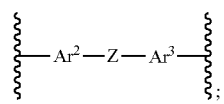

wherein Z, when present, is selected from O, NR³, CR$^{4a}$R$^{4b}$, CO, and SO$_2$; wherein each of R³, R$^{4a}$, and R$^{4b}$, when present, is independently selected from hydrogen, C1-C4 alkyl, and C1-C4 haloalkyl; wherein Ar¹, when present, is selected from aryl, 5-membered heteroaryl, and 6-membered heteroaryl and substituted with 0, 1, 2, or 3 groups independently selected from halogen, —OH, —CN, —NH$_2$, C1-C4 alkyl, C1-C4 haloalkyl, and C1-C4 alkoxy; wherein each of Ar² and Ar³, when present, is independently selected from aryl, 5-membered heteroaryl, and 6-membered heteroaryl and substituted with 0, 1, 2, or 3 groups independently selected from halogen, —OH, —CN, —NH$_2$, C1-C4 alkyl, C1-C4 haloalkyl, and C1-C4 alkoxy; wherein Q, when present, is selected from O, NR¹, SO, SO$_2$, C(O), and CR$^{2a}$R$^{2b}$; and wherein each of R¹, R$^{2a}$, and R$^{2b}$, when present, is independently selected from hydrogen, C1-C4 alkyl, and C1-C4 haloalkyl.

In a further aspect, the poly(amic acid) comprises at least one residue having a structure represented by a formula:

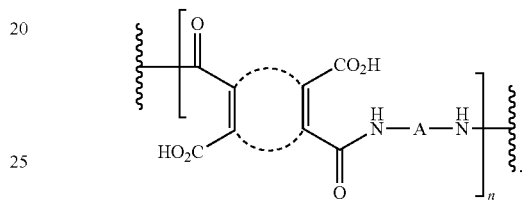

In a still further aspect, the poly(amic acid) comprises at least one residue having a structure represented by a formula:

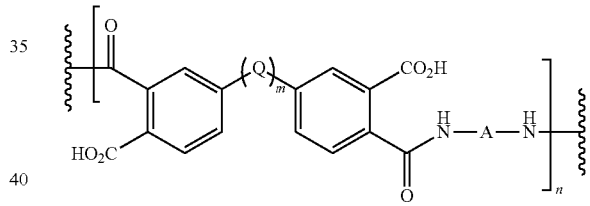

In yet a further aspect, the poly(amic acid) comprises at least one residue having a structure represented by a formula selected from:

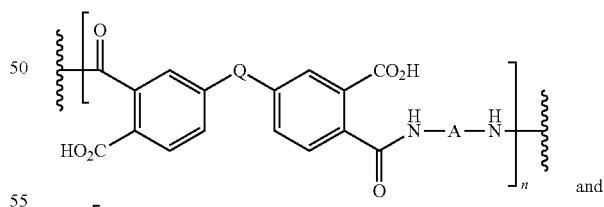

and

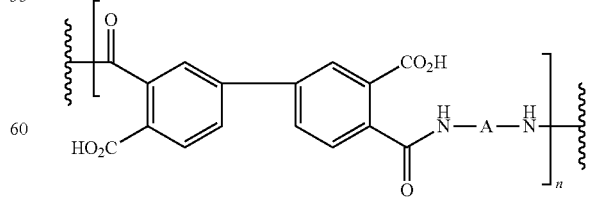

In an even further aspect, the poly(amic acid) comprises at least one residue having a structure represented by a formula:

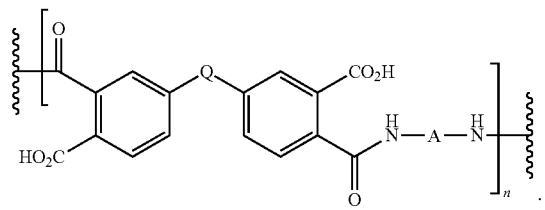

In a still further aspect, the poly(amic acid) comprises at least one residue having a structure represented by a formula selected from:

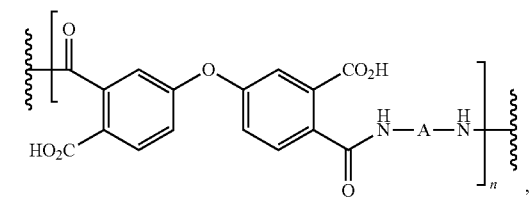

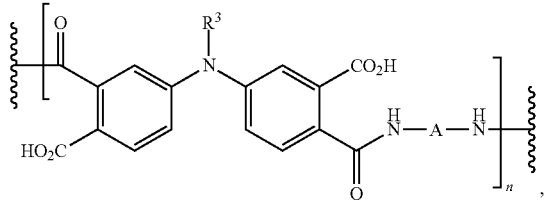

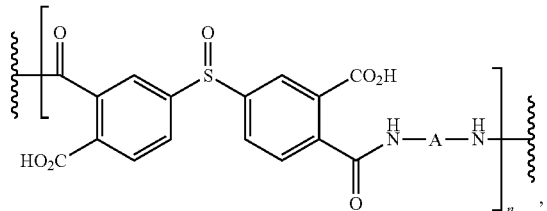

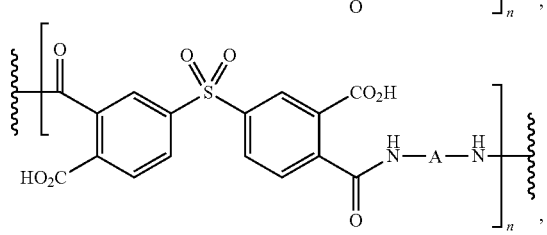

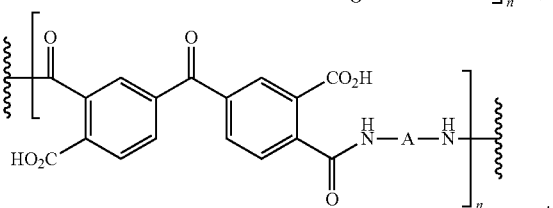

, and

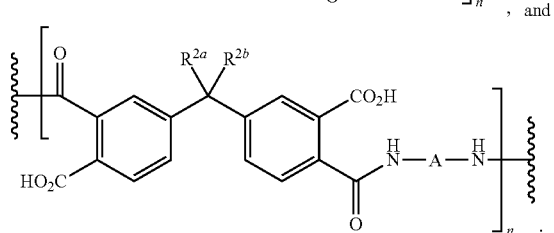

.

In yet a further aspect, the poly(amic acid) comprises at least one residue having a structure represented by a formula selected from:

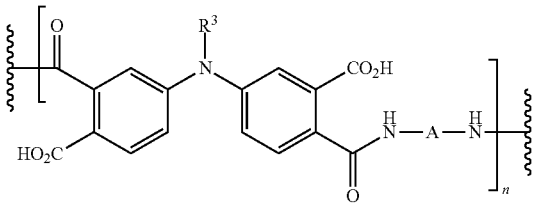

,

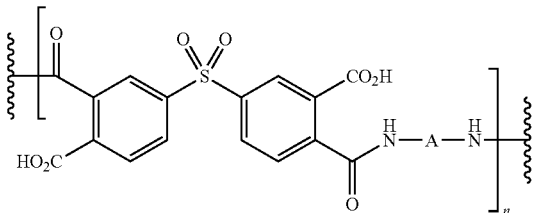

,

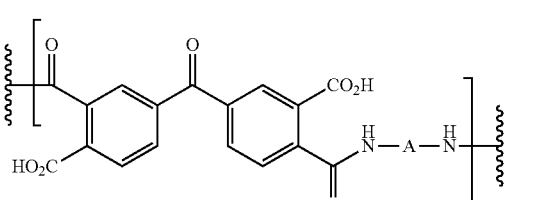

,

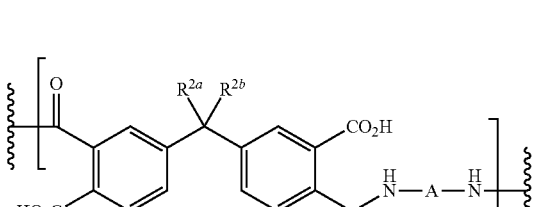

, and

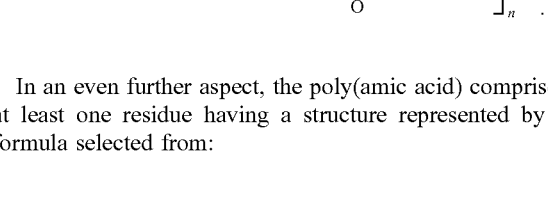

.

In an even further aspect, the poly(amic acid) comprises at least one residue having a structure represented by a formula selected from:

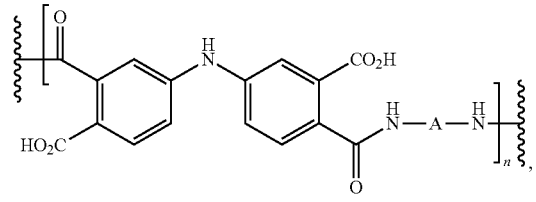

,

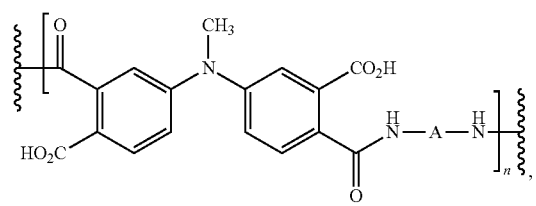

,

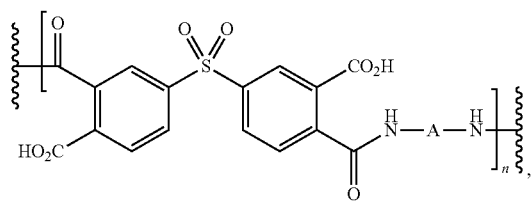
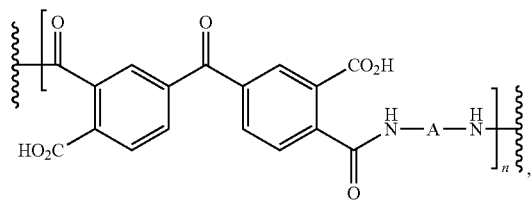
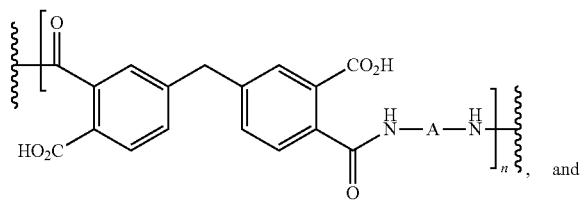, and
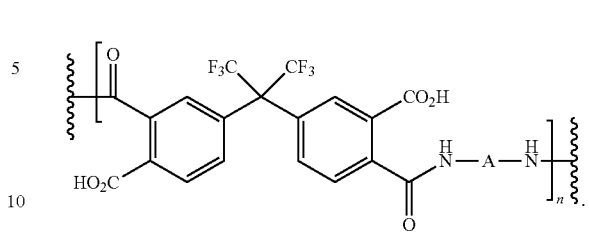
In a still further aspect, the poly(amic acid) comprises at least one residue having a structure represented by a formula:
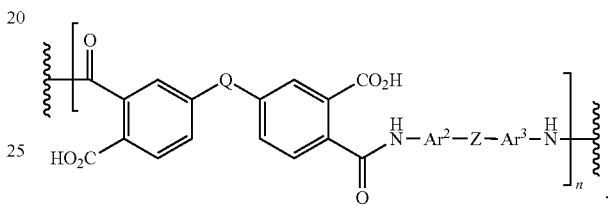
In yet a further aspect, the poly(amic acid) comprises at least one residue having a structure represented by a formula:
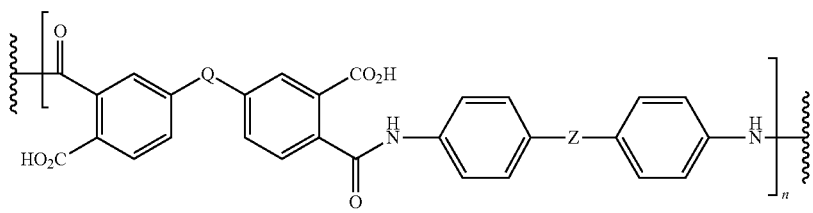
In an even further aspect, the poly(amic acid) comprises at least one residue having a structure represented by a formula:
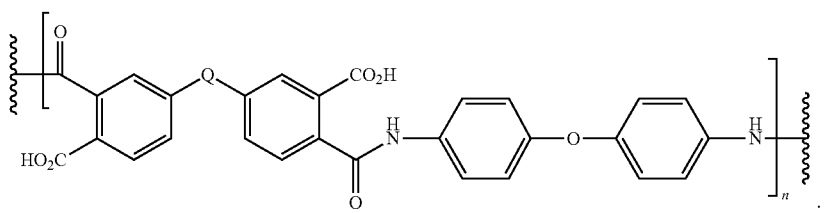

In a further aspect, the poly(amic acid) comprises at least one residue having a structure represented by a formula:

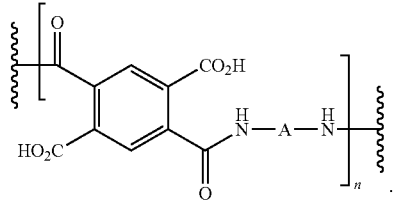

In yet a further aspect, the poly(amic acid) comprises at least one residue having a structure represented by a formula:

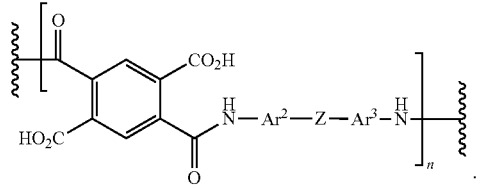

In an even further aspect, the poly(amic acid) comprises at least one residue having a structure represented by a formula:

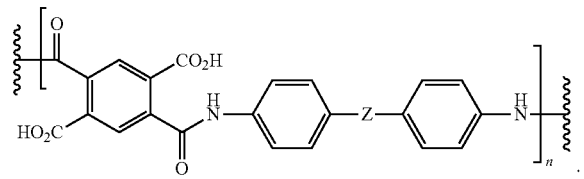

In a still further aspect, the poly(amic acid) comprises at least one residue having a structure represented by a formula:

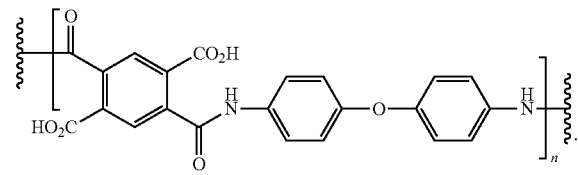

In a further aspect, the poly(amic acid) comprises at least one residue having a structure represented by a formula:

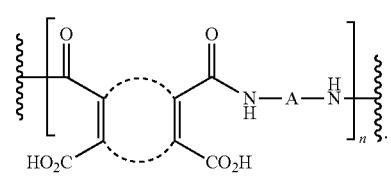

In a still further aspect, the poly(amic acid) comprises at least one residue having a structure represented by a formula:

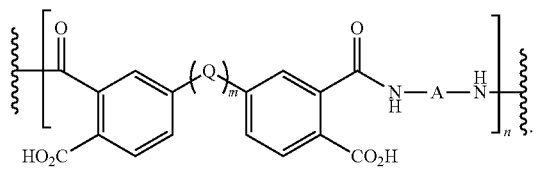

In yet a further aspect, the poly(amic acid) comprises at least one residue having a structure represented by a formula selected from:

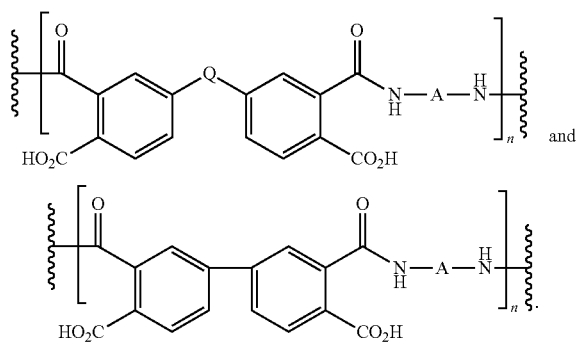

and

In an even further aspect, the poly(amic acid) comprises at least one residue having a structure represented by a formula:

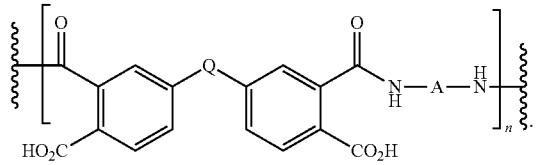

In a still further aspect, the poly(amic acid) comprises at least one residue having a structure represented by a formula selected from:

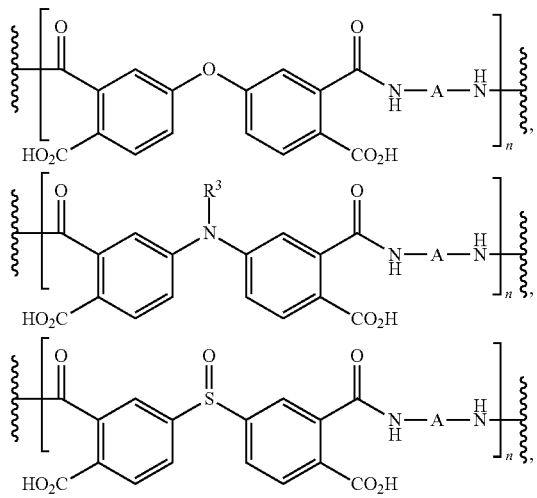

-continued

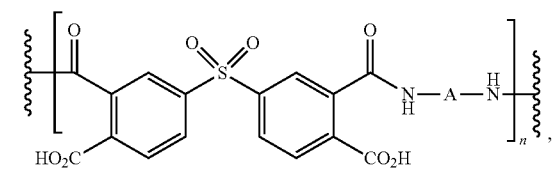

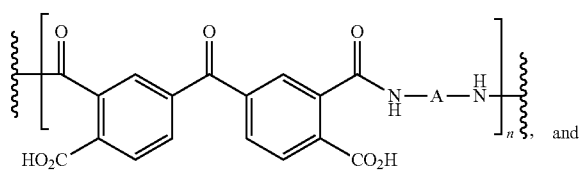

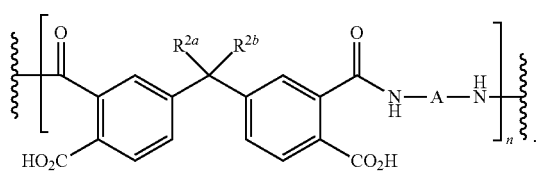

In yet a further aspect, the poly(amic acid) comprises at least one residue having a structure represented by a formula selected from:

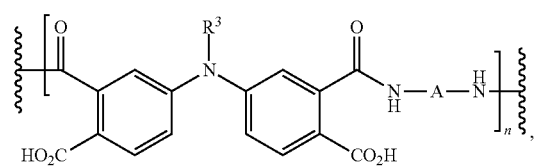

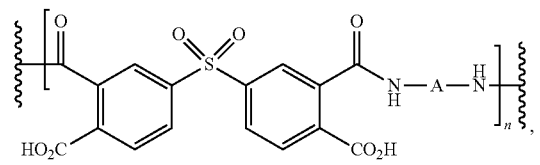

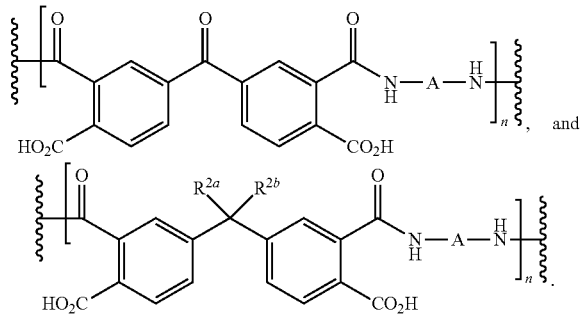

In an even further aspect, the poly(amic acid) comprises at least one residue having a structure represented by a formula selected from:

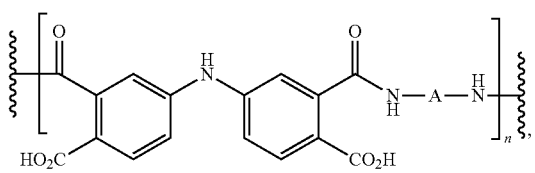

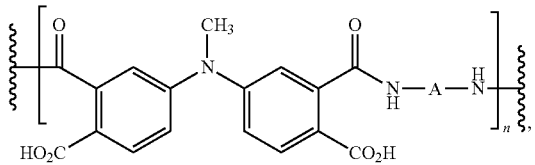

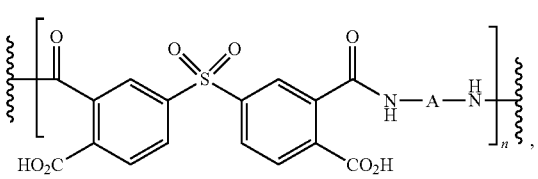

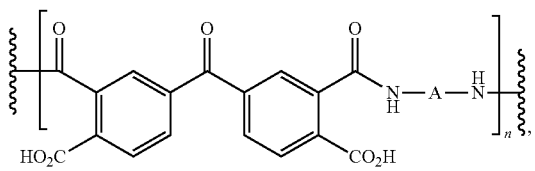

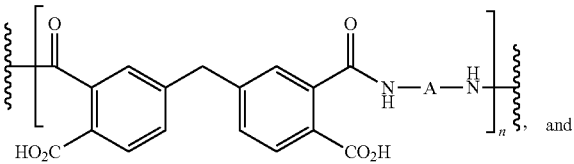

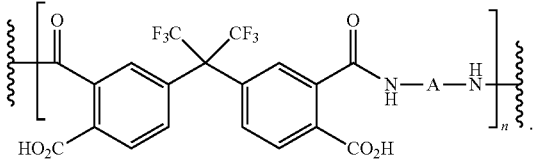

In a still further aspect, the poly(amic acid) comprises at least one residue having a structure represented by a formula:

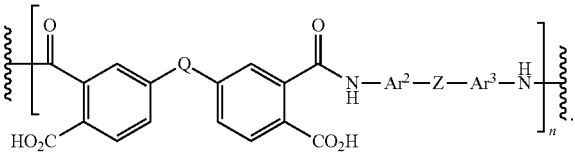

In yet a further aspect, the poly(amic acid) comprises at least one residue having a structure represented by a formula:

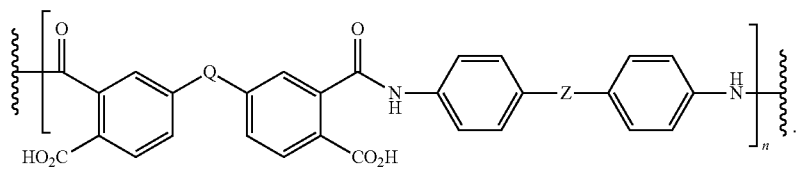

In an even further aspect, the poly(amic acid) comprises at least one residue having a structure represented by a formula:

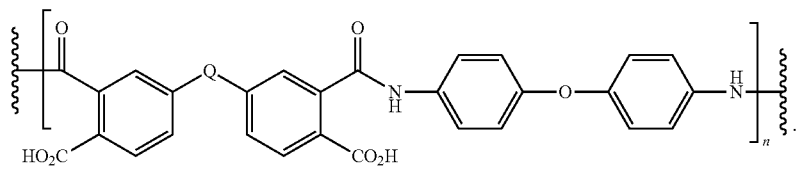

In a still further aspect, the poly(amic acid) comprises at least one residue having a structure represented by a formula:

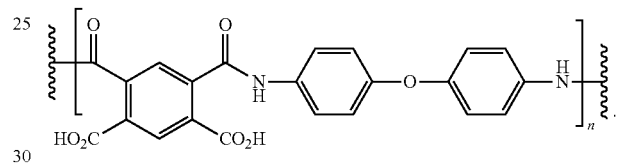

In one aspect,

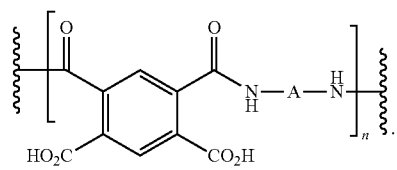

In yet a further aspect, the poly(amic acid) comprises at least one residue having a structure:

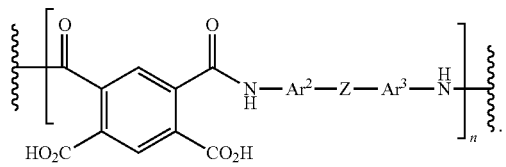

comprises a structure represented by a formula selected from:

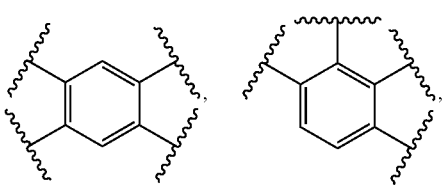

In an even further aspect, the poly(amic acid) comprises at least one residue having a structure:

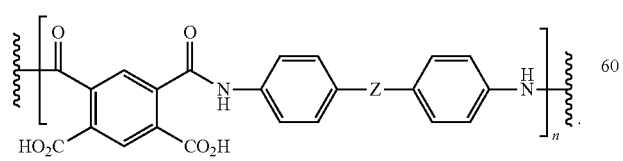

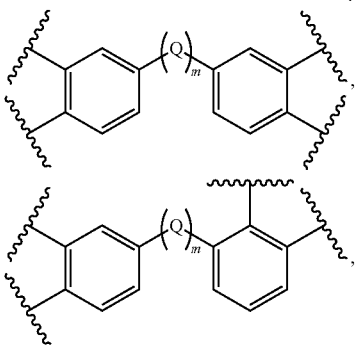

In a still further aspect, the poly(amic acid) comprises at least one residue having a structure:

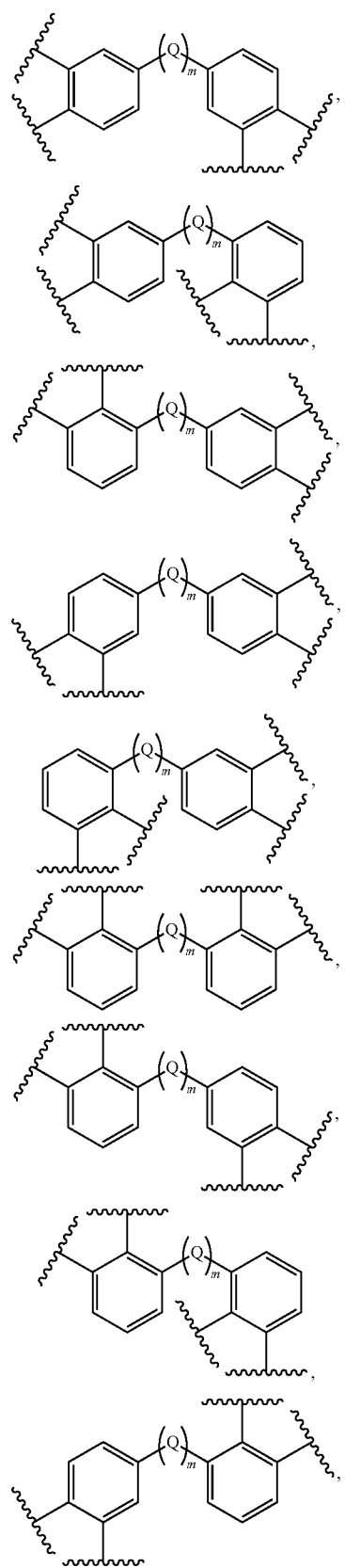
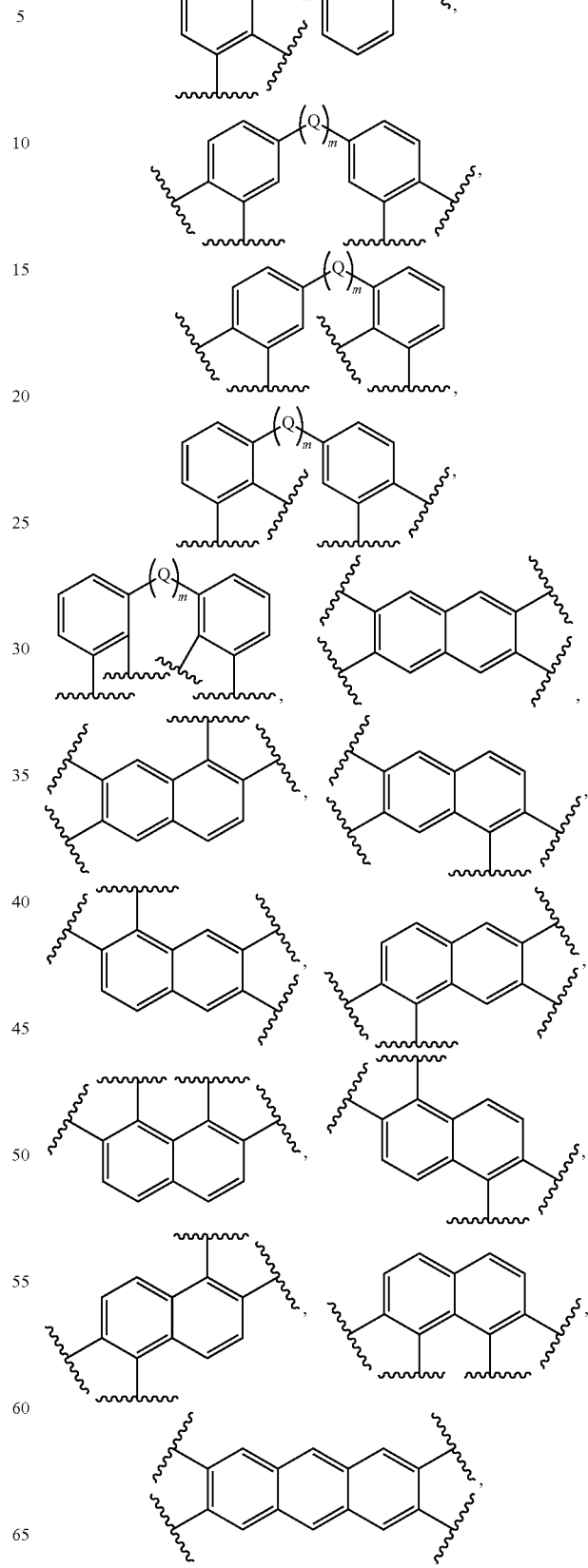

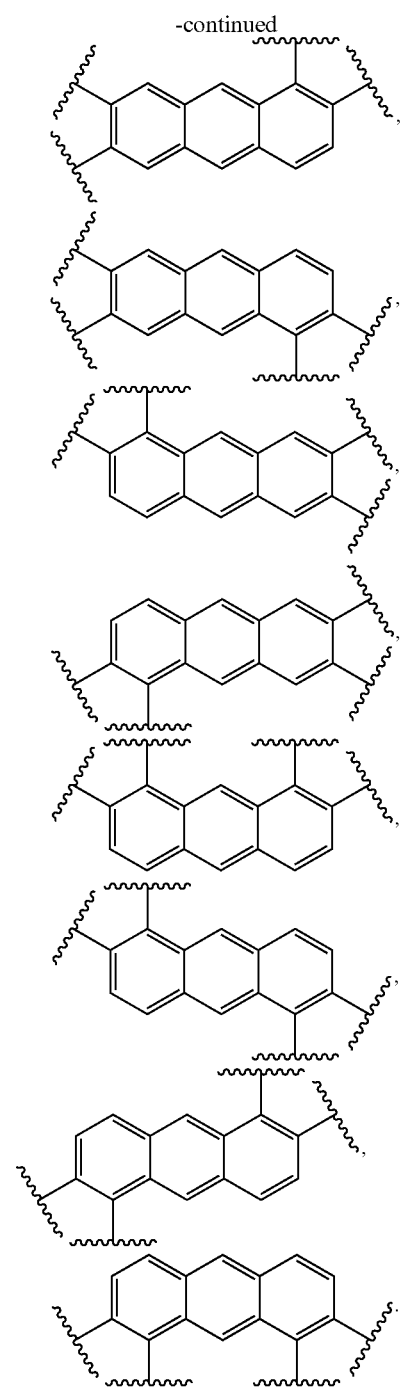
In a further aspect,
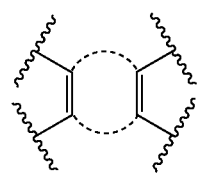
comprises a structure represented by a formula selected from:
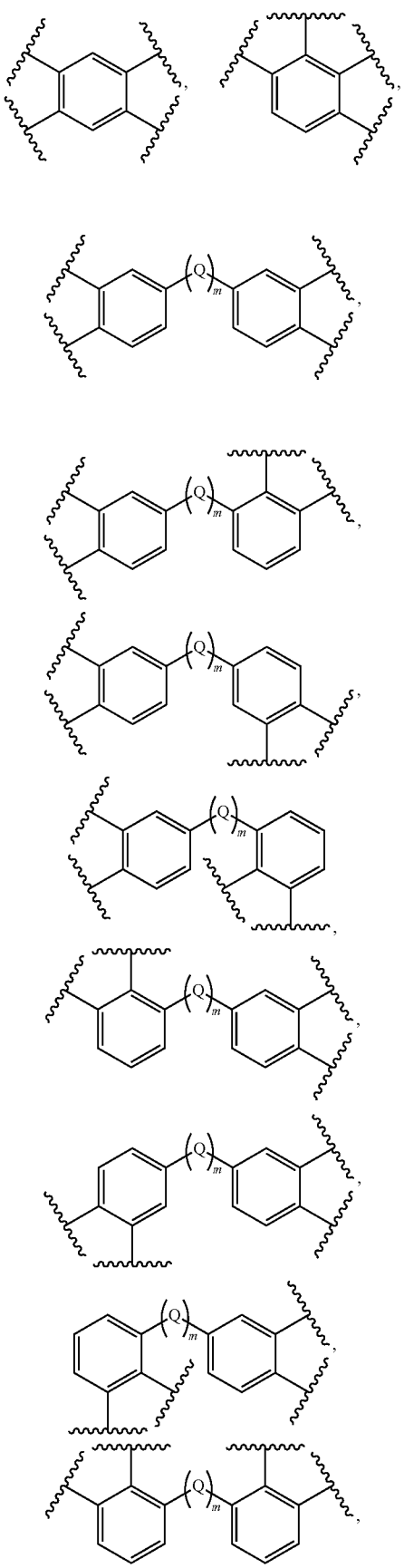

-continued
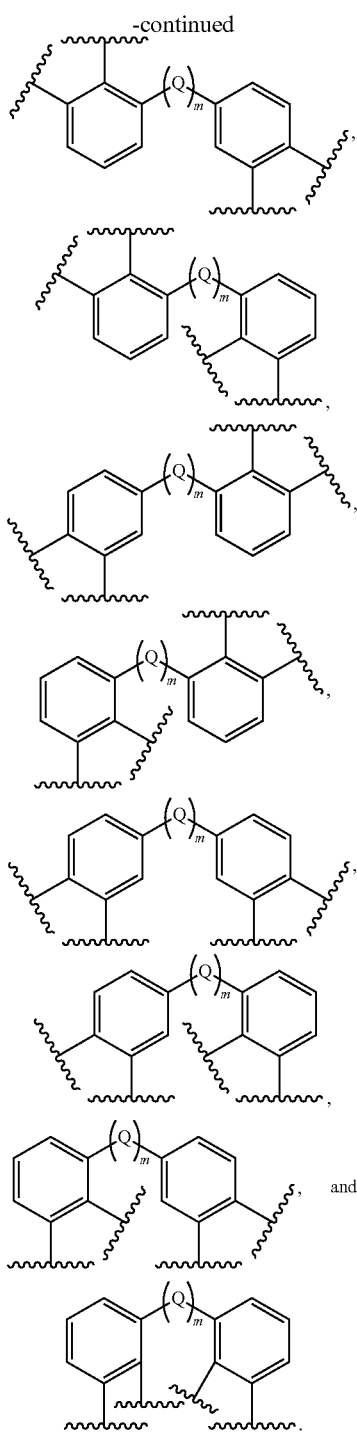
In a further aspect,
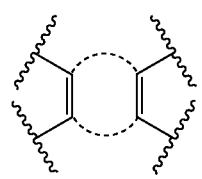
comprises a structure represented by a formula selected from:
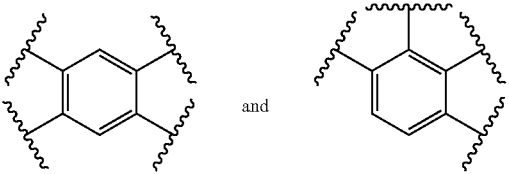
In a still further aspect,
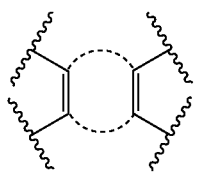
comprises a structure represented by a formula selected from:
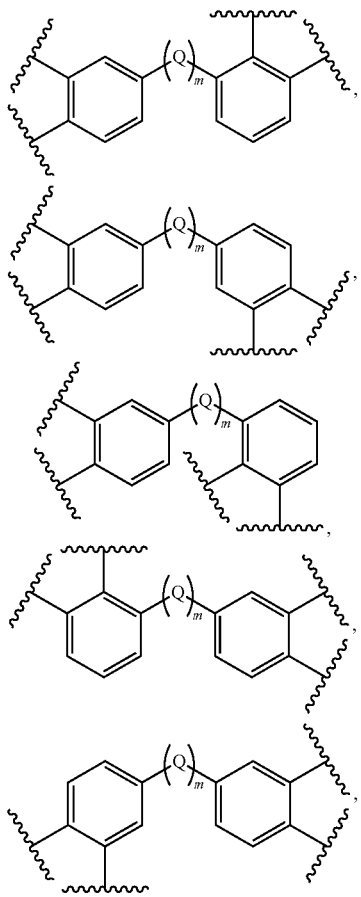

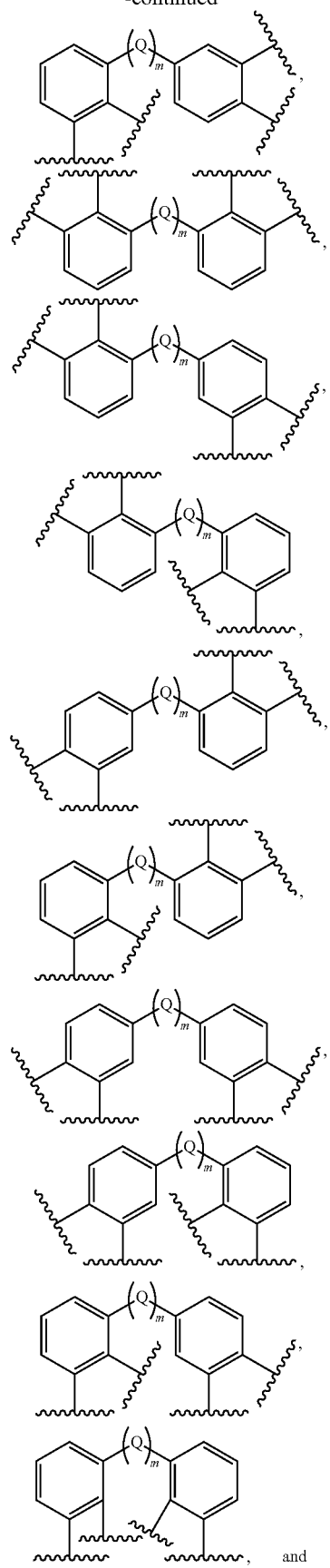
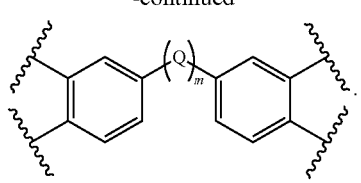
In yet a further aspect,
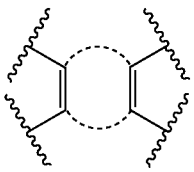
comprises a structure represented by a formula selected from:
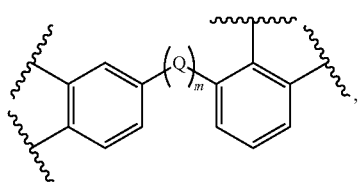
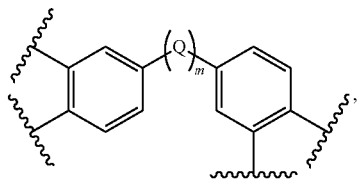
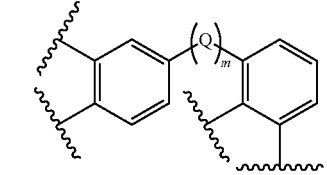
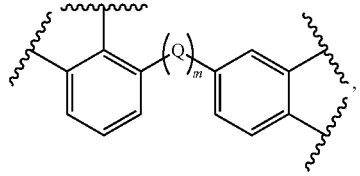
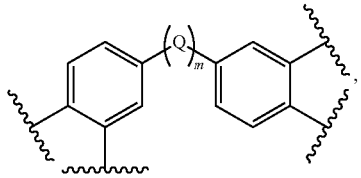
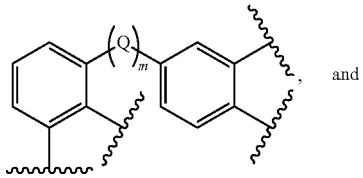, and

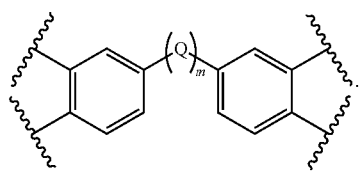

In an even further aspect,

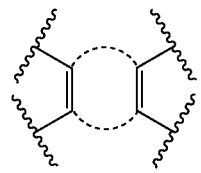

comprises a structure represented by a formula selected from:

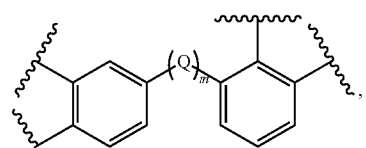

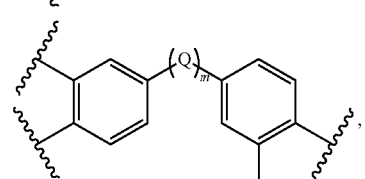

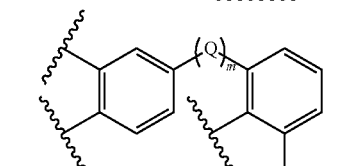

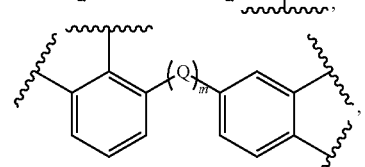

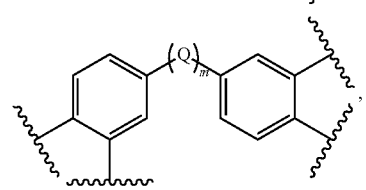

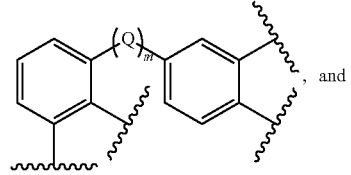, and

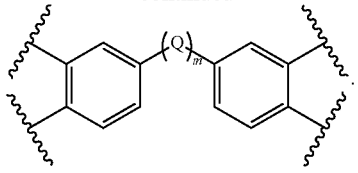

In a still further aspect,

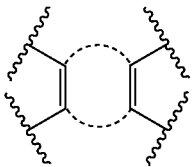

comprises a structure represented by a formula:

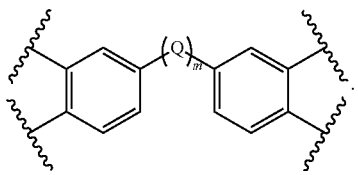

In one aspect, n is an integer greater than 1. In a further aspect, n is an integer greater than 10. In a still further aspect, n is an integer greater than 100. In yet a further aspect, n is an integer greater than 1000. In an even further aspect, n is an integer greater than 10,000. In a still further aspect, n is an integer greater than 100,000.

In one aspect, m is 0 or 1. In a further aspect, m is 0. In a still further aspect, m is 1.

a. A Groups

In one aspect, A is selected from —Ar$^1$— and a structure represented by a formula:

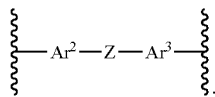

In a further aspect, A is —Ar$^1$—. In a still further aspect, A is a structure represented by a formula:

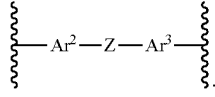

b. Q Groups

In one aspect, Q, when present, is selected from O, NR$^1$, SO, SO$_2$, C(O), and CR$^{2a}$R$^{2b}$.

In a further aspect, Q, when present, is selected from O, NR$^1$, and CR$^{2a}$R$^{2b}$. In a still further aspect, Q, when present, is selected from NR$^1$ and CR$^{2a}$R$^{2b}$. In yet a further aspect, Q, when present, is selected from O and NR$^1$. In an even further aspect, Q, when present, is selected from O and CR$^{2a}$R$^{2b}$. In a still further aspect, Q, when present, is O. In yet a further aspect, Q, when present, is $NR^1$. In an even further aspect, Q, when present, is $CR^{2a}R^{2b}$.

In a further aspect, Q, when present, is selected from SO, $SO_2$, and C(O). In a still further aspect, Q, when present, is selected from SO and $SO_2$. In yet a further aspect, Q, when present, is selected from SO and C(O). In an even further aspect, Q, when present, is selected from $SO_2$ and C(O). In a still further aspect, Q, when present, is SO. In yet a further aspect, Q, when present, is $SO_2$. In an even further aspect, Q, when present, is C(O).

c. Z Groups

In one aspect, Z, when present, is selected from O, $NR^3$, $CR^{4a}R^{4b}$, CO, and $SO_2$.

In a further aspect, Z, when present, is selected from O, $NR^3$, and $CR^{4a}R^{4b}$. In a still further aspect, Z, when present, is selected from $NR^3$ and $CR^{4a}R^{4b}$. In yet a further aspect, Z, when present, is selected from O and $NR^3$. In an even further aspect, Z, when present, is selected from O and $CR^{4a}R^{4b}$. In a still further aspect, Z, when present, is O. In yet a further aspect, Z, when present, is $NR^3$. In an even further aspect, Z, when present, is $CR^{4a}R^{4b}$.

In a further aspect, Z, when present, is selected from O, $NR^3$, $CR^{4a}R^{4b}$, and CO. In a still further aspect, Z, when present, is selected from $NR^3$, $CR^{4a}R^{4b}$, and CO. In yet a further aspect, Z, when present, is selected from $CR^{4a}R^{4b}$ and CO.

In a further aspect, Z, when present, is selected from CO and $SO_2$. In a still further aspect, Z, when present, is CO. In yet a further aspect, Z, when present is $SO_2$.

d. $R^1$, $R^{2a}$, and $R^{2b}$ Groups

In one aspect, each of $R^1$, $R^{2a}$, and $R^{2b}$, when present, is independently selected from hydrogen, C1-C4 alkyl, and C1-C4 haloalkyl. In a further aspect, each of $R^1$, $R^{2a}$, and $R^{2b}$, when present, is hydrogen.

In a further aspect, each of $R^1$, $R^{2a}$, and $R^{2b}$, when present, is independently selected from hydrogen, methyl, ethyl, i-propyl, n-propyl, —$CH_2F$, —$CH_2Cl$, —$CH_2Br$, —$CH_2CH_2F$, —$CH_2CH_2Cl$, —$CH_2CH_2Br$, —$(CH_2)_2CH_2F$, —$(CH_2)_2CH_2Cl$, —$(CH_2)_2CH_2Br$, —$CHF_2$, —$CF_3$, —$CHCl_2$, —$CCl_3$, —$CHBr_2$, —$CBr_3$, —$CH_2CHF_2$, —$CH_2CF_3$, —$CH_2CHCl_2$, —$CH_2CCl_3$, —$CH_2CHBr_2$, —$CH_2CBr_3$, —$(CH_2)_2CHF_2$, —$(CH_2)_2CF_3$, —$(CH_2)_2CHCl_2$, —$(CH_2)_2CCl_3$, —$(CH_2)_2CHBr_2$, and —$(CH_2)_2CBr_3$. In a still further aspect, each of $R^1$, $R^{2a}$, and $R^{2b}$, when present, is independently selected from hydrogen, methyl, ethyl, —$CH_2F$, —$CH_2Cl$, —$CH_2Br$, —$CH_2CH_2F$, —$CH_2CH_2Cl$, —$CH_2CH_2Br$, —$CHF_2$, —$CF_3$, —$CHCl_2$, —$CCl_3$, —$CHBr_2$, —$CBr_3$, —$CH_2CHF_2$, —$CH_2CF_3$, —$CH_2CHCl_2$, —$CH_2CCl_3$, —$CH_2CHBr_2$, and —$CH_2CBr_3$. In yet a further aspect, each of $R^1$, $R^{2a}$, and $R^{2b}$, when present, is independently selected from hydrogen, methyl, —$CH_2F$, —$CH_2Cl$, —$CH_2Br$, —$CHF_2$, —$CF_3$, —$CHCl_2$, —$CCl_3$, —$CHBr_2$, and —$CBr_3$.

In a further aspect, each of $R^1$, $R^{2a}$, and $R^{2b}$, when present, is independently selected from hydrogen and C1-C4 alkyl. In a still further aspect, each of $R^1$, $R^{2a}$, and $R^{2b}$, when present, is independently selected from hydrogen, methyl, ethyl, i-propyl, n-propyl, n-butyl, i-butyl, s-butyl, and t-butyl. In yet a further aspect, each of $R^1$, $R^{2a}$, and $R^{2b}$, when present, is independently selected from hydrogen, methyl, ethyl, i-propyl, and n-propyl. In an even further aspect, each of $R^1$, $R^{2a}$, and $R^{2b}$, when present, is independently selected from hydrogen, methyl, and ethyl. In a still further aspect, each of $R^1$, $R^{2a}$, and $R^{2b}$, when present, is independently selected from hydrogen and ethyl. In yet a further aspect, each of $R^1$, $R^{2a}$, and $R^{2b}$, when present, is independently selected from hydrogen and methyl.

In a further aspect, each of $R^1$, $R^{2a}$, and $R^{2b}$, when present, is independently selected from hydrogen and C1-C4 haloalkyl. In a still further aspect, each of $R^1$, $R^{2a}$, and $R^{2b}$, when present, is independently selected from hydrogen, —$CH_2F$, —$CH_2Cl$, —$CH_2Br$, —$CH_2CH_2F$, —$CH_2CH_2Cl$, —$CH_2CH_2Br$, —$(CH_2)_2CH_2F$, —$(CH_2)_2CH_2Cl$, —$(CH_2)_2CH_2Br$, —$CHF_2$, —$CF_3$, —$CHCl_2$, —$CCl_3$, —$CHBr_2$, —$CBr_3$, —$CH_2CHF_2$, —$CH_2CF_3$, —$CH_2CHCl_2$, —$CH_2CCl_3$, —$CH_2CHBr_2$, —$CH_2CBr_3$, —$(CH_2)_2CHF_2$, —$(CH_2)_2CF_3$, —$(CH_2)_2CHCl_2$, —$(CH_2)_2CCl_3$, —$(CH_2)_2CHBr_2$, and —$(CH_2)_2CBr_3$. In yet a further aspect, each of $R^1$, $R^{2a}$, and $R^{2b}$, when present, is independently selected from hydrogen, —$CH_2F$, —$CH_2Cl$, —$CH_2Br$, —$CH_2CH_2F$, —$CH_2CH_2Cl$, —$CH_2CH_2Br$, —$CHF_2$, —$CF_3$, —$CHCl_2$, —$CCl_3$, —$CHBr_2$, —$CBr_3$, —$CH_2CHF_2$, —$CH_2CF_3$, —$CH_2CHCl_2$, —$CH_2CCl_3$, —$CH_2CHBr_2$, and —$CH_2CBr_3$. In an even further aspect, each of $R^1$, $R^{2a}$, and $R^{2b}$, when present, is independently selected from hydrogen, —$CH_2F$, —$CH_2Cl$, —$CH_2Br$, —$CHF_2$, —$CF_3$, —$CHCl_2$, —$CCl_3$, —$CHBr_2$, and —$CBr_3$.

e. $R^3$, $R^{4a}$, and $R^{4b}$ Groups

In one aspect, each of $R^3$, $R^{4a}$, and $R^{4b}$, when present, is independently selected from hydrogen, C1-C4 alkyl, and C1-C4 haloalkyl. In a further aspect, each of $R^3$, $R^{4a}$, and $R^{4b}$, when present, is hydrogen.

In a further aspect, each of $R^3$, $R^{4a}$, and $R^{4b}$, when present, is independently selected from hydrogen, methyl, ethyl, i-propyl, n-propyl, —$CH_2F$, —$CH_2Cl$, —$CH_2Br$, —$CH_2CH_2F$, —$CH_2CH_2Cl$, —$CH_2CH_2Br$, —$(CH_2)_2CH_2F$, —$(CH_2)_2CH_2Cl$, —$(CH_2)_2CH_2Br$, —$CHF_2$, —$CF_3$, —$CHCl_2$, —$CCl_3$, —$CHBr_2$, —$CBr_3$, —$CH_2CHF_2$, —$CH_2CF_3$, —$CH_2CHCl_2$, —$CH_2CCl_3$, —$CH_2CHBr_2$, —$CH_2CBr_3$, —$(CH_2)_2CHF_2$, —$(CH_2)_2CF_3$, —$(CH_2)_2CHCl_2$, —$(CH_2)_2CCl_3$, —$(CH_2)_2CHBr_2$, and —$(CH_2)_2CBr_3$. In a still further aspect, each of $R^3$, $R^{4a}$, and $R^{4b}$, when present, is independently selected from hydrogen, methyl, ethyl, —$CH_2F$, —$CH_2Cl$, —$CH_2Br$, —$CH_2CH_2F$, —$CH_2CH_2Cl$, —$CH_2CH_2Br$, —$CHF_2$, —$CF_3$, —$CHCl_2$, —$CCl_3$, —$CHBr_2$, —$CBr_3$, —$CH_2CHF_2$, —$CH_2CF_3$, —$CH_2CHCl_2$, —$CH_2CCl_3$, —$CH_2CHBr_2$, and —$CH_2CBr_3$. In yet a further aspect, each of $R^3$, $R^{4a}$, and $R^{4b}$, when present, is independently selected from hydrogen, methyl, —$CH_2F$, —$CH_2Cl$, —$CH_2Br$, —$CHF_2$, —$CF_3$, —$CHCl_2$, —$CCl_3$, —$CHBr_2$, and —$CBr_3$.

In a further aspect, each of $R^3$, $R^{4a}$, and $R^{4b}$, when present, is independently selected from hydrogen and C1-C4 alkyl. In a still further aspect, each of $R^3$, $R^{4a}$, and $R^{4b}$, when present, is independently selected from hydrogen, methyl, ethyl, i-propyl, n-propyl, n-butyl, i-butyl, s-butyl, and t-butyl. In yet a further aspect, each of $R^3$, $R^{4a}$, and $R^{4b}$, when present, is independently selected from hydrogen, methyl, ethyl, i-propyl, and n-propyl. In an even further aspect, each of $R^3$, $R^{4a}$, and $R^{4b}$, when present, is independently selected from hydrogen, methyl, and ethyl. In a still further aspect, each of $R^3$, $R^{4a}$, and $R^{4b}$, when present, is independently selected from hydrogen and ethyl. In yet a further aspect, each of $R^3$, $R^{4a}$, and $R^{4b}$, when present, is independently selected from hydrogen and methyl.

In a further aspect, each of $R^3$, $R^{4a}$, and $R^{4b}$, when present, is independently selected from hydrogen and C1-C4 haloalkyl. In a still further aspect, each of $R^3$, $R^{4a}$, and $R^{4b}$, when present, is independently selected from hydrogen, —$CH_2F$, —$CH_2Cl$, —$CH_2Br$, —$CH_2CH_2F$, —$CH_2CH_2Cl$, —$CH_2CH_2Br$, —$(CH_2)_2CH_2F$, —$(CH_2)_2CH_2Cl$, —$(CH_2)_2CH_2Br$, —$CHF_2$, —$CF_3$, —$CHCl_2$, —$CCl_3$, —$CHBr_2$, —$CBr_3$, —$CH_2CHF_2$, —$CH_2CF_3$, —$CH_2CHCl_2$, —$CH_2CCl_3$, —$CH_2CHBr_2$, —$CH_2CBr_3$, —$(CH_2)_2CHF_2$, —$(CH_2)_2CF_3$, —$(CH_2)_2CHCl_2$, —$(CH_2)_2CCl_3$, —$(CH_2)_2CHBr_2$, and —$(CH_2)_2CBr_3$. In yet a further aspect, each of $R^3$, $R^{4a}$, and $R^{4b}$, when present, is independently selected from hydrogen, —$CH_2F$, —$CH_2Cl$, —$CH_2Br$, —$CH_2CH_2F$, —$CH_2CH_2Cl$, —$CH_2CH_2Br$, —$CHF_2$, —$CF_3$, —$CHCl_2$, —$CCl_3$, —$CHBr_2$, —$CBr_3$, —$CH_2CHF_2$, —$CH_2CF_3$, —$CH_2CHCl_2$, —$CH_2CCl_3$, —$CH_2CHBr_2$, and —$CH_2CBr_3$. In an even further aspect, each of $R^3$, $R^{4a}$, and $R^{4b}$, when present, is independently selected from hydrogen, —$CH_2F$, —$CH_2Cl$, —$CH_2Br$, —$CHF_2$, —$CF_3$, —$CHCl_2$, —$CCl_3$, —$CHBr_2$, and —$CBr_3$.

f. $Ar^1$ Groups

In one aspect, $Ar^1$, when present, is selected from aryl, 5-membered heteroaryl, and 6-membered heteroaryl and substituted with 0, 1, 2, or 3 groups independently selected from halogen, —OH, —CN, —$NH_2$, C1-C4 alkyl, C1-C4 haloalkyl, and C1-C4 alkoxy. In a further aspect, $Ar^1$, when present, is selected from aryl, 5-membered heteroaryl, and 6-membered heteroaryl and substituted with 0, 1, or 2 groups independently selected from halogen, —OH, —CN, —$NH_2$, C1-C4 alkyl, C1-C4 haloalkyl, and C1-C4 alkoxy. In a still further aspect, $Ar^1$, when present, is selected from aryl, 5-membered heteroaryl, and 6-membered heteroaryl and substituted with 0 or 1 group selected from halogen, —OH, —CN, —$NH_2$, C1-C4 alkyl, C1-C4 haloalkyl, and C1-C4 alkoxy. In yet a further aspect, $Ar^1$, when present, is selected from aryl, 5-membered heteroaryl, and 6-membered heteroaryl and monosubstituted with a group selected from halogen, —OH, —CN, —$NH_2$, C1-C4 alkyl, C1-C4 haloalkyl, and C1-C4 alkoxy. In an even further aspect, $Ar^1$, when present, is selected from aryl, 5-membered heteroaryl, and 6-membered heteroaryl and unsubstituted.

In a further aspect, $Ar^1$, when present, is aryl substituted with 0, 1, 2, or 3 groups independently selected from halogen, —OH, —CN, —$NH_2$, C1-C4 alkyl, C1-C4 haloalkyl, and C1-C4 alkoxy. In a still further aspect, $Ar^1$, when present, is aryl substituted with 0, 1, or 2 groups independently selected from halogen, —OH, —CN, —$NH_2$, C1-C4 alkyl, C1-C4 haloalkyl, and C1-C4 alkoxy. In yet a further aspect, $Ar^1$, when present, is aryl substituted with 0 or 1 group selected from halogen, —OH, —CN, —$NH_2$, C1-C4 alkyl, C1-C4 haloalkyl, and C1-C4 alkoxy. In an even further aspect, $Ar^1$, when present, is aryl monosubstituted with a group selected from halogen, —OH, —CN, —$NH_2$, C1-C4 alkyl, C1-C4 haloalkyl, and C1-C4 alkoxy. In a still further aspect, $Ar^1$, when present, is unsubstituted aryl.

In a further aspect, $Ar^1$, when present, is phenyl substituted with 0, 1, 2, or 3 groups independently selected from halogen, —OH, —CN, —$NH_2$, C1-C4 alkyl, C1-C4 haloalkyl, and C1-C4 alkoxy. In a still further aspect, $Ar^1$, when present, is phenyl substituted with 0, 1, or 2 groups independently selected from halogen, —OH, —CN, —$NH_2$, C1-C4 alkyl, C1-C4 haloalkyl, and C1-C4 alkoxy. In yet a further aspect, $Ar^1$, when present, is phenyl substituted with 0 or 1 group selected from halogen, —OH, —CN, —$NH_2$, C1-C4 alkyl, C1-C4 haloalkyl, and C1-C4 alkoxy. In an even further aspect, $Ar^1$, when present, is phenyl monosubstituted with a group selected from halogen, —OH, —CN, —$NH_2$, C1-C4 alkyl, C1-C4 haloalkyl, and C1-C4 alkoxy. In a still further aspect, $Ar^1$, when present, is unsubstituted phenyl.

In a further aspect, $Ar^1$, when present, is selected from 5-membered heteroaryl and 6-membered heteroaryl and substituted with 0, 1, 2, or 3 groups independently selected from halogen, —OH, —CN, —$NH_2$, C1-C4 alkyl, C1-C4 haloalkyl, and C1-C4 alkoxy. In a still further aspect, $Ar^1$, when present, is selected from 5-membered heteroaryl and 6-membered heteroaryl and substituted with 0, 1, or 2 groups independently selected from halogen, —OH, —CN, —$NH_2$, C1-C4 alkyl, C1-C4 haloalkyl, and C1-C4 alkoxy. In yet a further aspect, $Ar^1$, when present, is selected from 5-membered heteroaryl and 6-membered heteroaryl and substituted with 0 or 1 group selected from halogen, —OH, —CN, —$NH_2$, C1-C4 alkyl, C1-C4 haloalkyl, and C1-C4 alkoxy. In an even further aspect, $Ar^1$, when present, is selected from 5-membered heteroaryl and 6-membered heteroaryl and monosubstituted with a group selected from halogen, —OH, —CN, —$NH_2$, C1-C4 alkyl, C1-C4 haloalkyl, and C1-C4 alkoxy. In a still further aspect, $Ar^1$, when present, is selected from 5-membered heteroaryl and 6-membered heteroaryl and unsubstituted.

In a further aspect, $Ar^1$, when present, is 5-membered heteroaryl substituted with 0, 1, 2, or 3 groups independently selected from halogen, —OH, —CN, —$NH_2$, C1-C4 alkyl, C1-C4 haloalkyl, and C1-C4 alkoxy. In a still further aspect, $Ar^1$, when present, is 5-membered heteroaryl substituted with 0, 1, or 2 groups independently selected from halogen, —OH, —CN, —$NH_2$, C1-C4 alkyl, C1-C4 haloalkyl, and C1-C4 alkoxy. In yet a further aspect, $Ar^1$, when present, is 5-membered heteroaryl substituted with 0 or 1 group selected from halogen, —OH, —CN, —$NH_2$, C1-C4 alkyl, C1-C4 haloalkyl, and C1-C4 alkoxy. In an even further aspect, $Ar^1$, when present, is 5-membered heteroaryl monosubstituted with a group selected from halogen, —OH, —CN, —$NH_2$, C1-C4 alkyl, C1-C4 haloalkyl, and C1-C4 alkoxy. In a still further aspect, $Ar^1$, when present, is unsubstituted 5-membered heteroaryl.

In a further aspect, $Ar^1$, when present, is selected from furanyl, thiophenyl, pyrrolyl, imidazolyl, pyrazolyl, and triazolyl and substituted with 0, 1, 2, or 3 groups independently selected from halogen, —OH, —CN, —$NH_2$, C1-C4 alkyl, C1-C4 haloalkyl, and C1-C4 alkoxy. In a still further aspect, $Ar^1$, when present, is selected from furanyl, thiophenyl, pyrrolyl, imidazolyl, pyrazolyl, and triazolyl and substituted with 0, 1, or 2 groups independently selected from halogen, —OH, —CN, —$NH_2$, C1-C4 alkyl, C1-C4 haloalkyl, and C1-C4 alkoxy. In yet a further aspect, $Ar^1$, when present, is selected from furanyl, thiophenyl, pyrrolyl, imidazolyl, pyrazolyl, and triazolyl and substituted with 0 or 1 group selected from halogen, —OH, —CN, —$NH_2$, C1-C4 alkyl, C1-C4 haloalkyl, and C1-C4 alkoxy. In an even further aspect, $Ar^1$, when present, is selected from furanyl, thiophenyl, pyrrolyl, imidazolyl, pyrazolyl, and triazolyl and monosubstituted with a group selected from halogen, —OH, —CN, —$NH_2$, C1-C4 alkyl, C1-C4 haloalkyl, and C1-C4 alkoxy. In a still further aspect, $Ar^1$, when present, is selected from furanyl, thiophenyl, pyrrolyl, imidazolyl, pyrazolyl, and triazolyl and unsubstituted.

In a further aspect, $Ar^1$, when present, is 6-membered heteroaryl substituted with 0, 1, 2, or 3 groups independently selected from halogen, —OH, —CN, —$NH_2$, C1-C4 alkyl, C1-C4 haloalkyl, and C1-C4 alkoxy. In a still further aspect, $Ar^1$, when present, is 6-membered heteroaryl substituted with 0, 1, or 2 groups independently selected from halogen, —OH, —CN, —$NH_2$, C1-C4 alkyl, C1-C4 haloalkyl, and C1-C4 alkoxy. In yet a further aspect, $Ar^1$, when present, is 6-membered heteroaryl substituted with 0 or 1 group selected from halogen, —OH, —CN, —$NH_2$, C1-C4 alkyl, C1-C4 haloalkyl, and C1-C4 alkoxy. In an even further aspect, $Ar^1$, when present, is 6-membered heteroaryl monosubstituted with a group selected from halogen, —OH, —CN, —$NH_2$, C1-C4 alkyl, C1-C4 haloalkyl, and C1-C4 alkoxy. In a still further aspect, $Ar^1$, when present, is unsubstituted 6-membered heteroaryl.

In a further aspect, $Ar^1$, when present, is selected from pyridinyl, pyridazinyl, pyrimidinyl, pyrazinyl, and triazinyl and substituted with 0, 1, 2, or 3 groups independently selected from halogen, —OH, —CN, —NH$_2$, C1-C4 alkyl, C1-C4 haloalkyl, and C1-C4 alkoxy. In a still further aspect, $Ar^1$, when present, is selected from pyridinyl, pyridazinyl, pyrimidinyl, pyrazinyl, and triazinyl and substituted with 0, 1, or 2 groups independently selected from halogen, —OH, —CN, —NH$_2$, C1-C4 alkyl, C1-C4 haloalkyl, and C1-C4 alkoxy. In yet a further aspect, $Ar^1$, when present, is selected from pyridinyl, pyridazinyl, pyrimidinyl, pyrazinyl, and triazinyl and substituted with 0 or 1 group selected from halogen, —OH, —CN, —NH$_2$, C1-C4 alkyl, C1-C4 haloalkyl, and C1-C4 alkoxy. In an even further aspect, $Ar^1$, when present, is selected from pyridinyl, pyridazinyl, pyrimidinyl, pyrazinyl, and triazinyl and monosubstituted with a group selected from halogen, —OH, —CN, —NH$_2$, C1-C4 alkyl, C1-C4 haloalkyl, and C1-C4 alkoxy. In a still further aspect, $Ar^1$, when present, is selected from pyridinyl, pyridazinyl, pyrimidinyl, pyrazinyl, and triazinyl and unsubstituted.

g. $Ar^2$ and $Ar^3$ Groups

In one aspect, each of $Ar^2$ and $Ar^3$, when present, is independently selected from aryl, 5-membered heteroaryl, and 6-membered heteroaryl and substituted with 0, 1, 2, or 3 groups independently selected from halogen, —OH, —CN, —NH$_2$, C1-C4 alkyl, C1-C4 haloalkyl, and C1-C4 alkoxy. In a further aspect, each of $Ar^2$ and $Ar^3$, when present, is independently selected from aryl, 5-membered heteroaryl, and 6-membered heteroaryl and substituted with 0, 1, or 2 groups independently selected from halogen, —OH, —CN, —NH$_2$, C1-C4 alkyl, C1-C4 haloalkyl, and C1-C4 alkoxy. In a still further aspect, each of $Ar^2$ and $Ar^3$, when present, is independently selected from aryl, 5-membered heteroaryl, and 6-membered heteroaryl and substituted with 0 or 1 group selected from halogen, —OH, —CN, —NH$_2$, C1-C4 alkyl, C1-C4 haloalkyl, and C1-C4 alkoxy. In yet a further aspect, each of $Ar^2$ and $Ar^3$, when present, is independently selected from aryl, 5-membered heteroaryl, and 6-membered heteroaryl and monosubstituted with a group selected from halogen, —OH, —CN, —NH$_2$, C1-C4 alkyl, C1-C4 haloalkyl, and C1-C4 alkoxy. In an even further aspect, each of $Ar^2$ and $Ar^3$, when present, is independently selected from aryl, 5-membered heteroaryl, and 6-membered heteroaryl and unsubstituted.

In a further aspect, each of $Ar^2$ and $Ar^3$, when present, is aryl substituted with 0, 1, 2, or 3 groups independently selected from halogen, —OH, —CN, —NH$_2$, C1-C4 alkyl, C1-C4 haloalkyl, and C1-C4 alkoxy. In a still further aspect, each of $Ar^2$ and $Ar^3$, when present, is aryl substituted with 0, 1, or 2 groups independently selected from halogen, —OH, —CN, —NH$_2$, C1-C4 alkyl, C1-C4 haloalkyl, and C1-C4 alkoxy. In yet a further aspect, each of $Ar^2$ and $Ar^3$, when present, is aryl substituted with 0 or 1 group selected from halogen, —OH, —CN, —NH$_2$, C1-C4 alkyl, C1-C4 haloalkyl, and C1-C4 alkoxy. In an even further aspect, each of $Ar^2$ and $Ar^3$, when present, is aryl monosubstituted with a group selected from halogen, —OH, —CN, —NH$_2$, C1-C4 alkyl, C1-C4 haloalkyl, and C1-C4 alkoxy. In a still further aspect, each of $Ar^2$ and $Ar^3$, when present, is unsubstituted aryl.

In a further aspect, each of $Ar^2$ and $Ar^3$, when present, is phenyl substituted with 0, 1, 2, or 3 groups independently selected from halogen, —OH, —CN, —NH$_2$, C1-C4 alkyl, C1-C4 haloalkyl, and C1-C4 alkoxy. In a still further aspect, each of $Ar^2$ and $Ar^3$, when present, is phenyl substituted with 0, 1, or 2 groups independently selected from halogen, —OH, —CN, —NH$_2$, C1-C4 alkyl, C1-C4 haloalkyl, and C1-C4 alkoxy. In yet a further aspect, each of $Ar^2$ and $Ar^3$, when present, is phenyl substituted with 0 or 1 group selected from halogen, —OH, —CN, —NH$_2$, C1-C4 alkyl, C1-C4 haloalkyl, and C1-C4 alkoxy. In an even further aspect, each of $Ar^2$ and $Ar^3$, when present, is phenyl monosubstituted with a group selected from halogen, —OH, —CN, —NH$_2$, C1-C4 alkyl, C1-C4 haloalkyl, and C1-C4 alkoxy. In a still further aspect, each of $Ar^2$ and $Ar^3$, when present, is unsubstituted phenyl.

In a further aspect, each of $Ar^2$ and $Ar^3$, when present, is independently selected from 5-membered heteroaryl and 6-membered heteroaryl and substituted with 0, 1, 2, or 3 groups independently selected from halogen, —OH, —CN, —NH$_2$, C1-C4 alkyl, C1-C4 haloalkyl, and C1-C4 alkoxy. In a still further aspect, each of $Ar^2$ and $Ar^3$, when present, is independently selected from 5-membered heteroaryl and 6-membered heteroaryl and substituted with 0, 1, or 2 groups independently selected from halogen, —OH, —CN, —NH$_2$, C1-C4 alkyl, C1-C4 haloalkyl, and C1-C4 alkoxy. In yet a further aspect, each of $Ar^2$ and $Ar^3$, when present, is independently selected from 5-membered heteroaryl and 6-membered heteroaryl and substituted with 0 or 1 group selected from halogen, —OH, —CN, —NH$_2$, C1-C4 alkyl, C1-C4 haloalkyl, and C1-C4 alkoxy. In an even further aspect, each of $Ar^2$ and $Ar^3$, when present, is independently selected from 5-membered heteroaryl and 6-membered heteroaryl and monosubstituted with a group selected from halogen, —OH, —CN, —NH$_2$, C1-C4 alkyl, C1-C4 haloalkyl, and C1-C4 alkoxy. In a still further aspect, each of $Ar^2$ and $Ar^3$, when present, is independently selected from 5-membered heteroaryl and 6-membered heteroaryl and unsubstituted.

In a further aspect, each of $Ar^2$ and $Ar^3$, when present, is 5-membered heteroaryl substituted with 0, 1, 2, or 3 groups independently selected from halogen, —OH, —CN, —NH$_2$, C1-C4 alkyl, C1-C4 haloalkyl, and C1-C4 alkoxy. In a still further aspect, each of $Ar^2$ and $Ar^3$, when present, is 5-membered heteroaryl substituted with 0, 1, or 2 groups independently selected from halogen, —OH, —CN, —NH$_2$, C1-C4 alkyl, C1-C4 haloalkyl, and C1-C4 alkoxy. In yet a further aspect, each of $Ar^2$ and $Ar^3$, when present, is 5-membered heteroaryl substituted with 0 or 1 group selected from halogen, —OH, —CN, —NH$_2$, C1-C4 alkyl, C1-C4 haloalkyl, and C1-C4 alkoxy. In an even further aspect, each of $Ar^2$ and $Ar^3$, when present, is 5-membered heteroaryl monosubstituted with a group selected from halogen, —OH, —CN, —NH$_2$, C1-C4 alkyl, C1-C4 haloalkyl, and C1-C4 alkoxy. In a still further aspect, each of $Ar^2$ and $Ar^3$, when present, is unsubstituted 5-membered heteroaryl.

In a further aspect, each of $Ar^2$ and $Ar^3$, when present, is selected from furanyl, thiophenyl, pyrrolyl, imidazolyl, pyrazolyl, and triazolyl and substituted with 0, 1, 2, or 3 groups independently selected from halogen, —OH, —CN, —NH$_2$, C1-C4 alkyl, C1-C4 haloalkyl, and C1-C4 alkoxy. In a still further aspect, each of $Ar^2$ and $Ar^3$, when present, is selected from furanyl, thiophenyl, pyrrolyl, imidazolyl, pyrazolyl, and triazolyl and substituted with 0, 1, or 2 groups independently selected from halogen, —OH, —CN, —NH$_2$, C1-C4 alkyl, C1-C4 haloalkyl, and C1-C4 alkoxy. In yet a further aspect, each of $Ar^2$ and $Ar^3$, when present, is selected from furanyl, thiophenyl, pyrrolyl, imidazolyl, pyrazolyl, and triazolyl and substituted with 0 or 1 group selected from halogen, —OH, —CN, —NH$_2$, C1-C4 alkyl, C1-C4 haloalkyl, and C1-C4 alkoxy. In an even further aspect, each of $Ar^2$ and $Ar^3$, when present, is selected from furanyl, thiophenyl, pyrrolyl, imidazolyl, pyrazolyl, and triazolyl and monosubstituted with a group selected from halogen, —OH, —CN, —NH$_2$, C1-C4 alkyl, C1-C4 haloalkyl, and C1-C4 alkoxy. In a still further aspect, each of Ar$^2$ and Ar$^3$, when present, is selected from furanyl, thiophenyl, pyrrolyl, imidazolyl, pyrazolyl, and triazolyl and unsubstituted.

In a further aspect, each of Ar$^2$ and Ar$^3$, when present, is 6-membered heteroaryl substituted with 0, 1, 2, or 3 groups independently selected from halogen, —OH, —CN, —NH$_2$, C1-C4 alkyl, C1-C4 haloalkyl, and C1-C4 alkoxy. In a still further aspect, each of Ar$^2$ and Ar$^3$, when present, is 6-membered heteroaryl substituted with 0, 1, or 2 groups independently selected from halogen, —OH, —CN, —NH$_2$, C1-C4 alkyl, C1-C4 haloalkyl, and C1-C4 alkoxy. In yet a further aspect, each of Ar$^2$ and Ar$^3$, when present, is 6-membered heteroaryl substituted with 0 or 1 group selected from halogen, —OH, —CN, —NH$_2$, C1-C4 alkyl, C1-C4 haloalkyl, and C1-C4 alkoxy. In an even further aspect, each of Ar$^2$ and Ar$^3$, when present, is 6-membered heteroaryl monosubstituted with a group selected from halogen, —OH, —CN, —NH$_2$, C1-C4 alkyl, C1-C4 haloalkyl, and C1-C4 alkoxy. In a still further aspect, each of Ar$^2$ and Ar$^3$, when present, is unsubstituted 6-membered heteroaryl.

In a further aspect, each of Ar$^2$ and Ar$^3$, when present, is selected from pyridinyl, pyridazinyl, pyrimidinyl, pyrazinyl, and triazinyl and substituted with 0, 1, 2, or 3 groups independently selected from halogen, —OH, —CN, —NH$_2$, C1-C4 alkyl, C1-C4 haloalkyl, and C1-C4 alkoxy. In a still further aspect, each of Ar$^2$ and Ar$^3$, when present, is selected from pyridinyl, pyridazinyl, pyrimidinyl, pyrazinyl, and triazinyl and substituted with 0, 1, or 2 groups independently selected from halogen, —OH, —CN, —NH$_2$, C1-C4 alkyl, C1-C4 haloalkyl, and C1-C4 alkoxy. In yet a further aspect, each of Ar$^2$ and Ar$^3$, when present, is selected from pyridinyl, pyridazinyl, pyrimidinyl, pyrazinyl, and triazinyl and substituted with 0 or 1 group selected from halogen, —OH, —CN, —NH$_2$, C1-C4 alkyl, C1-C4 haloalkyl, and C1-C4 alkoxy. In an even further aspect, each of Ar$^2$ and Ar$^3$, when present, is selected from pyridinyl, pyridazinyl, pyrimidinyl, pyrazinyl, and triazinyl and monosubstituted with a group selected from halogen, —OH, —CN, —NH$_2$, C1-C4 alkyl, C1-C4 haloalkyl, and C1-C4 alkoxy. In a still further aspect, each of Ar$^2$ and Ar$^3$, when present, is selected from pyridinyl, pyridazinyl, pyrimidinyl, pyrazinyl, and triazinyl and unsubstituted.

D. Polyimide Blends

In one aspect, disclosed are polyimide blends comprising: (a) an ionic polymer selected from a perfluorinated ionomer membrane, a poly(acrylic acid) salt, sulfonated polystyrene, sulfonated poly(arylene ether sulfone), sulfonated poly(arylene thioether sulfone), cross-linked poly(styrene-ran-ethylene), sulfonated poly(styrene-b-ethylene-co-butylene-b-styrene), poly(fluoroalkyl methyacrylate-co-acrylic acid), poly(fluoroalkyl methacrylate-co-2-acylamido-2-methyl-1-propanesulfonic acid), poly(fluoroalkyl methacrylate-co-sulfonic acid), poly(fluoroalkyl methacrylate-co-sulfonic acid-co-2-hydroxyethyl methacrylate), poly(vinylidene-g-sulfonated N-ethylenecarbazole), poly(vinylidene fluoride-co-hexafluoropropylene), poly(ethylene-co-tetrafluoroethylene), and Nafion; and (b) a polyimide comprising at least one residue having a structure represented by a formula:

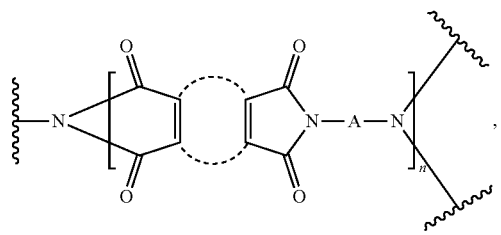

wherein

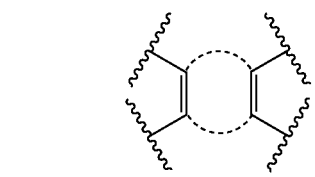

comprises a structure represented by a formula selected from:

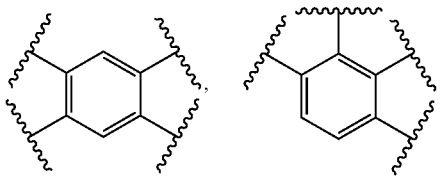

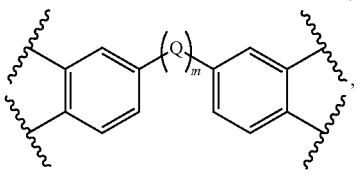

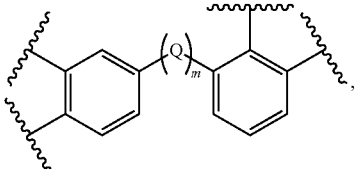

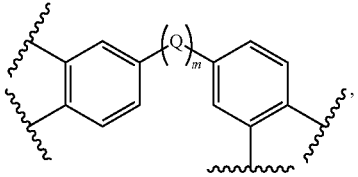

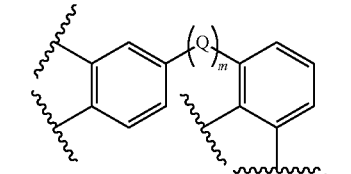

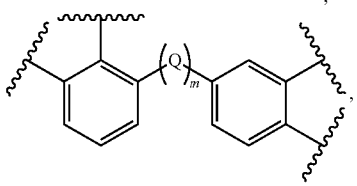

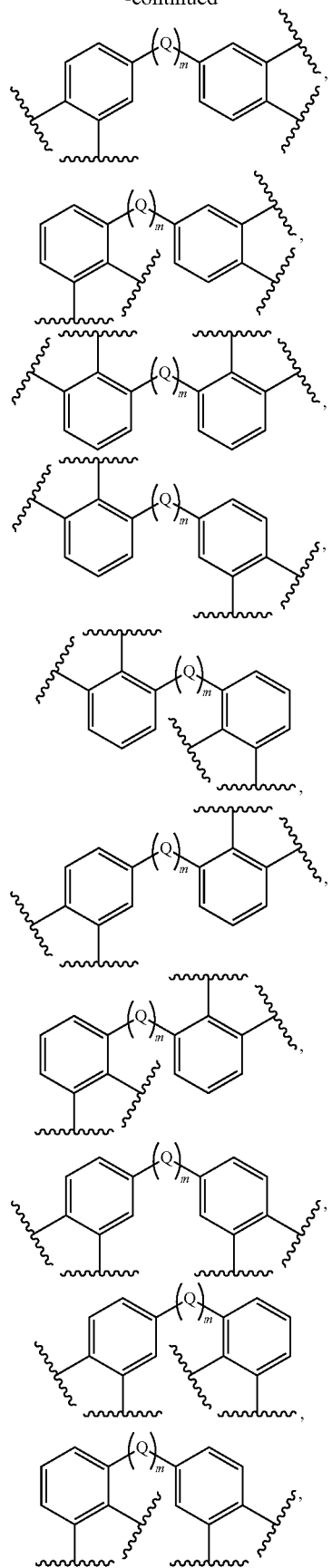
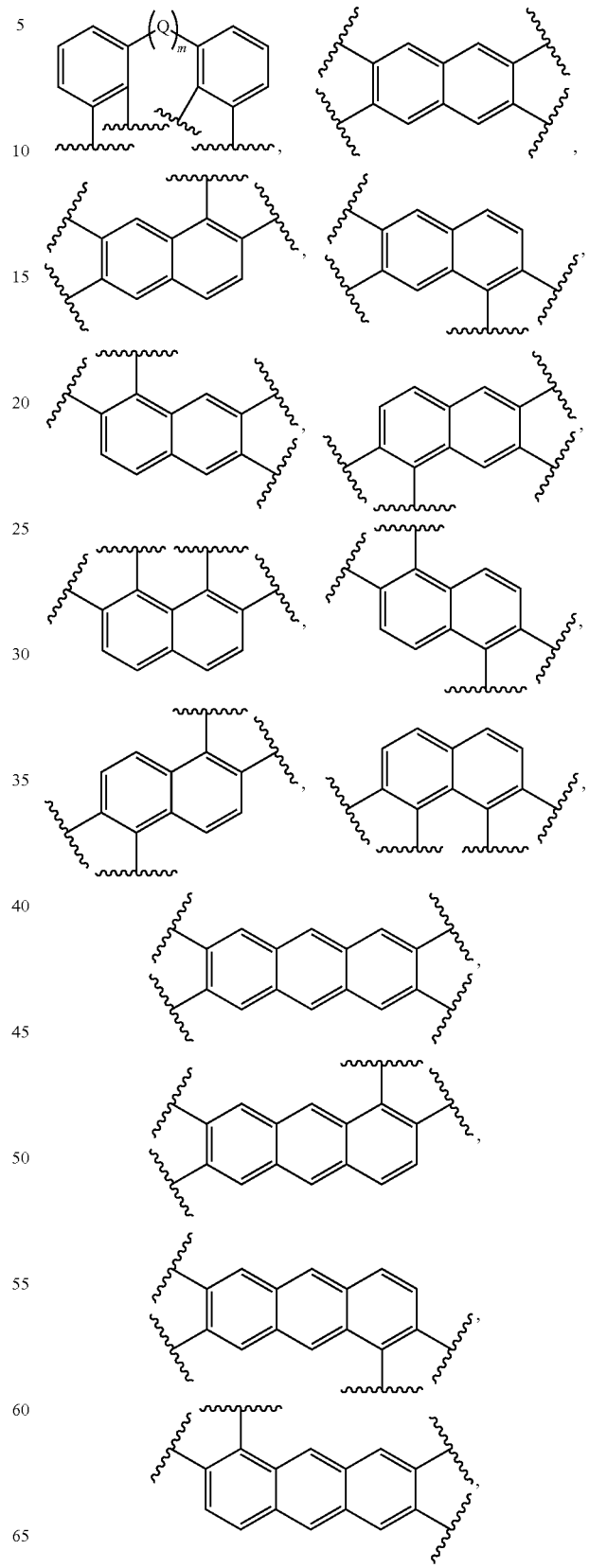

-continued

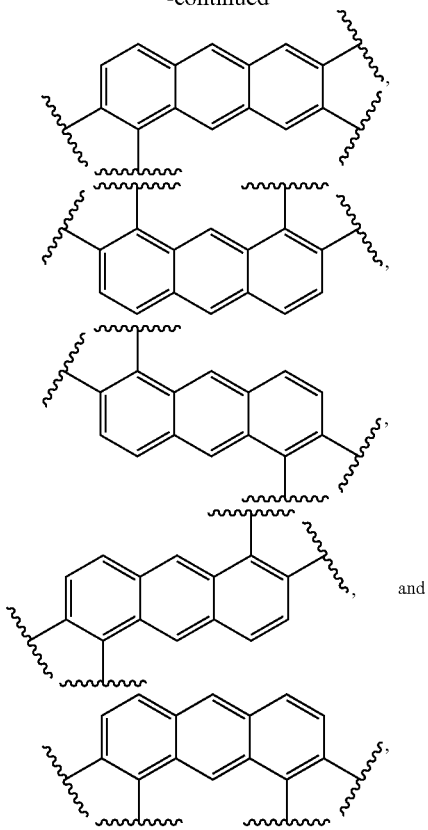
and
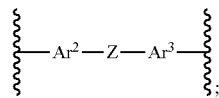

wherein n is an integer greater than 1; wherein m is 0 or 1; wherein A is selected from —Ar¹— and a structure represented by a formula:

$$\{-Ar^2-Z-Ar^3-\}$$

wherein Z, when present, is selected from O, $NR^3$, $CR^{4a}R^{4b}$, CO, and $SO_2$; wherein each of $R^3$, $R^{4a}$, and $R^{4b}$, when present, is independently selected from hydrogen, C1-C4 alkyl, and C1-C4 haloalkyl; wherein $Ar^1$, when present, is selected from aryl, 5-membered heteroaryl, and 6-membered heteroaryl and substituted with 0, 1, 2, or 3 groups independently selected from halogen, —OH, —CN, —$NH_2$, C1-C4 alkyl, C1-C4 haloalkyl, and C1-C4 alkoxy; wherein each of $Ar^2$ and $Ar^3$, when present, is independently selected from aryl, 5-membered heteroaryl, and 6-membered heteroaryl and substituted with 0, 1, 2, or 3 groups independently selected from halogen, —OH, —CN, —$NH_2$, C1-C4 alkyl, C1-C4 haloalkyl, and C1-C4 alkoxy; wherein Q, when present, is selected from O, $NR^1$, SO, $SO_2$, C(O), and $CR^{2a}R^{2b}$; and wherein each of $R^1$, $R^{2a}$, and $R^{2b}$, when present, is independently selected from hydrogen, C1-C4 alkyl, and C1-C4 haloalkyl.

Aromatic polyimides are a class of high-performance polymers most widely used as coatings for microelectronic devices and high-temperature materials for the aerospace industry (59). Without wishing to be bound by theory, a blend comprising an ionic polymer and a disclosed polyimide may offer improved thermal properties, dimensional stability, and mechanical properties. There have been some reports on developing high-performance fuel cell applications (62-67) with sulfonated polyimide polyelectrolytes. However, only limited examples are available for electromechanical applications of sulfonated PIs (68, 69). These examples utilize the lengthy chemical synthesis for sulfonated PI. Here, physical blends comprising a polyimide and an ionic polymer are described. Without wishing to be bound by theory, these blends may offer improved properties compared to ion exchange membranes comprising the ionic polymer alone.

1. Polyimides

In one aspect, the disclosed polyimide blends comprise a polyimide comprising at least one residue having a structure represented by a formula:

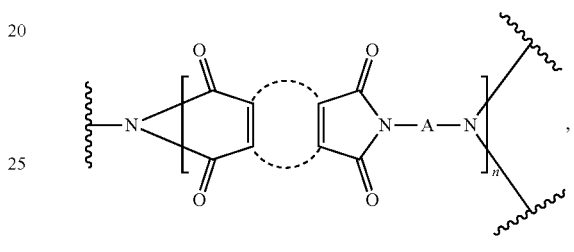

wherein

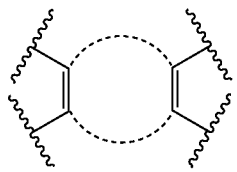

comprises a structure represented by a formula selected from:

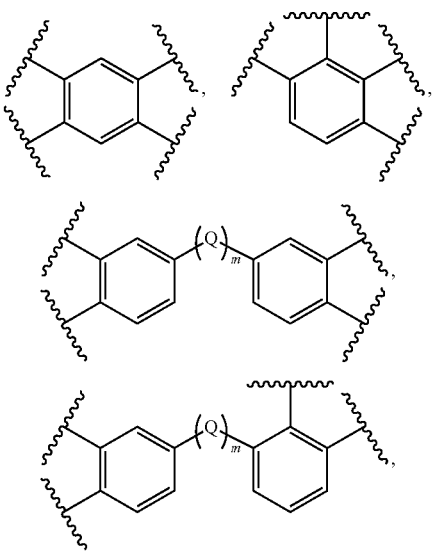

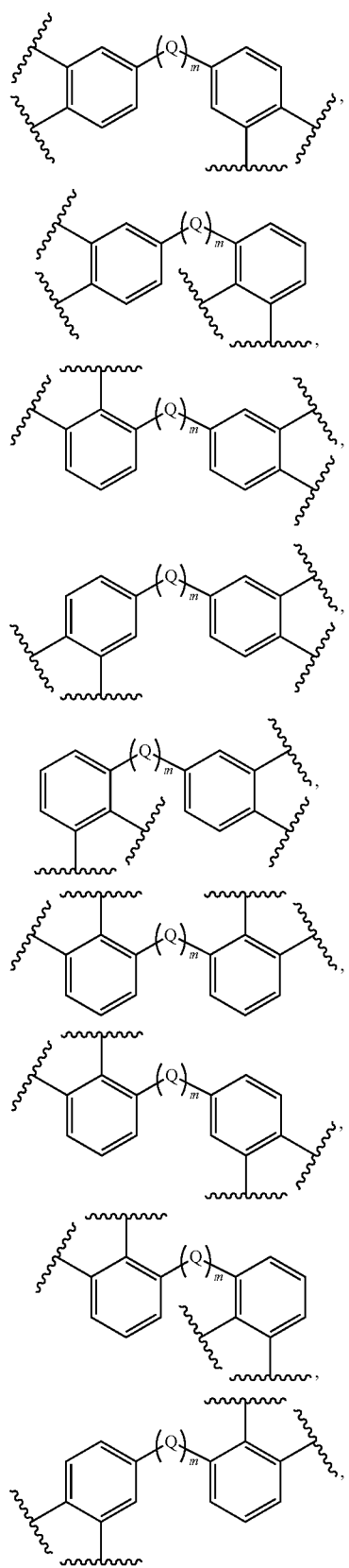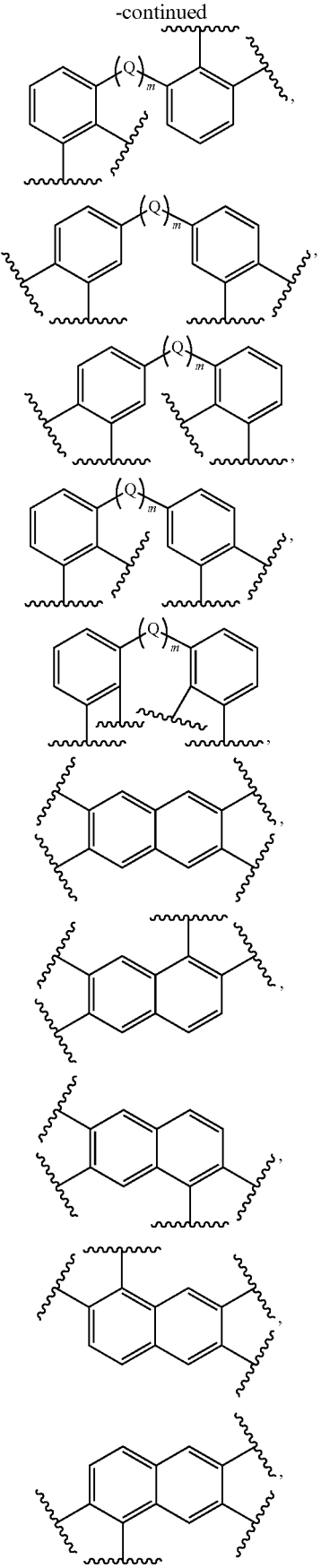

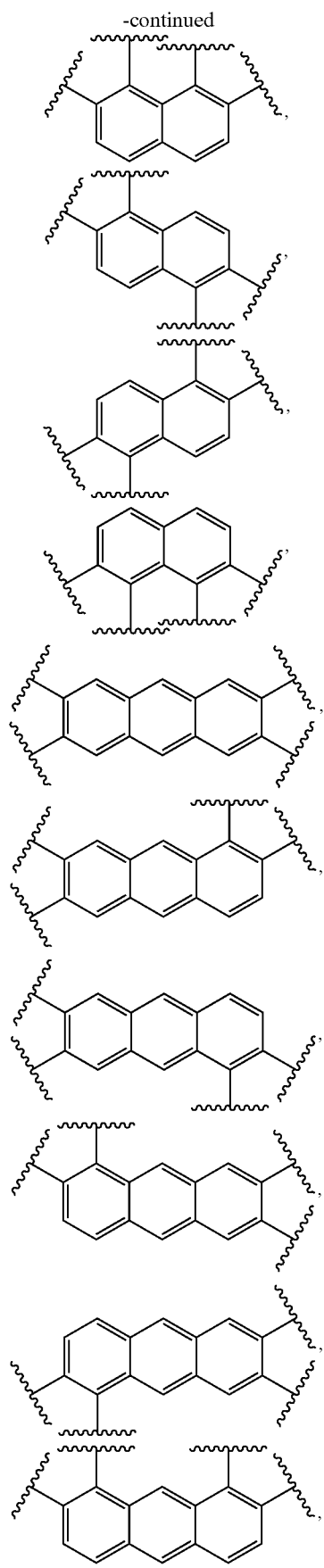

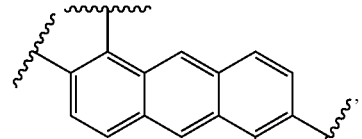

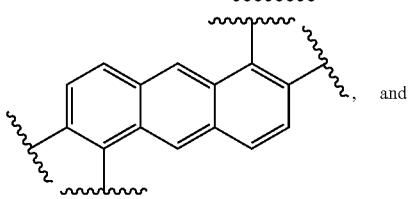

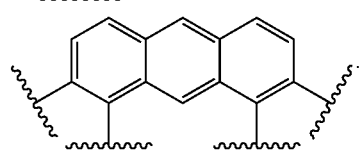

wherein n is an integer greater than 1; wherein m is 0 or 1; wherein A is selected from —Ar$^1$— and a structure represented by a formula:

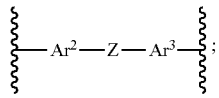

wherein Z, when present, is selected from O, NR$^3$, CR$^{4a}$R$^{4b}$, CO, and SO$_2$; wherein each of R$^3$, R$^{4a}$, and R$^{4b}$, when present, is independently selected from hydrogen, C1-C4 alkyl, and C1-C4 haloalkyl; wherein Ar$^1$, when present, is selected from aryl, 5-membered heteroaryl, and 6-membered heteroaryl and substituted with 0, 1, 2, or 3 groups independently selected from halogen, —OH, —CN, —NH$_2$, C1-C4 alkyl, C1-C4 haloalkyl, and C1-C4 alkoxy; wherein each of Ar$^2$ and Ar$^3$, when present, is independently selected from aryl, 5-membered heteroaryl, and 6-membered heteroaryl and substituted with 0, 1, 2, or 3 groups independently selected from halogen, —OH, —CN, —NH$_2$, C1-C4 alkyl, C1-C4 haloalkyl, and C1-C4 alkoxy; wherein Q, when present, is selected from O, NR$^1$, SO, SO$_2$, C(O), and CR$^{2a}$R$^{2b}$; and wherein each of R$^1$, R$^{2a}$, and R$^{2b}$, when present, is independently selected from hydrogen, C1-C4 alkyl, and C1-C4 haloalkyl.

In a further aspect, the polyimide comprises at least one residue having a structure represented by a formula:

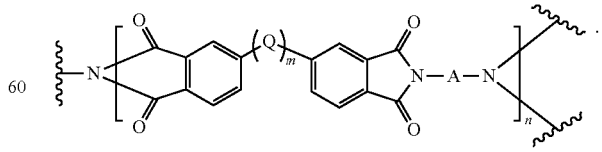

In a still further aspect, the polyimide comprises at least one residue having a structure represented by a formula selected from:

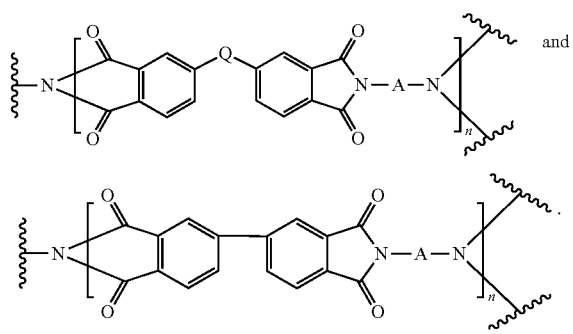

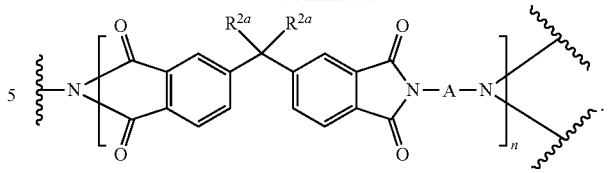

In a still further aspect, the polyimide comprises at least one residue having a structure represented by a formula selected from:

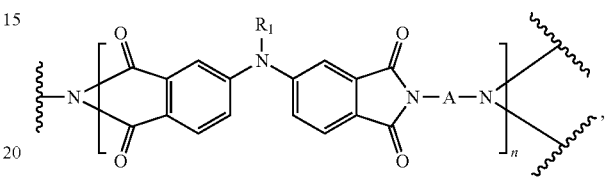

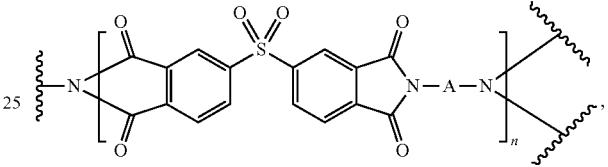

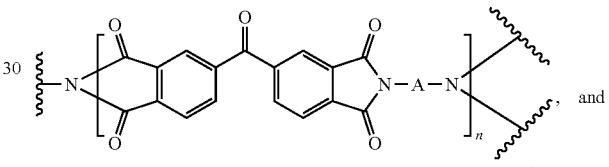

In yet a further aspect, the polyimide comprises at least one residue having a structure represented by a formula:

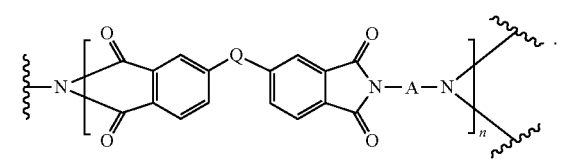

In an even further aspect, the polyimide comprises at least one residue having a structure represented by a formula selected from:

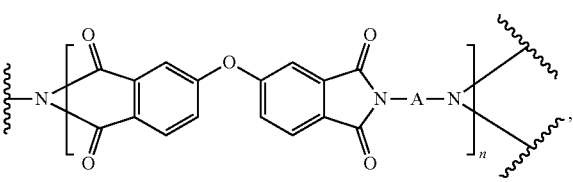

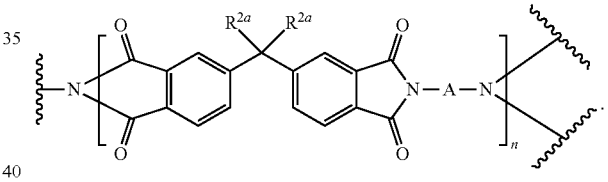

In yet a further aspect, the polyimide comprises at least one residue having a structure represented by a formula selected from:

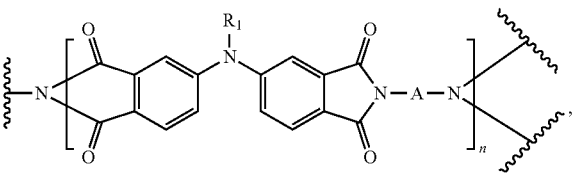

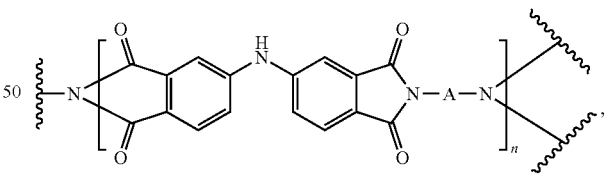

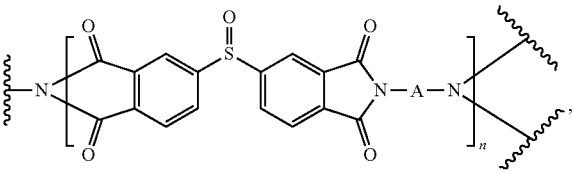

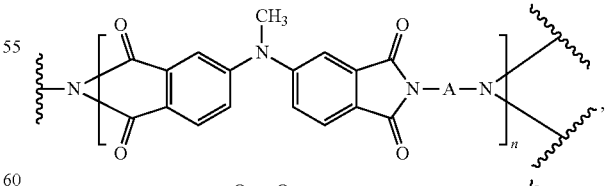

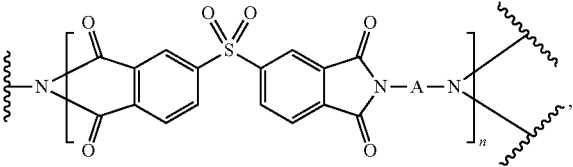

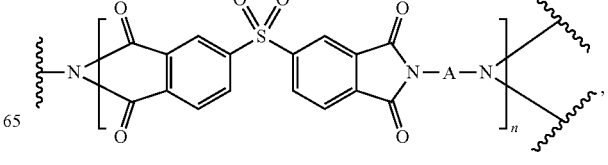

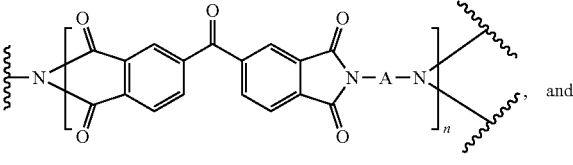

-continued

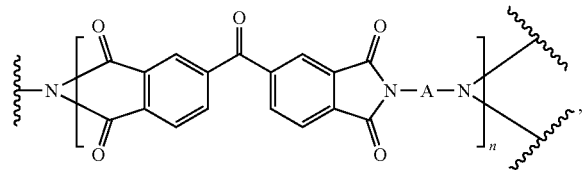

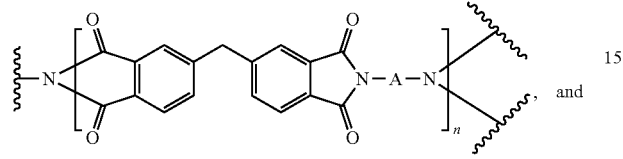

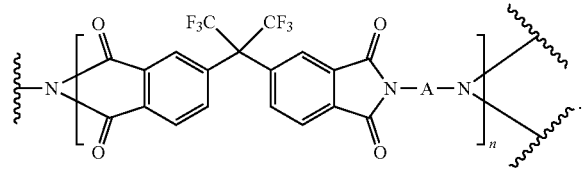

In an even further aspect, the polyimide comprises at least one residue having a structure represented by a formula:

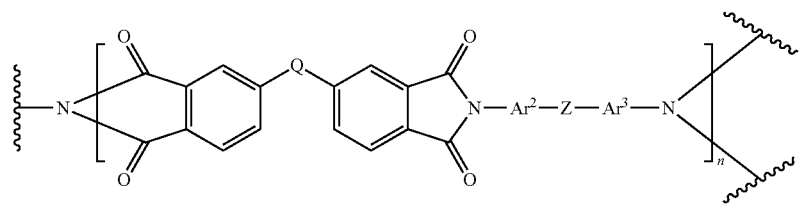

In a still further aspect, the polyimide comprises at least one residue having a structure represented by a formula:

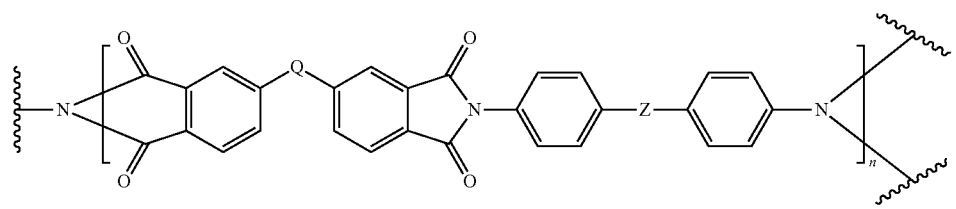

In yet a further aspect, the polyimide comprises at least one residue having a structure represented by a formula:

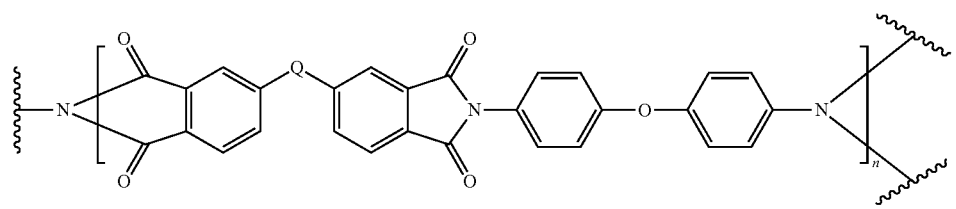

In a further aspect, the polyimide comprises at least one residue having a structure represented by a formula:

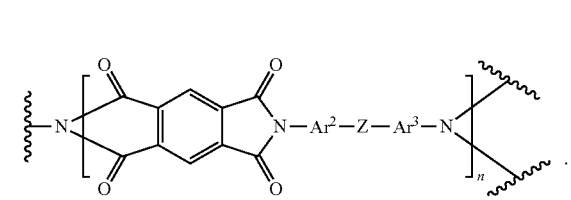

In a still further aspect, the polyimide comprises at least one residue having a structure represented by a formula:

In yet a further aspect, the polyimide comprises at least one residue having a structure represented by a formula:
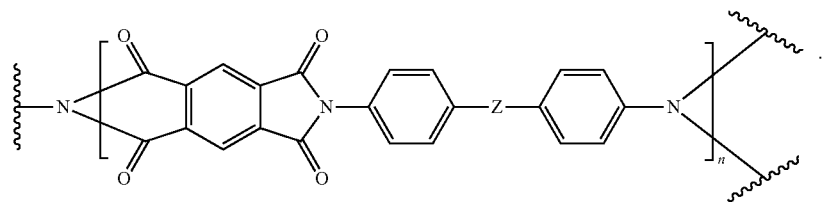
In an even further aspect, the polyimide comprises at least one residue having a structure represented by a formula:
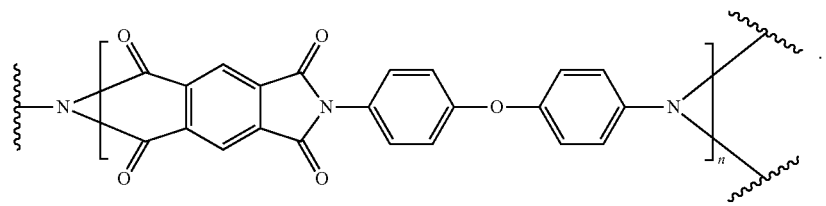
In one aspect,
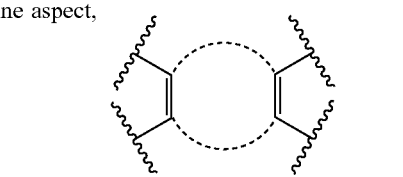
comprises a structure represented by a formula selected from:
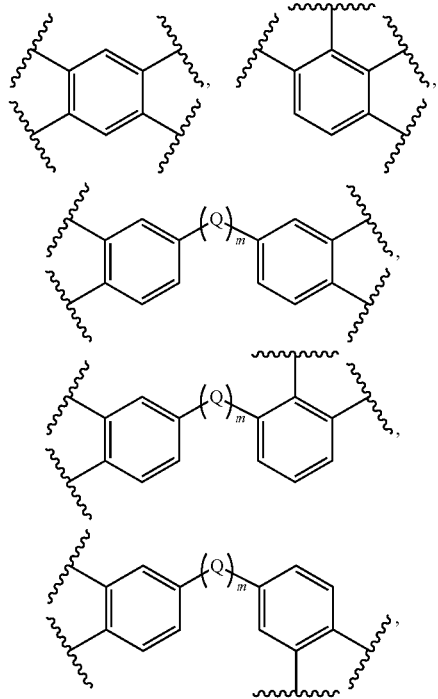
-continued
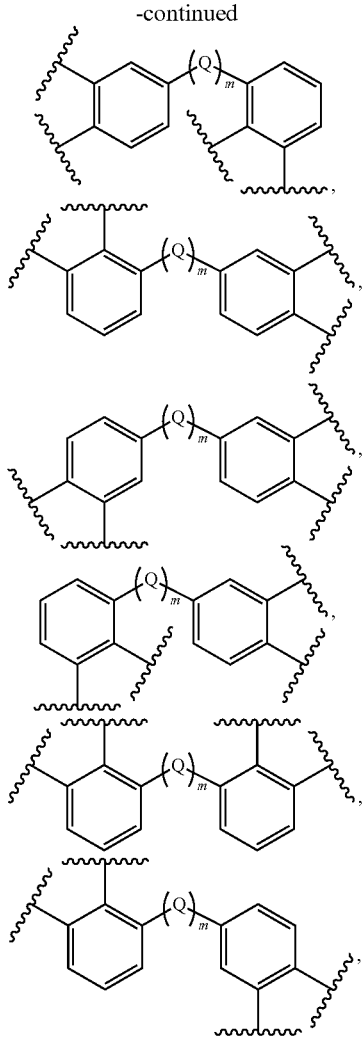

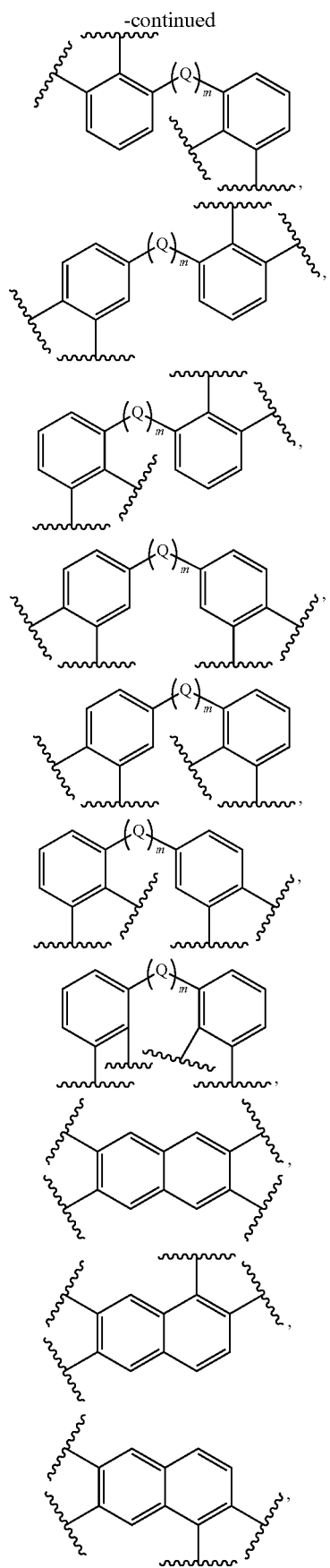

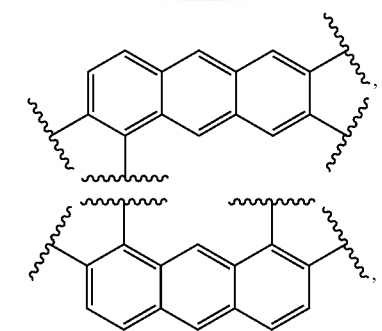
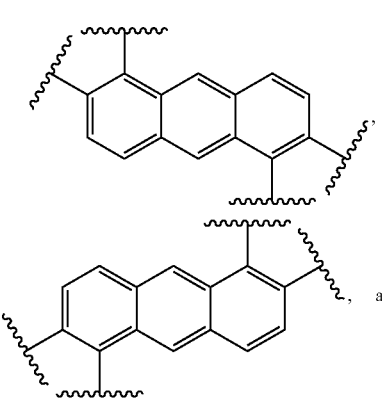
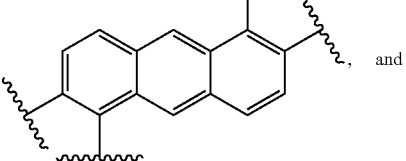
, and
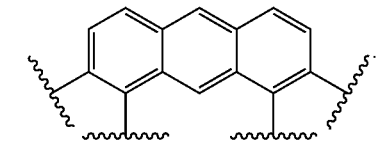
In a further aspect,
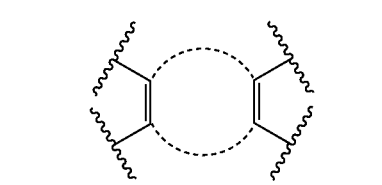
comprises a structure represented by a formula selected from:
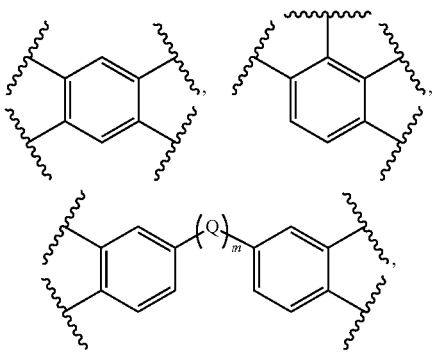
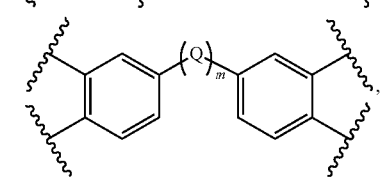
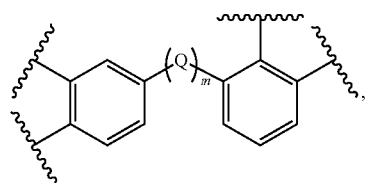
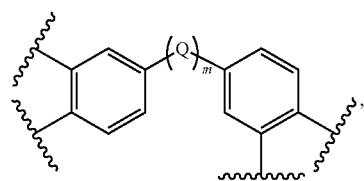
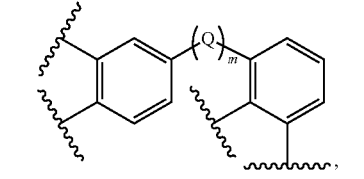
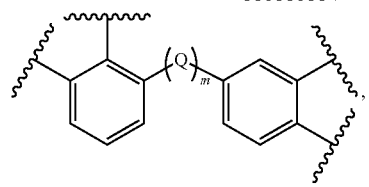
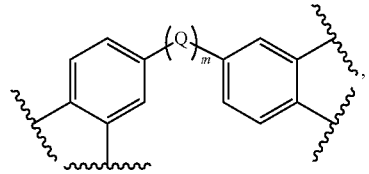
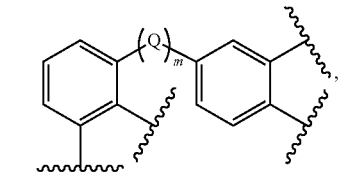
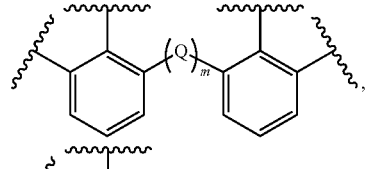
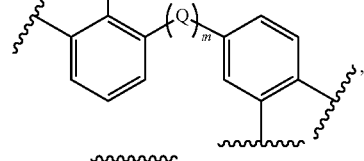
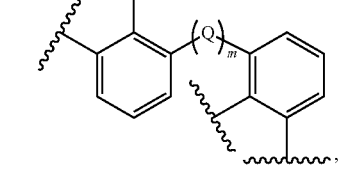

-continued
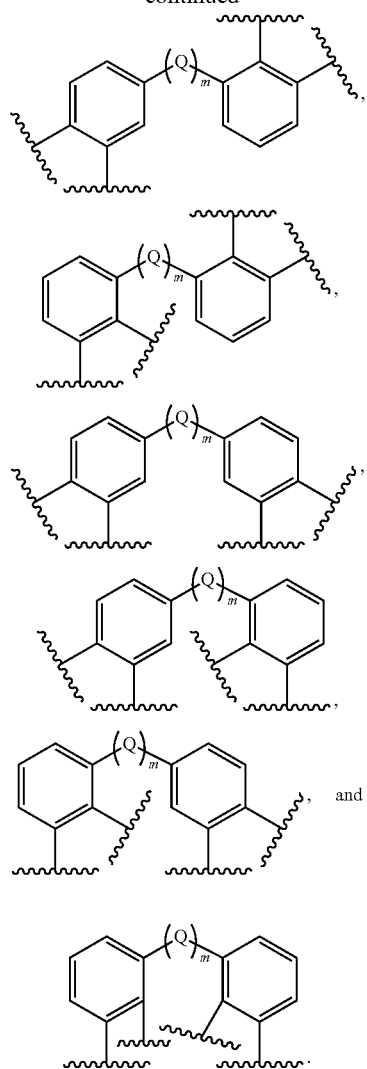
In a further aspect,
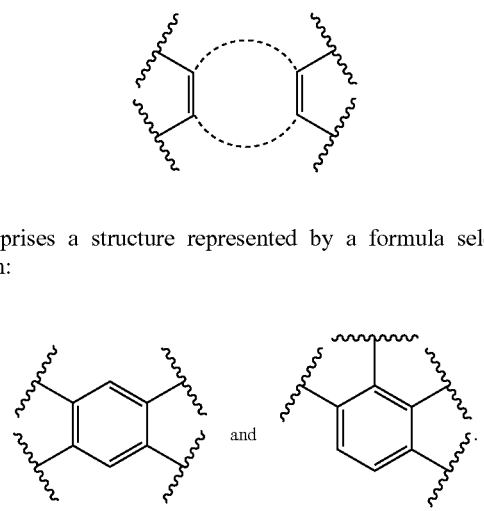
comprises a structure represented by a formula selected from:
In a still further aspect,
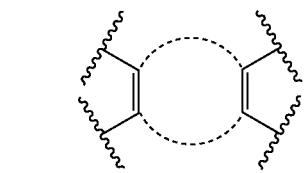
comprises a structure represented by a formula selected from:
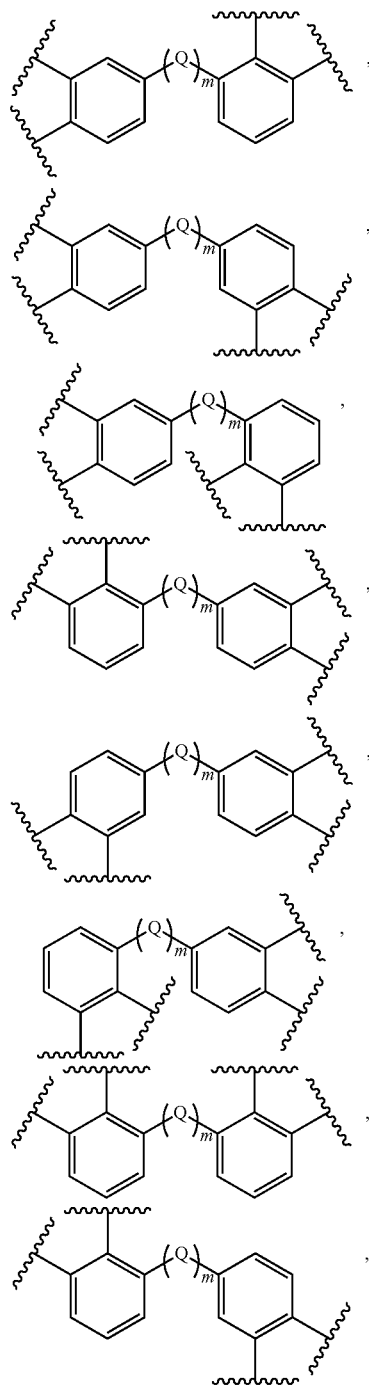

-continued
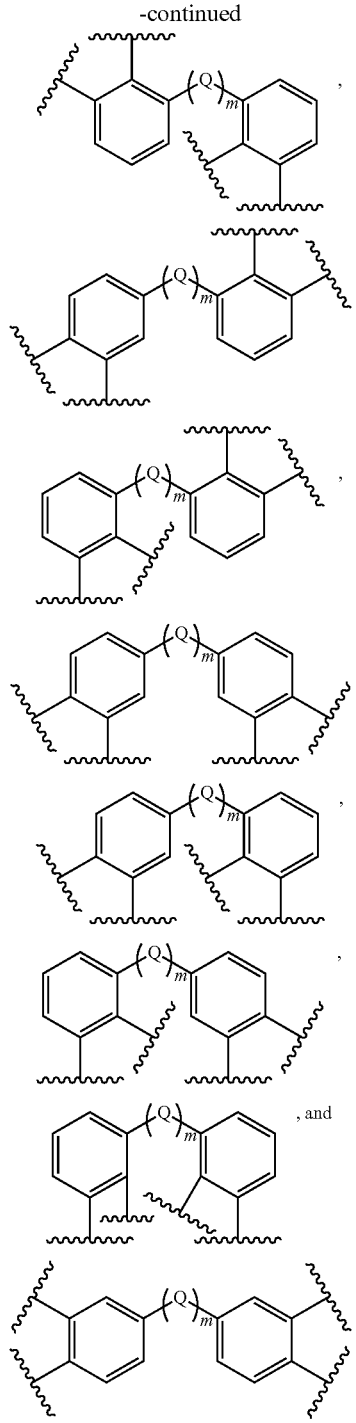
In yet a further aspect,
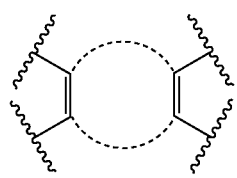
comprises a structure represented by a formula selected from:
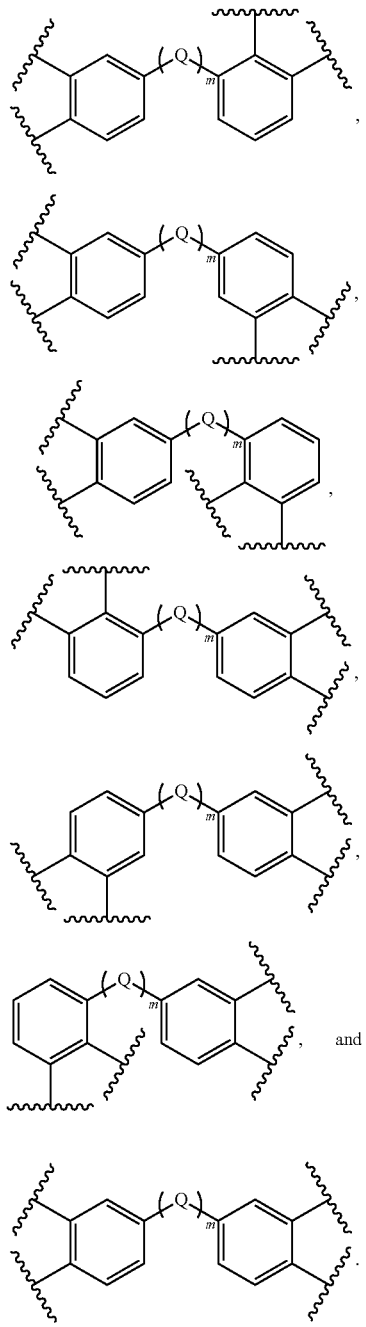
In an even further aspect,
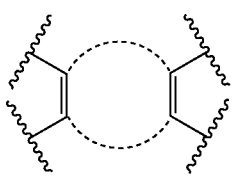

comprises a structure represented by a formula selected from:

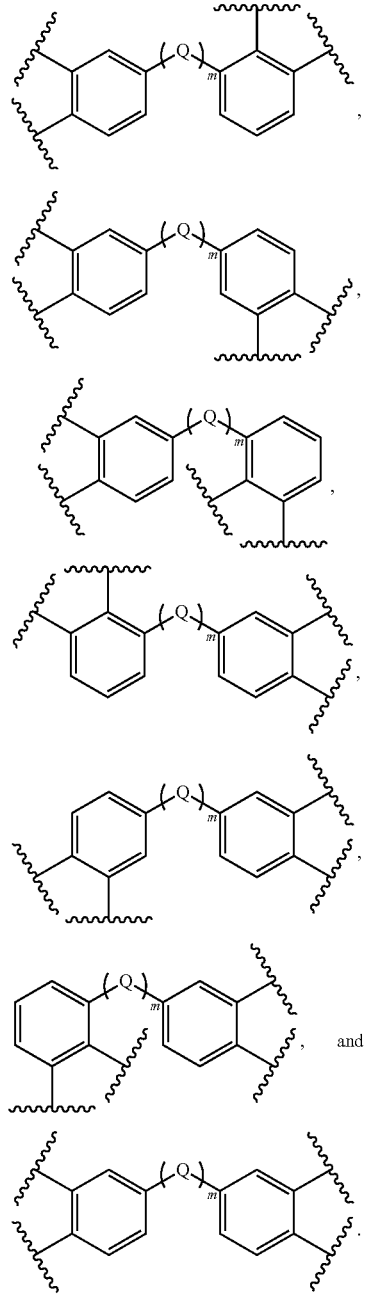

In a still further aspect,

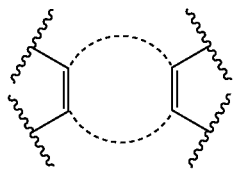

comprises a structure represented by a formula:

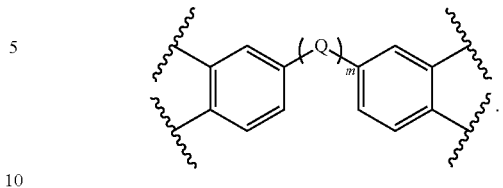

In one aspect, n is an integer greater than 1. In a further aspect, n is an integer greater than 10. In a still further aspect, n is an integer greater than 100. In yet a further aspect, n is an integer greater than 1000. In an even further aspect, n is an integer greater than 10,000. In a still further aspect, n is an integer greater than 100,000.

In one aspect, m is 0 or 1. In a further aspect, m is 0. In a still further aspect, m is 1.

2. Properties of Membranes

In various aspects, the disclosed ion exchange membranes can have various properties that provide the superior function of the membranes, including improved storage modulus, excellent elasticity, decreased damping, and excellent surface resistance. It is also understood that the membranes have other properties.

In various aspects, the membrane can have a storage modulus of from about 0.2 GPa to about 5.0 GPa. In a further aspect, the membrane can have a storage modulus of from about 0.2 GPa to about 4.0 GPa. In a still further aspect, the membrane can have a storage modulus of from about 0.2 GPa to about 3.0 GPa. In yet a further aspect, the membrane can have a storage modulus of from about 0.2 GPa to about 2.0 GPa. In an even further aspect, the membrane can have a storage modulus of from about 0.5 GPa to about 5.0 GPa. In a still further aspect, the membrane can have a storage modulus of from about 1.0 GPa to about 5.0 GPa. In yet a further aspect, the membrane can have a storage modulus of from about 2.0 GPa to about 5.0 GPa. In an even further aspect, the membrane can have a storage modulus of from about 3.0 GPa to about 5.0 GPa. In a still further aspect, the membrane can have a storage modulus of from about 0.5 GPa to about 4.0 GPa. In yet a further aspect, the membrane can have a storage modulus of from about 0.5 GPa to about 3.0 GPa. In an even further aspect, the membrane can have a storage modulus of from about 1.0 GPa to about 3.0 GPa.

In various aspects, the membrane can have a surface resistance of from about 1.0 Ω/cm to about 20.0 Ω/cm. In a further aspect, the membrane can have a surface resistance of from about 1.0 Ω/cm to about 15.0 Ω/cm. In a still further aspect, the membrane can have a surface resistance of from about 1.0 Ω/cm to about 10.0 Ω/cm. In yet a further aspect, the membrane can have a surface resistance of from about 1.0 Ω/cm to about 5.0 Ω/cm. In a still further aspect, the membrane can have a surface resistance of from about 5.0 Ω/cm to about 20.0 Ω/cm. In yet a further aspect, the membrane can have a surface resistance of from about 10.0 Ω/cm to about 20.0 Ω/cm. In an even further aspect, the membrane can have a surface resistance of from about 15.0 Ω/cm to about 20.0 Ω/cm. In a still further aspect, the membrane can have a surface resistance of from about 5.0 Ω/cm to about 15.0 Ω/cm. In yet a further aspect, the membrane can have a surface resistance of from about 5.0 Ω/cm to about 10.0 Ω/cm.

In a further aspect, the membrane exhibits an improvement in at least one property selected from elasticity, storage modulus, and surface resistance. In a still further aspect, the membrane exhibits an improvement in at least one property selected from elasticity and storage modulus. In yet a further aspect, the membrane exhibits an improvement in at least one property selected from elasticity and surface resistance. In an even further aspect, the membrane exhibits an improvement in at least one property selected from storage modulus and surface resistance. In a still further aspect, the membrane exhibits an improvement in elasticity. In yet a further aspect, the membrane exhibits an improvement in storage modulus. In an even further aspect, the membrane exhibits an improvement in surface resistance.

E. Methods of Making Polyimide Blends

In one aspect, the invention relates to methods of making a polyimide blend, the method comprising: (a) mixing an ionic polymer selected from a perfluorinated ionomer membrane, a poly(acrylic acid) salt, sulfonated polystyrene, sulfonated poly(arylene ether sulfone), sulfonated poly (arylene thioether sulfone), cross-linked poly(styrene-ran-ethylene), sulfonated poly(styrene-b-ethylene-co-butylene-b-styrene), poly(fluoroalkyl methyacrylate-co-acrylic acid), poly(fluoroalkyl methacrylate-co-2-acylamido-2-methyl-1-propanesulfonic acid), poly(fluoroalkyl methacrylate-co-sulfonic acid), poly(fluoroalkyl methacrylate-co-sulfonic acid-co-2-hydroxyethyl methacrylate), poly(vinylidene-g-sulfonated N-ethylenecarbazole), poly(vinylidene fluoride-co-hexafluoropropylene), poly(ethylene-co-tetrafluoroethylene), and Nafion, and a poly(amic acid) comprising at least one residue having a structure represented by a formula selected from:

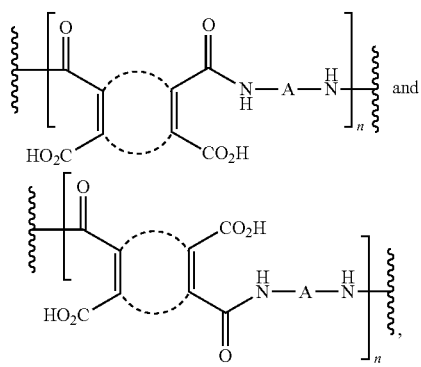

wherein

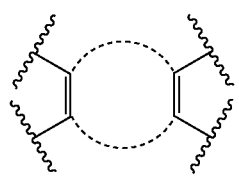

comprises a structure represented by a formula selected from:

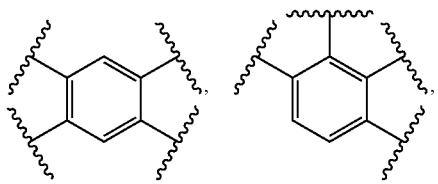

-continued

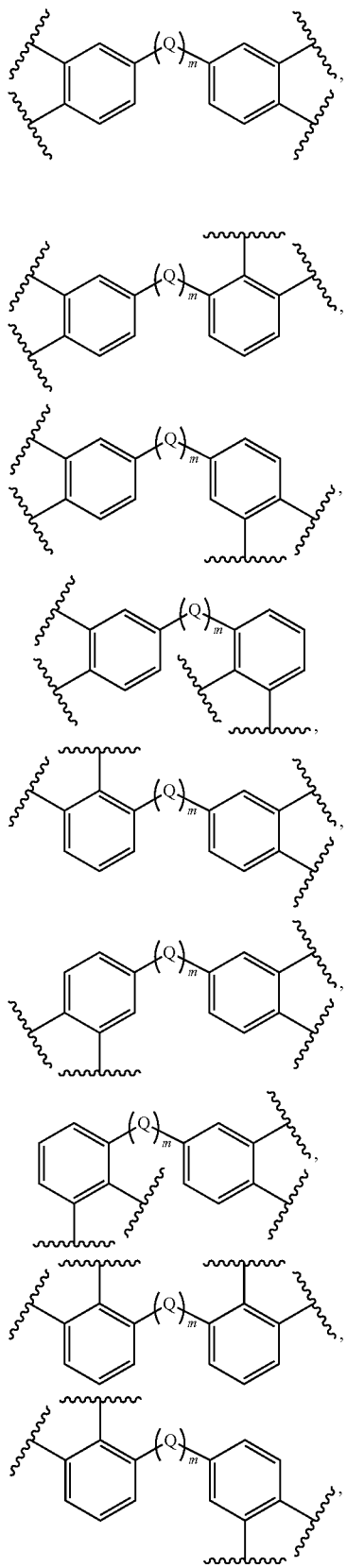

-continued
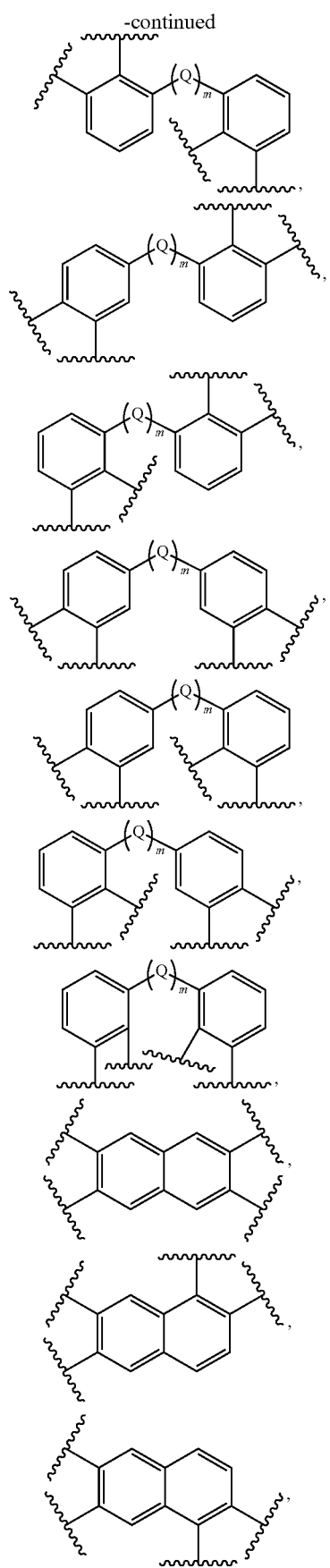
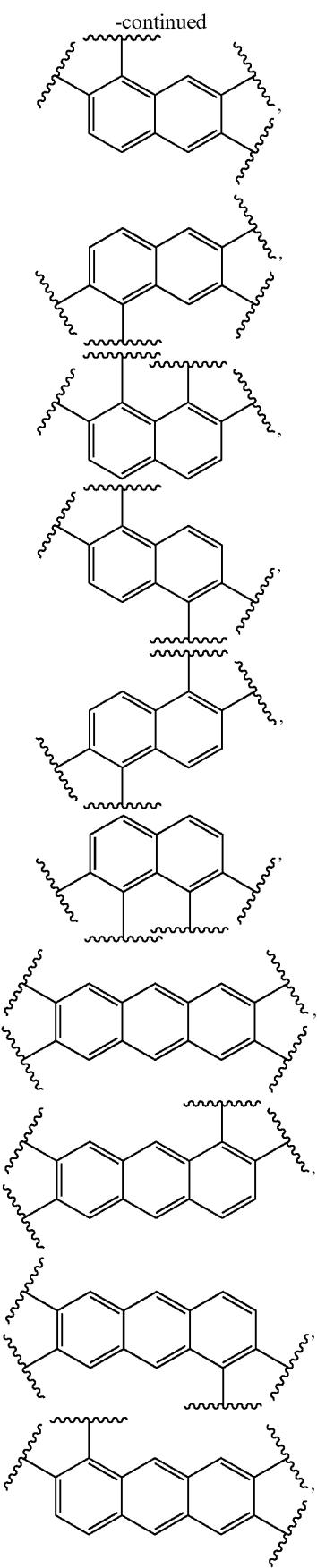

-continued

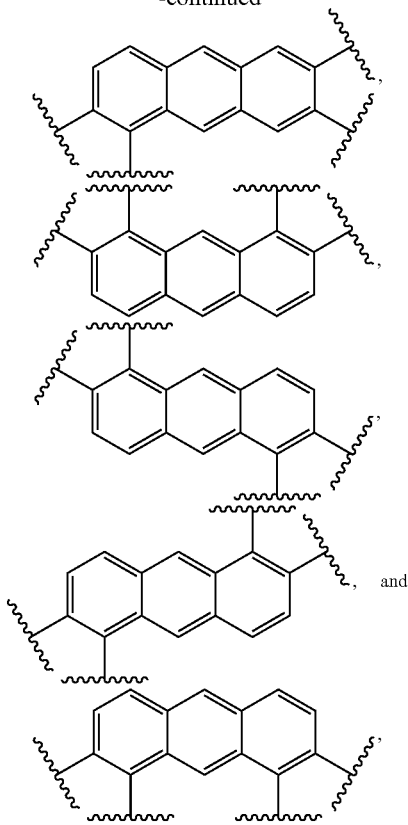
and wherein n is an integer greater than 1; wherein m is 0 or 1; wherein A is selected from —Ar¹— and a structure represented by a formula:

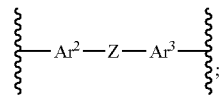

wherein Z, when present, is selected from O, NR³, CR⁴ᵃR⁴ᵇ, CO, and SO₂; wherein each of R³, R⁴ᵃ, and R⁴ᵇ, when present, is independently selected from hydrogen, C1-C4 alkyl, and C1-C4 haloalkyl; wherein Ar¹, when present, is selected from aryl, 5-membered heteroaryl, and 6-membered heteroaryl and substituted with 0, 1, 2, or 3 groups independently selected from halogen, —OH, —CN, —NH₂, C1-C4 alkyl, C1-C4 haloalkyl, and C1-C4 alkoxy; wherein each of Ar² and Ar³, when present, is independently selected from aryl, 5-membered heteroaryl, and 6-membered het-eroaryl and substituted with 0, 1, 2, or 3 groups independently selected from halogen, —OH, —CN, —NH₂, C1-C4 alkyl, C1-C4 haloalkyl, and C1-C4 alkoxy; wherein Q, when present, is selected from O, NR¹, SO, SO₂, C(O), and CR²ᵃR²ᵇ; and wherein each of R¹, R²ᵃ, and R²ᵇ, when present, is independently selected from hydrogen, C1-C4 alkyl, and C1-C4 haloalkyl, thereby making a poly(amic acid) blend; and (b) cyclizing the poly(amic acid) blend.

In a further aspect, the ionic polymer is Nafion.

In a further aspect, the poly(amic acid)) comprises at least one residue having a structure:

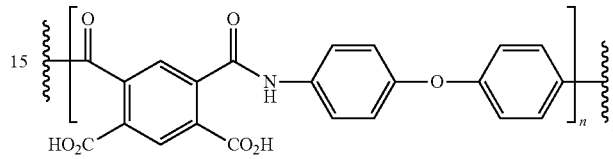

In a further aspect, the poly(amic acid) is present in solution. In a still further aspect, the poly(amic acid) solution comprises an aprotic polar solvent. In yet a further aspect, the aprotic polar solvent is selected from N,N-dimethylformamide and N-methyl-2-pyrrolidone.

In a further aspect, the aprotic polar solvent is present in an amount of from about 95 wt % to about 99 wt % of the poly(amic acid) solution. In a still further aspect, the aprotic polar solvent is present in an amount of about 95 wt % of the poly(amic acid) solution.

In a further aspect, the poly(amic acid) solution is present in an amount of from about 20 wt % to about 50 wt %.

In a further aspect, the ionic polymer is present in solution and the poly(amic acid) is present in solution, and wherein the ionic polymer and the poly(amic acid) together have a concentration of from about 0.01 g/mL to about 6 g/mL. In a still further aspect, the ionic polymer is present in solution and the poly(amic acid) is present in solution, and wherein the ionic polymer and the poly(amic acid) together have a concentration of from about 0.03 g/mL to about 6 g/mL.

In a further aspect, mixing is blending. In a still further aspect, mixing is solution-casting. In yet a further aspect, solution-casting is performed at a temperature of from about 50° C. to about 100° C. In an even further aspect, solution-casting is performed at a temperature of from about 40° C. to about 90° C.

In a further aspect, cyclizing is via heat. In a still further aspect, the heat is applied at a temperature of from about 180° C. to about 250° C.

In a further aspect, the heat is applied for from about 12 h to about 36 h.

In a further aspect, the heat is applied under vacuum, nitrogen, or helium.

In a further aspect, the polyimide comprises at least one residue having a structure:

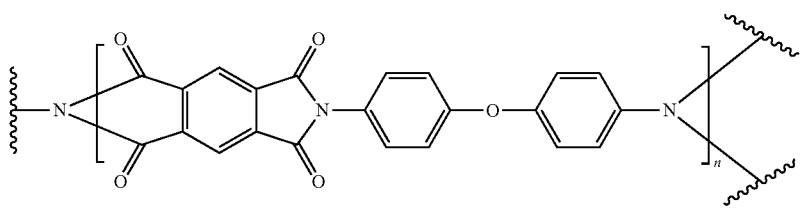

In a further aspect, the method further comprises plating a metal electrode onto the polyimide blend. In a still further aspect, the metal is Pt.

In a further aspect, the method further comprises modifying at least one surface of a polymeric membrane with the polyimide blend. In a still further aspect, modifying is via a bond. In yet a further aspect, modifying comprises coating the surface with the polyimide blend. In an even further aspect, modifying comprises exposing the surface to a light source.

In a further aspect, the method further comprises modifying at least one surface of a polymeric membrane with the polyimide blend. In a still further aspect, modifying is via a bond. In yet a further aspect, modifying comprises coating the surface with the polyimide blend. In an even further aspect, modifying comprises exposing the surface to a light source.

In a further aspect, the membrane exhibits an improvement in at least one property selected from elasticity, storage modulus, and surface resistance. In a still further aspect, the membrane exhibits an improvement in at least one property selected from elasticity and storage modulus. In yet a further aspect, the membrane exhibits an improvement in at least one property selected from elasticity and surface resistance. In an even further aspect, the membrane exhibits an improvement in at least one property selected from storage modulus and surface resistance. In a still further aspect, the membrane exhibits an improvement in elasticity. In yet a further aspect, the membrane exhibits an improvement in storage modulus. In an even further aspect, the membrane exhibits an improvement in surface resistance.

F. Experimental

The following examples are put forth so as to provide those of ordinary skill in the art with a complete disclosure and description of how the compounds, compositions, articles, devices and/or methods claimed herein are made and evaluated, and are intended to be purely exemplary of the invention and are not intended to limit the scope of what the inventors regard as their invention. Efforts have been made to ensure accuracy with respect to numbers (e.g., amounts, temperature, etc.), but some errors and deviations should be accounted for. Unless indicated otherwise, parts are parts by weight, temperature is in ° C. or is at ambient temperature, and pressure is at or near atmospheric.

1. Materials

Poly(pyromellitic dianhydride-co-4,4'-oxydianiline), amic acid solution (11 wt %±5 wt % in NMP/aromatic hydrocarbons (80%/20% solvent ratio)) was purchased from Sigma-Aldrich. Alcohol-based Nafion dispersion (5 wt %) and NMP were purchased from DuPont™ and TCI, respectively and were used for preparation of the blend membranes. Tetraammineplatinum (II) chloride hydrate ($Pt(NH_3)_4Cl_2 \cdot xH_2O$), ammonium hydroxide ($NH_4OH$), and sodium borohydride ($NaBH_4$) were purchased from Sigma-Aldrich and used for platinum plating. Hydrazine monohydrate ($H_2NN_2 \cdot H_2O$) and hydroxylamine hydrochloride ($H_2NOH \cdot HCl$) were purchased from Sigma-Aldrich and used as the reducing agents. Lithium chloride (LiCl) was purchased from Sigma-Aldrich. Deionized (D.I.) water was used to clean the membrane and to prepare IPMCs.

2. Membrane Preparation

The membrane of Nafion was provided by solution casting of 30 mL of Nafion dispersion (5 wt %, d: 0.87 g/mL) in a polystyrene mold (r=3.0 cm, 1.9 depth) at 50° C. overnight. PI membrane was provided by solution casting of 12 mL of poly(pyromellitic dianhydride-co-4,4'-oxydianiline), amic acid solution (11 wt %±5 wt % in NMP/aromatic hydrocarbons (80%/20% solvent ratio), d: 1.066 g/mL) in aluminum foil mold (r=2.3 cm, 1.27 cm depth) at 85° C. overnight.

Figure 1B:
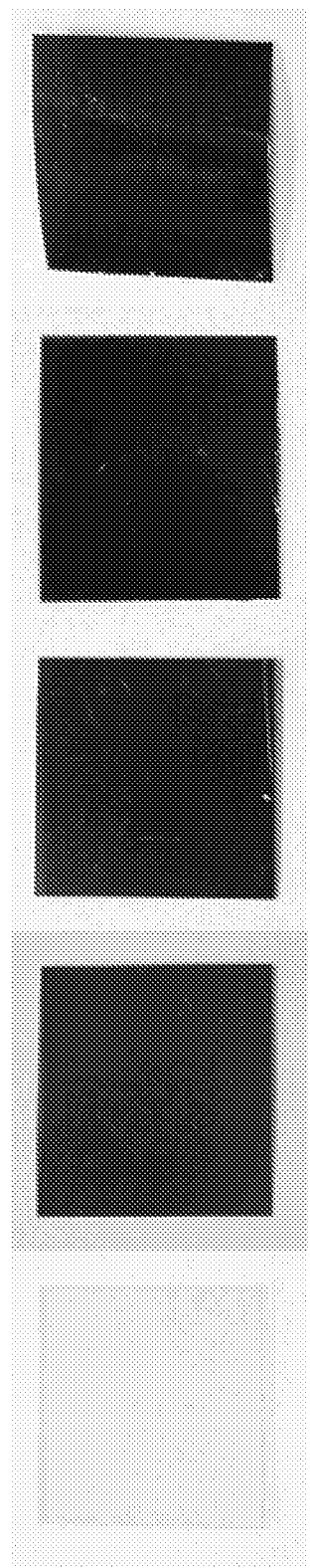
FIG. 1B shows representative images of prepared membranes after thermal imidization (left to right: Nafion, NPI-6, NPI-12, NPI-18, and NPI-30; size=1.0×1.0 cm).

Blend membranes of Nafion and PAA were prepared by solution casting of 21 mL of mixed Nafion solution (5 wt %) with PAA/NMP solution (1.26 wt %) through the following procedures. At first, 11 wt % PAA solution (5.33 g, 5 mL) and NMP (41.36 g, 40 mL) were added in a 100-mL beaker and stirred at room temperature for 1 hour. This 1.26 wt % PAA solution (amount of PAA solution used for samples, NPI-6: 3.7 mL, 0.044 g, NPI-12: 6.6 mL, 0.086 g, NPI-18: 8.8 mL, 0.115 g, and NPI-30: 4.3 mL, 3.9 g) was mixed with 5 wt % Nafion (amount of Nafion solution used for samples, NPI-6: 17.3 mL, 15.05 g, NPI-12: 14.4 mL, 12.53 g, NPI-18: 12.2 mL, 10.61 g, and NPI-30: 10.5 mL, 9.1 g) and the mixtures were stirred at 70° C. for NPI-6 (due to small amount of NMP) and room temperature for NPI-12, NPI-18, and NPI-30 for 1 hour. NPI-6, NPI-12, and NPI-18 were stirred at 60° C. overnight to evaporate solvent in a 50 mL beaker covered with Kimwipes®. In the case of NPI-30, temperature was set to 50° C. since less solvent needed to be evaporated. The solutions were cooled to room temperature. None of the solutions precipitated, so each solution was poured into an aluminum foil mold (r=2.3 cm, 1.27 cm in depth). As shown in FIG. 1A, the mold was placed in a desiccator connected to house vacuum and bubbles are removed for 10-20 minutes before casting. For samples NPI-6, NPI-12, and NPI-18, the mold was placed on a hot plate and was heated at 85° C. overnight. For NPI-30, the mold was placed in an oven at 70° C. for 2 days, since the same condition as other blends produced very brittle film. The cast membranes were taken out of the molds and placed in vacuum oven at 180° C. for 12 hours for thermal imidization to obtain Nafion/PI blend membranes. The photographs of prepared membranes are shown in FIG. 1B and the detailed composition of materials is summarized in Table 1.

As shown in Table 1, NPI-6, NPI-12, NPI-18, and NPI-30 were named based on the weight ratio of PI to Nafion after drying solvents. The total amount of PI and Nafion in unit area respectively were calculated in mg/cm$^2$ and the weight ratio of the two components.

TABLE 1

| Samples | Wt % ratio (PI:Nafion) | Total amount of PI (mg/cm$^2$) | Total amount of Nafion (mg/cm$^2$) | Casting condition | Thickness (μm) |
| --- | --- | --- | --- | --- | --- |
| Nafion | 0:100 | — | 46.3 | 50° C., 5 hrs | 340 |
| NPI-6 | 6:94 | 3.01 | 45.2 | 85° C., overnight | 278 |
| NPI-12 | 12:88 | 5.42 | 38 | | 285 |
| NPI-18 | 18:82 | 7.22 | 31.9 | | 290 |

TABLE 1-continued

| Samples | Wt % ratio (PI:Nafion) | Total amount of PI (mg/cm$^2$) | Total amount of Nafion (mg/cm$^2$) | Casting condition | Thickness (μm) |
|---|---|---|---|---|---|
| NPI-30 | 30:70 | 11.7 | 27.4 | 70° C., 2 days | 310 |
| PI | 100:0 | 38.6 | — | 85° C., overnight | 350 |

3. Fabrication of IPMCs

The membranes were sanded with sandpaper (800/1000 counts) in order to deposit more platinum particles onto the inner surface by increasing the surface area. It also helps increase the contact area of polymer and electrode. Sanding needs to be done in the direction perpendicular to the bending direction of the IPMC. After sanding, all membranes were cleaned to remove impurities before progressing to the primary plating process. Membranes were cleaned in 3 wt % $H_2O_2$ solution at 70° C. for 40 minutes, 1 M $H_2SO_4$ aqueous solution at 60° C. for 40 minutes, D.I. water at 70° C. for 40 minutes, 1 M $H_2SO_4$ aqueous solution at 60° C. for 40 minutes, followed by cleaning in D.I. water at 40° C. for 40 minutes.

The next step, primary plating is an impregnation-reduction process on the roughened inner surface of the membranes. Membranes were soaked in 0.02M Pt (II) salt solution (tetraammineplatinum (II) chloride hydrate, $Pt(NH_3)_4Cl_2.xH_2O$) for 3.5 h and rinsed with D.I. water several times. To metalize the surface of the membranes, they were immersed in 350 mL aqueous solution containing $NH_4OH$ (0.3 mL) and $NaBH_4$ (0.2 g) at 60° C. for 2 h. 0.2 g of $NaBH_4$ was added every 0.5 h. Membranes were cleaned in 1 M $H_2SO_4$ aqueous solution at 60° C. for 40 minutes, D.I. water at 70° C. for 40 minutes, 1 M $H_2SO_4$ aqueous solution at 60° C. for 40 minutes, followed by cleaning in D.I. water at 40° C. for 40 minutes. The primary plating procedure was repeated three times.

The secondary plating was processed to develop platinum on the outer surface of the membrane, on top of the inner platinum layer, to reduce the surface resistance of the electrode. The membranes were soaked in 350 mL of aqueous solution containing Pt (II) salt (0.2 g) and two reducing agents, 20 wt % $H_2NNH_2.H_2O$ solution (1 mL) and 5 wt % $H_2NOH.HCl$ solution (2 mL) at 50° C. for 1 h and then 60° C. for 3 h. The reducing agents were added every 30 minutes for 4 h. Then, the composites were cleaned in 1 M $H_2SO_4$ aqueous solution at 60° C. for 40 minutes, D.I. water at 70° C. for 40 minutes, 1 M $H_2SO_4$ aqueous solution at 60° C. for 40 minutes, followed by cleaning in D.I. water at 40° C. for 40 minutes. If the resistance is greater than 10-15 Ω/cm, the entire procedure should be done up to two times. After all the process was done, the membranes were placed in 1 M LiCl solution overnight in order to replace protons with lithium ions. The platinum layers were successfully plated on to the surfaces of the membranes without cracks.

Figures 2A, 2B, 2C:
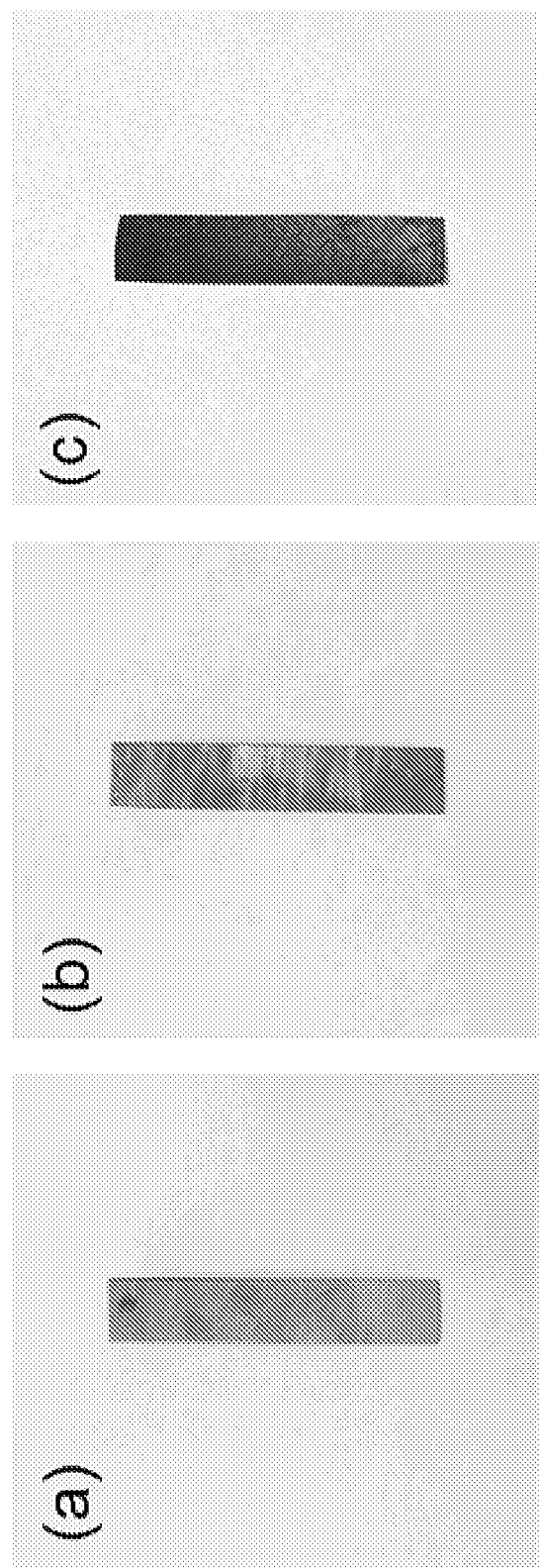
FIG. 2A-C show representative images of fabricated IPMCs. Specifically, Nafion 117 (2A), NPI-18 (2B), and NPI-30 (2C) are shown.

The obtained IPMCs were cut into 0.5×2.5 cm rectangular shapes for further characterizations. The measured electrode surface resistance of the prepared IPMCs after each plating step is summarized in Table 2. As mentioned earlier, solution casted Nafion, NPI-6, and NPI-12 show relatively high surface resistance that ranges 4.7-20.2 Ω/cm while NPI-18, NPI-30, and Nafion 117 show values less than 2 Ω/cm, which are reasonable compared to previous work (Palmre et al. (2014) *Scientific Reports* 4: 6176). The photographic images of NPI-18 (2A), NPI-30 (2B), and Nafion 117 (2C) IPMCs are shown in FIG. 2A-C.

TABLE 2

| Samples | 1$^{st}$ Primary plating (Ω/cm) | 2$^{nd}$ Primary plating (Ω/cm) | 3$^{rd}$ Primary plating (Ω/cm) | Secondary plating (Ω/cm) |
|---|---|---|---|---|
| Nafion (solution casted) | 33.8-45.7 | 21.0-28.0 | 14.1-18.8 | 11.1-20.2 |
| NPI-6 | 11.1-14.2 | 10.8-13.3 | 8.1-9.2 | 4.7-7.7 |
| NPI-12 | 13.2-15.1 | 11.1-12.9 | 8.8-9.4 | 5.6-8.2 |
| NPI-18 | 3.3-5.1 | 2.2-2.5 | 1.6-1.9 | 1.1-1.5 |
| NPI-30 | 3.3-5.2 | 2.2-2.6 | 1.5-1.8 | 0.9-1.6 |
| Nafion 117 | 4.2-5.3 | 2.8-3.1 | 1.6-1.9 | 1.3-1.7 |

4. FT-IR Spectra

FT-IR spectra were obtained using IRTracer-100 (Shimadzu) equipped with an attenuated total reflectance (ATR) accessory (MIRacle™, PIKE Technologies) to characterize the chemical structures of membranes.

Figure 3B:
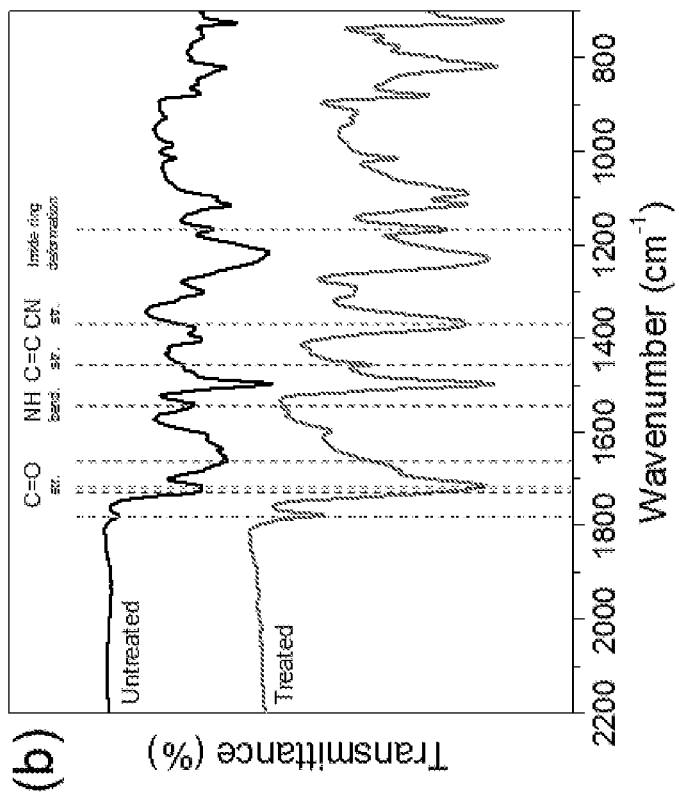
FIG. 3A and FIG. 3B show representative FT-IR spectra of PAA film (untreated) and PI film (treated) before and after thermal imidization for regions 4000-700 $cm^{-1}$ (3A) and 2200-700 $cm^{-1}$ (3B).
Figure 3A:
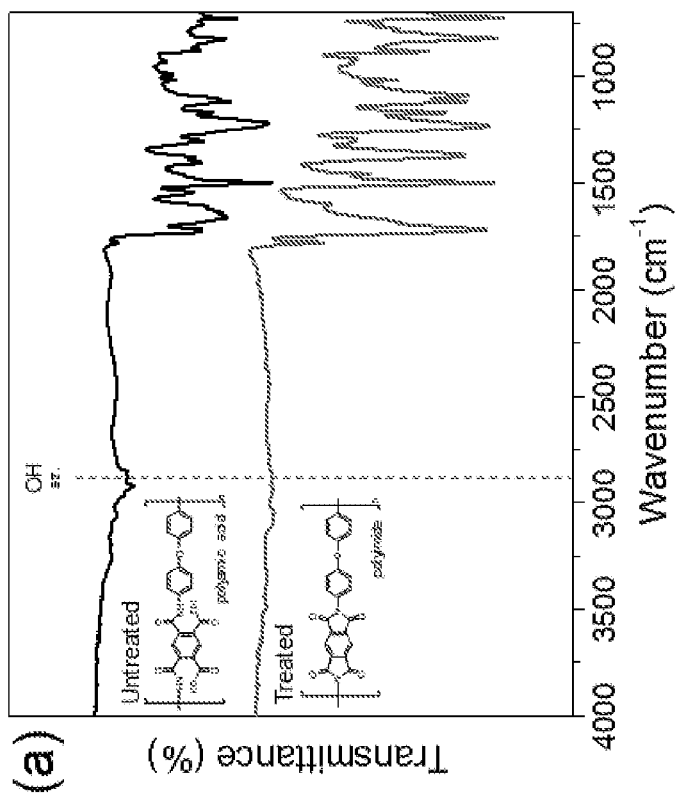

The samples were characterized by Fourier Transform Infrared Spectroscopy (FT-IR) after the imidization at 180° C. for 12 h in vacuum to confirm that they were successfully imidized and both PI and Nafion components are in the blend membranes. FIG. 3A and FIG. 3B show spectra of PAA membrane and PI membrane before and after thermal imidization, which were compared as reference. Untreated PAA membrane showed peaks at 1714 cm$^{-1}$ (C=O stretching, carboxylic), 1657 cm$^{-1}$ (C=O stretching, amide), and 1540 cm$^{-1}$ (N—H bending) (Kumar et al. (2016) *Data in Brief* 7: 123-128). After thermal imidization, 1714 cm$^{-1}$ (C=O stretching, carboxylic) and 1657 cm$^{-1}$ (C=O stretching, amide) were replaced with 1774 cm$^{-1}$ (C=O stretching, asymmetric) and 1712 cm$^{-1}$ (C=O stretching, symmetric) which are characteristic to PI. Moreover, other peaks at 1453 cm$^{-1}$ (C=C stretching), 1367 cm$^{-1}$ (C—N stretching, imide), and 1163 cm$^{-1}$ (imide ring deformation) appeared, which indicated the successful thermal imidization (Kumar et al. (2016) *Data in Brief* 7: 123-128).

Figures 4A, 4B:
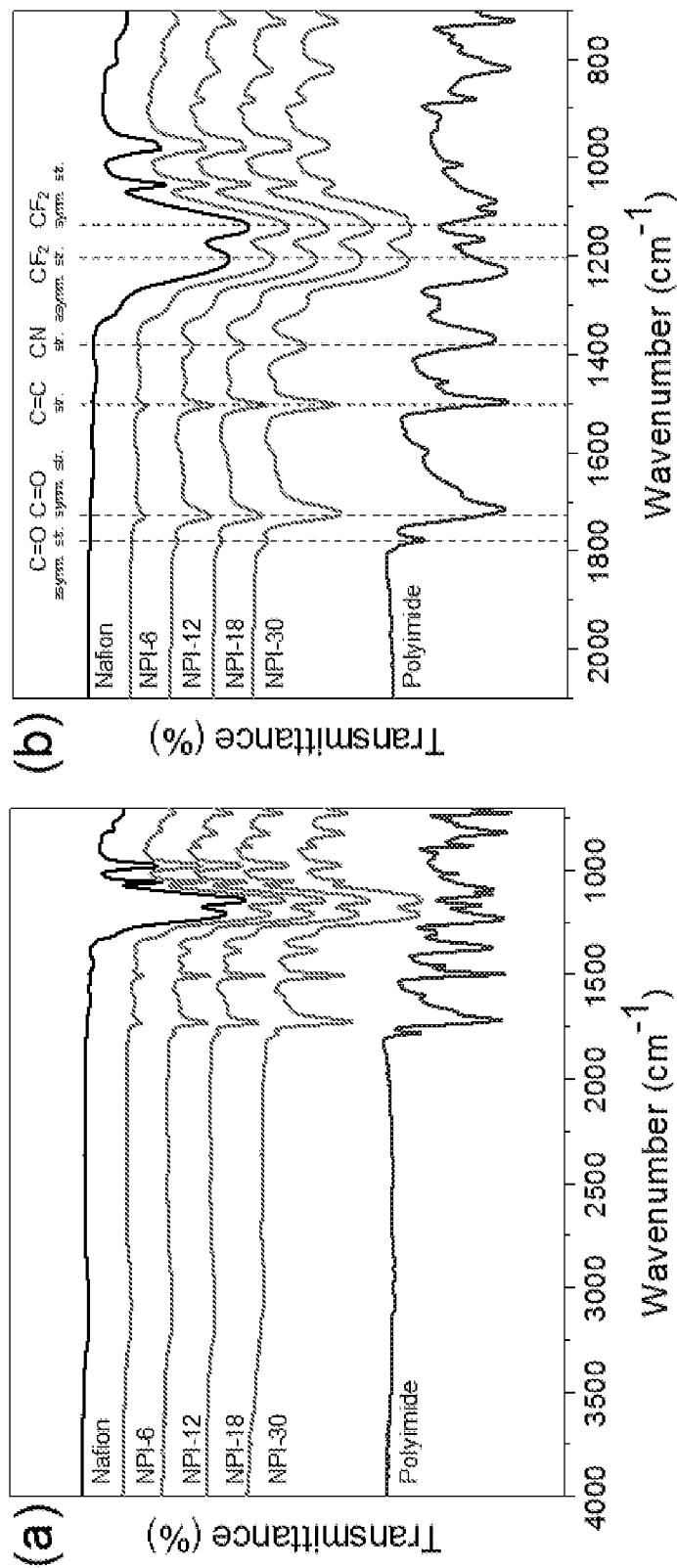
FIG. 4A and FIG. 4B show representative FT-IR spectra of Nafion, NPI-6, NPI-12, NPI-18, NPI-30, and polyimide for regions 4000-700 $cm^{-1}$ (4A) and 2200-700 $cm^{-1}$ (4B).

As shown in FIG. 4A and FIG. 4B, the blend membranes NPI-6, NPI-12, NPI-18, and NPI-30 showed peaks at 1780 cm$^{-1}$ (C=O stretching, asymmetric), 1730 cm$^{-1}$ (C=O stretching, symmetric), 1502 cm$^{-1}$ (C=C stretching), and 1383 cm$^{-1}$ (C—N stretching, imide). These peaks are characteristic to PI, confirming that the thermal imidization was successful and that PI is present in the blend membranes. Also, peaks at 1205 cm$^{-1}$ (C—F stretching, asymmetric) and 1144 cm$^{-1}$ (C—F stretching, symmetric) which are characteristic to Nafion were shown in NPI-6, NPI-12, NPI-18, and NPI-30, confirming the presence of Nafion in the blend membranes (Laporta et al. (1999) *Physical Chemistry Chemical Physics* 1: 4619-4628). From FT-IR results, we confirmed the success of thermal imidization as well as incorporation of both polymers, PI and Nafion, in the blend membranes.

5. Thermal Properties

Figures 5A, 5B:
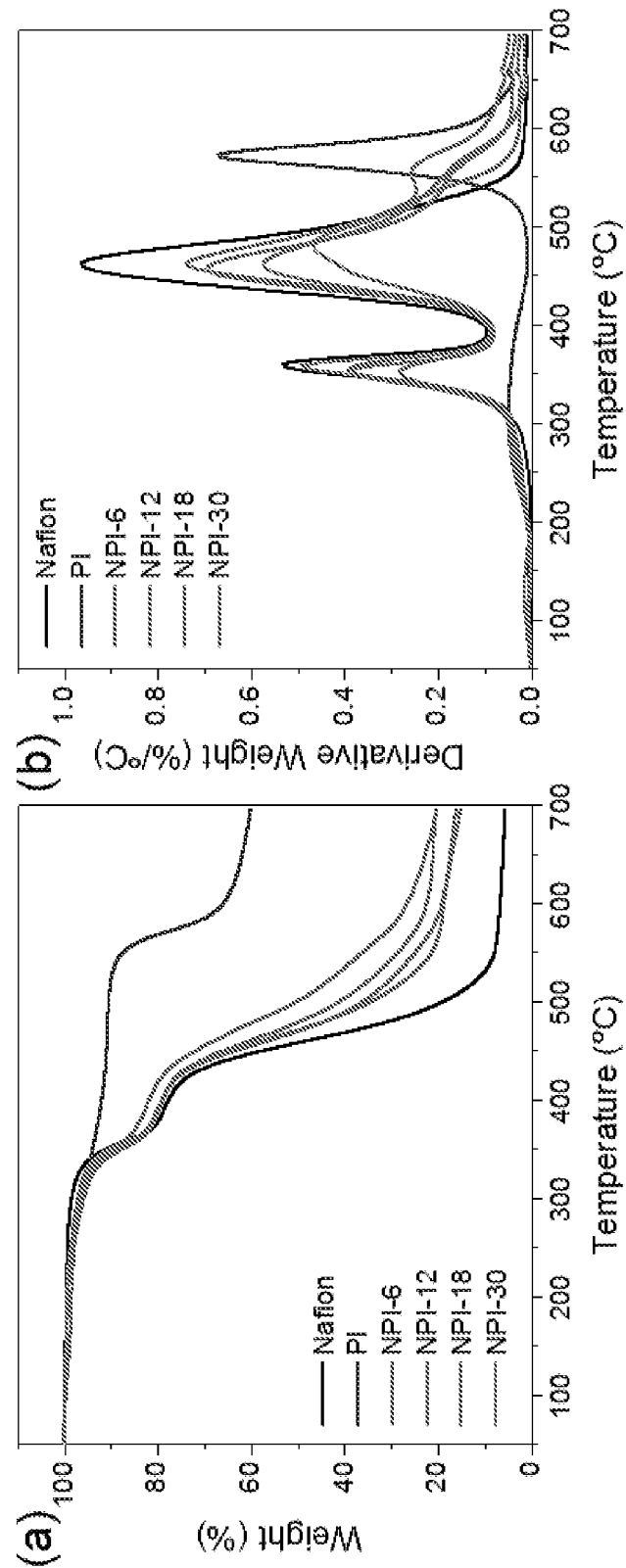
FIG. 5A and FIG. 5B show representative TGA (4A) and TGA derivative curve (4B) of the membranes using the Q500 (TA) increasing temperature 30-700° C., heating rate 10° C./min in nitrogen environment.

Thermal properties were investigated by TGA (Q500, TA instruments). The characterization was done at room temperature under nitrogen atmosphere, heating rate of 10° C./min. As shown in FIG. 5A and FIG. 5B, PI membrane is stable at temperatures up to 550° C. It shows a distinguishable thermal degradation around 550-600° C. Also, the TGA derivative curve shows a broad transition peak at 315° C. and a sharp transition peak at 572° C., with a total weight loss of 38% after decomposition. Nafion membrane shows major weight loss stages around 325-380° C. and 420-570° C. The TGA derivative curve shows two sharp transition peaks at 360 and 462° C., with a total weight loss of 92% after decomposition.

Blend membranes NPI-6, NPI-12, NPI-18, and NPI-30 show two major weight loss stages around 325-380, 380-420, and a small third decomposition around 420-570° C. The third decomposition increases as the content of PI increases. Differences in transition points compared to Nafion are not observable for TGA curve. In addition to sharp transition peaks at 360 and 462° C., which are characteristic to Nafion, TGA derivative curve of blend membranes show broad transition peak at 315° C. and decomposition of PI as a shoulder at 565° C. The total weight loss is 81% for NPI-6 and NPI-12, and 77% for NPI-18 and NPI-30. The TGA and TGA derivative curve of blend samples confirms the presence of both components, Nafion and PI, in the blends.

6. Mechanical Properties of Prepared Membranes

Figures 6A, 6B:
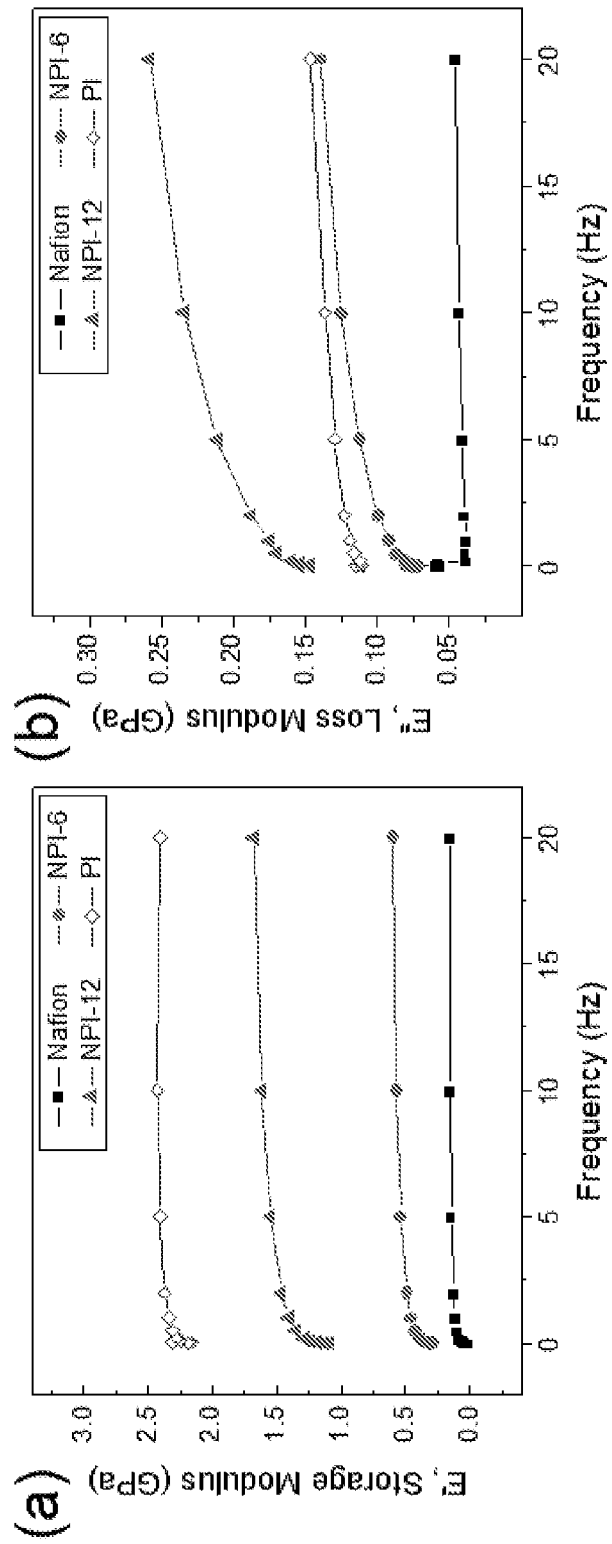
FIG. 6A-D show representative DMA results of membranes Nafion 117, NPI-6, NPI-12, and polyimide. Specifically, storage modulus (6A), loss modulus (6B), and tan δ (6C) with a frequency range from 0.01 to 20 Hz in tensile mode are shown.
Figures 6C, 6D:
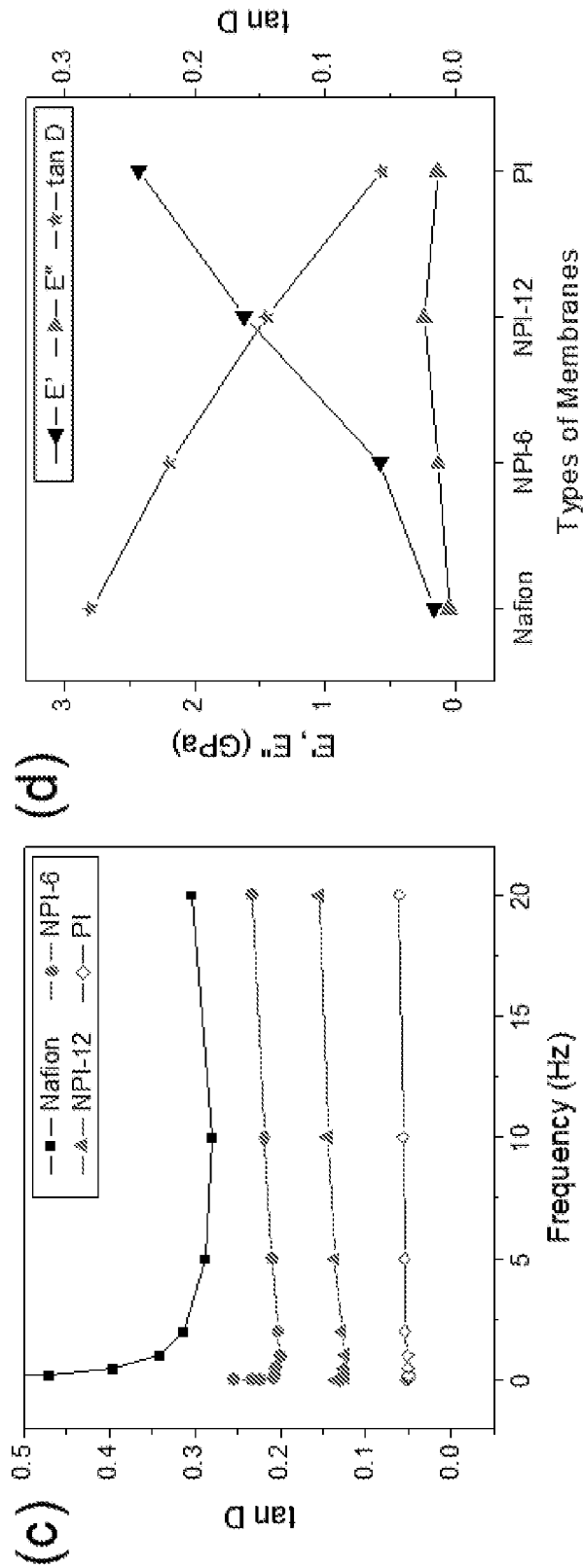

A dynamic mechanical analysis using the Pyris Diamond DMA was conducted on Nafion 117, NPI-6, NPI-12, and PI membranes. DMA was not measured on NPI-18 and NPI-30 due to the stiffness of the membranes. DMA is important to understand the viscoelastic properties of the materials. The samples were cut into 0.5 cm×2.5 cm. DMA was setup in tension, and they were oscillated at different frequencies (0.01, 0.02, 0.05, 0.1, 0.2, 0.5, 1, 2, 5, 10, 20 Hz). Measured storage modulus, loss modulus, and tangent delta are shown in FIG. 6A-C, respectively. To clearly show the increasing and decreasing trends, storage modulus, loss modulus, and tan δ of samples at 10 Hz are shown in FIG. 6D. At 10 Hz, as the content of PI in the membrane increased, the storage modulus (E') increased from 0.1563 (Nafion) to 0.5723 (NPI-6) to 1.619 (NPI-12) to 2.430 GPa (PI) (FIG. 6A). In the case of loss modulus (E"), there were only minor changes: 0.0432 (Nafion), 0.1252 (NPI-6), 0.2343 (NPI-12), and 0.1366 GPa (PI) (FIG. 6B). Therefore, damping properties (tan δ=E"/E') (Chen et al. (2005) *Journal of Biomechanics* 38: 959-963; Bashaiwoldu et al. (2004) *International Journal of Pharmaceutics* 269: 329-342; Xie et al. (2004) *Journal of Macromolecular Science B* 43: 805-817) decreased from 0.2799 (Nafion) to 0.2191 (NPI-6) to 0.1448 (NPI-12) to 0.0562 (PI) as the content of PI increased (FIG. 6C). The trends in E', E", and tan δ as a function of PI content were clearly shown in FIG. 6D. Without wishing to be bound by theory, the storage modulus, which represents the elastic property of the material, can be increased by increasing the content of PI. Meanwhile, loss modulus, which represents the viscous property, was not affected significantly up to 12% of PI, which result in the decrease in damping property. Although limited, selective tuning in the mechanical properties can be achieved by this simple physical blending. It should be noted that the DMA analysis of the blends with higher PI contents was not conducted due the brittleness of the samples.

7. Cross-Section Morphology and Membrane Thickness

The cross-section morphology and thickness of the IPMCs were measured using SEM (TM3030, Hitachi) at 15 kV as shown in FIG. 7A-D. The samples were molded with epoxy and carefully polished, and then sputter-coated with Pt. After fabricating IPMCs based on solution casted Nafion, NPI-6, NPI-12, NPI-18, and NPI-30, surface electrode resistance was measured using two-point probe method. As shown in Table 2, solution casted Nafion, NPI-6, and NPI-12 showed high surface electrode resistance (4.7-20.2 Ω/cm). Since higher surface electrode resistance generates lower actuation capability in the IPMCs which was experimentally demonstrated (Shahinpoor and Kim (2000) *Smart Mater. Struct.* 9: 543-551), actuation testing was only done on NPI-18 and NPI-30 IPMC actuators which resulted in surface resistance (1.1-1.5 Ω/cm) less than 2.0 Ω/cm after secondary electroless plating, which is appropriate value compared to our previous work. Since the surface resistance of solution casted Nafion-based IPMC was too high, we prepared Nafion-117-based IPMC that resulted in surface resistance (1.3-1.7 Ω/cm) less than 2.0 Ω/cm to compare actuation performance of Nafion 117 and NPI-18-based IPMCs.

Figures 7A, 7B:
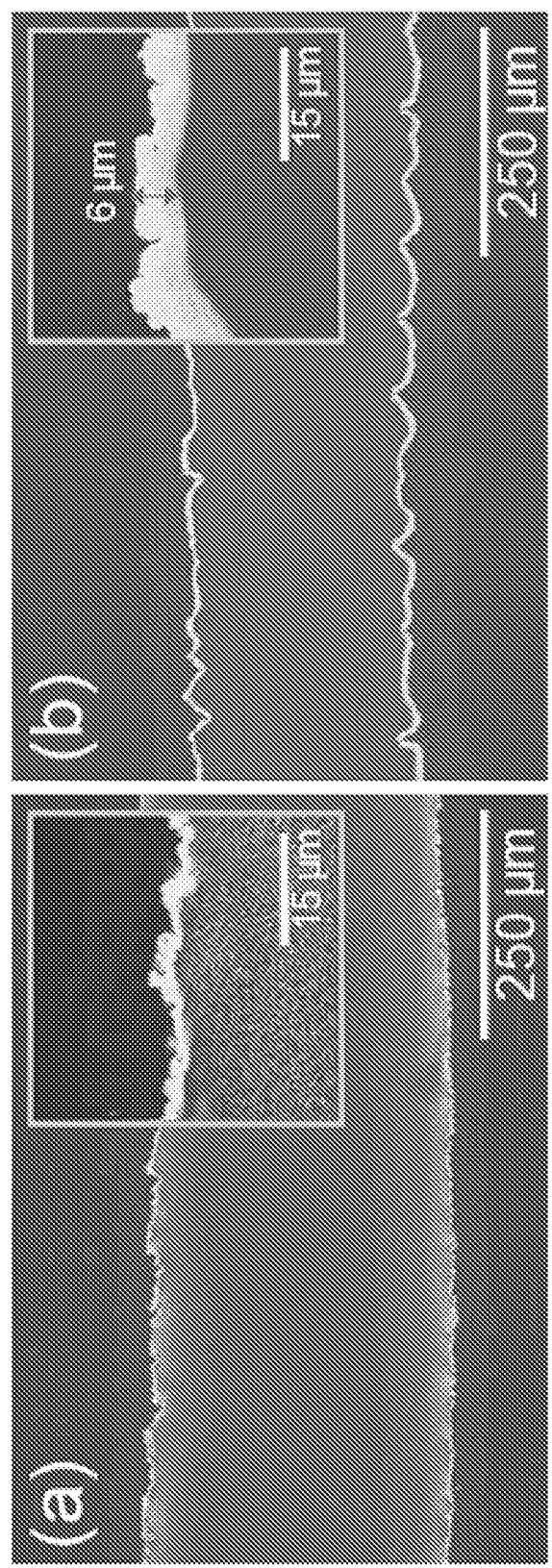
FIG. 7A-D show representative SEM images of prepared IPMCs. Specifically, Nafion (7A), NPI-6 (7B), NPI-12 (7C), and NPI-18 (7D) are shown.
Figures 7C, 7D:
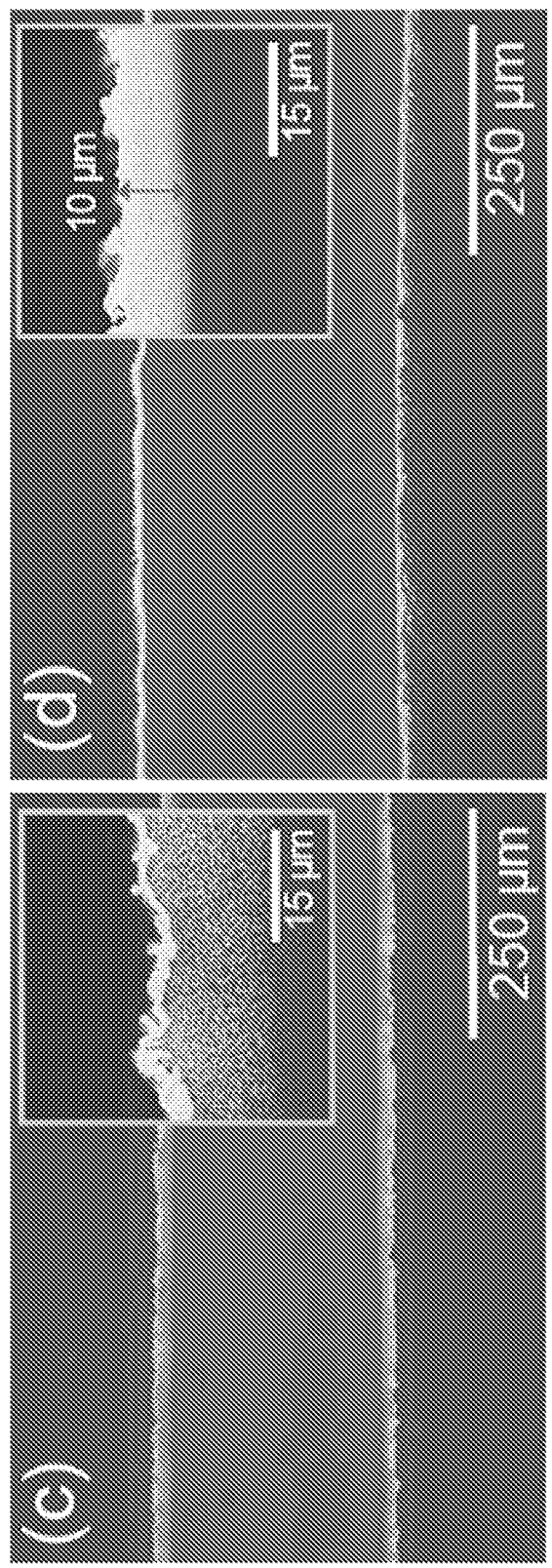

The cross-sectional morphology of NPI-18-based IPMC actuator was characterized with SEM image as shown in FIG. 7D. The platinum electrode is successfully plated onto the surface of the membrane evenly, without any defects like cracks or delamination. The thickness of the electrode is consistent throughout the surface of the electrode with a value of 10 μm. For NPI-30, SEM image was not taken since the surface electrode resistance was similar to NPI-18, which was lower than 2.0 Ω/cm.

8. Voltage, Current, Displacement Responses, and Bending Strain of IPMCs

The electromechanical responses including displacement and blocking force of the prepared IPMCs were measured by a laser displacement sensor (optoNCDT-1401, Micro-Epsilon) and a load cell (GSO-30, Transducer Techniques) with a sample size of 0.5×2.5 cm in the test setup composed of a signal generator (FG-7002C, EZ digital), a power amplifier (LVC-608, AE Techron), a DC power supply (CPS250, Tektronix), and a DAQ (SCB-68, National Instruments). IPMC was clamped in a cantilever configuration in water with a free-length of 2.2 cm. The displacement was monitored at a position of 2.0 cm away from the clamp contacts. The voltage, current and displacement (or blocking force) responses were recorded using data acquisition system (LabView 8, National Instruments).

Displacement responses of Nafion 117, NPI-18, NPI-30 IPMC actuators were measured at 0.1, 0.5, and 1 Hz. A displacement laser sensor kept track of the displacement at the tip while the voltage at the clamp was sensed by the circuit. Measured voltage, current, corresponding displacement responses, and bending strain of Nafion 117, NPI-18, and NPI-30-based IPMC at ±3V AC (square wave input) at frequencies 0.1, 0.5, and 1 Hz are shown in FIG. 8A-D. The bending strain (E) was converted from displacement (δ) using the relation of $$\varepsilon \cong \frac{\delta t}{L^2 + \delta^2},$$

where t is the thickness of the IPMC and L is the free length.

Figure 8A:
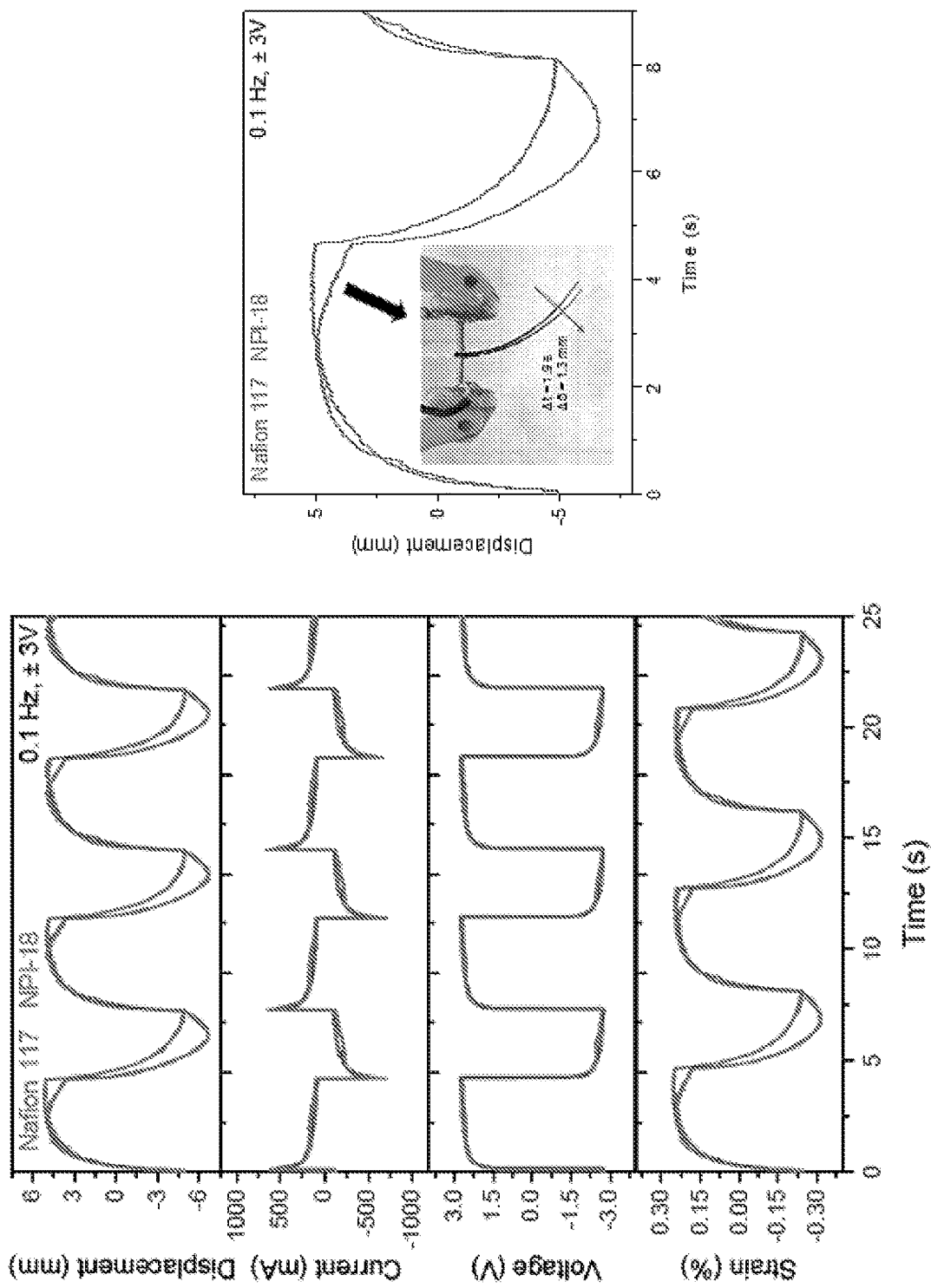
FIG. 8A-C show representative data pertaining to the actuation performance of the IPMC actuators (Nafion 117 and NPI-18). Specifically.

For FIG. 8A, only the results of Nafion 117 and NPI-18 actuators were shown. In the case of NPI-30, due to the experimental error, number of cycles of 0.1 Hz were not the same as Nafion 117 and NPI-18. The displacements of Nafion 117 and NPI-18 actuators at 0.1 Hz were 5.3 and 5.9 mm, and strains were 0.21 and 0.28%, respectively. Superimposed image of video captures of NPI-18 actuator at 0.1 Hz is also included. The actuators show similar displacement performances up to 2.8 s. While NPI-18 shows a bounce-back effect, which does not maintain the maximum displacement but bounces back before bending to the opposite direction, from 2.8 to 4.7 s where displacement changes by 1.3 mm, which is not the case with the pristine Nafion 117. This result is in accordance with the DMA analysis. Without wishing to be bound by theory, the increased elasticity may be responsible for the bounce-back effect. The displacement was found to be 1.6 mm, which was lower than Nafion 117 and NPI-18, due to the stiffness of the blend and that the bounce-back effect was only observed at low frequency (0.1 Hz) but not at high frequencies (0.5 and 1 Hz).

Figures 8B, 8C:
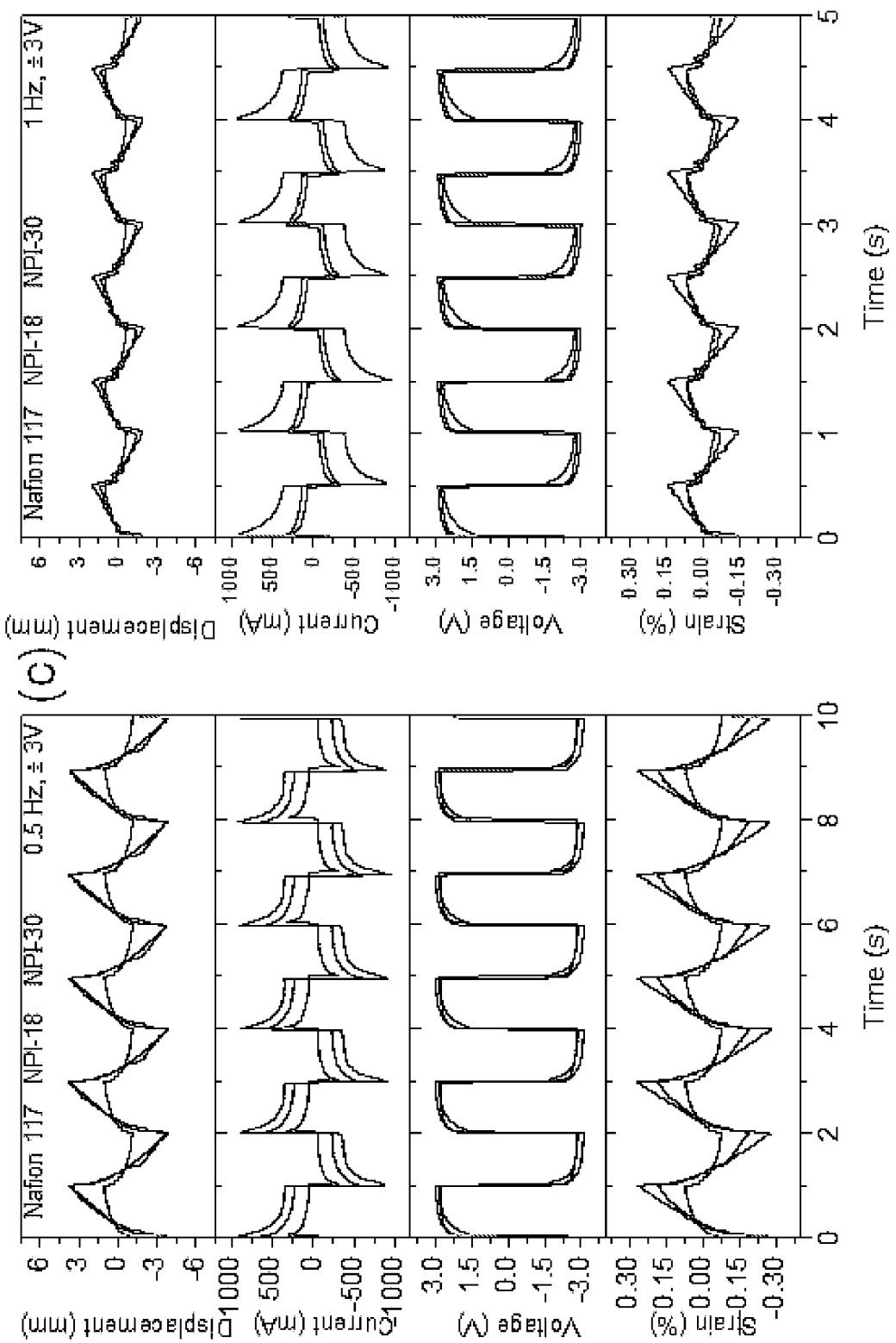

At 0.5 Hz, as shown in FIG. 8B, the displacement of Nafion 117 and NPI-18 actuators were almost same (3.8 mm), and strains were 0.17 and 0.28%, respectively. The displacement of NPI-30 actuator was 1.1 mm and the strain was 0.06%, which were lowest among the actuators due to the stiffness of the actuator. At 1.0 Hz, as shown in FIG. 8C, the displacement of Nafion 117 and NPI-18 actuators were 1.3 and 2.0 mm, and strains were 0.07 and 0.14%, respectively. The displacement of NPI-30 actuator was 1.1 mm and the strain was 0.06%, which were lowest among actuators.

The displacement decreases at 1.0 Hz compared to 0.5 Hz and the displacement responses are slower compared to 0.5 Hz. These effects are thought to be due to the limited charging time at higher frequency (Palmre et al. (2014) *Scientific Reports* 4: 6176). As the actuating frequency increases, the charging time for the hydrated cations to move toward the anode becomes shorter, resulting in the decrease of both displacement and strain. From the displacement results, we could see comparable electromechanical performance even with significant amount of 18 wt % of PI in the actuator.

Figure 9A:
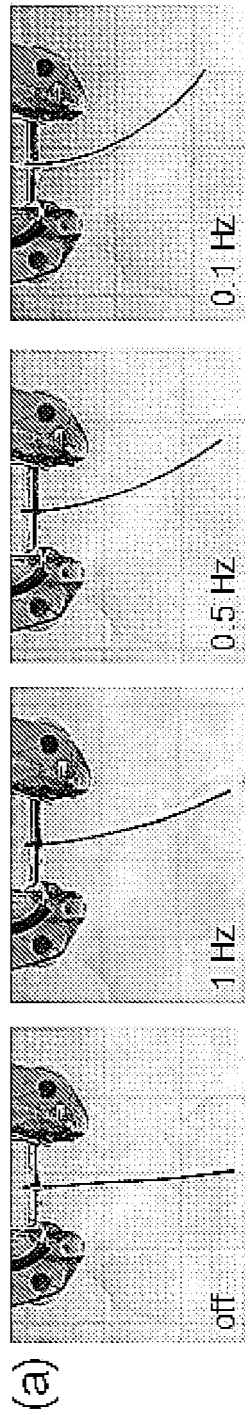
FIG. 9A-C show representative images of prepared IPMC actuators. Specifically, Nafion 117 (9A), NPI-18 (9B), and NPI-30 (9C) with/without applying voltage (+3 V, AC) under varied frequency (0.1, 0.5, and 1.0 Hz) are shown.
Figure 9B:
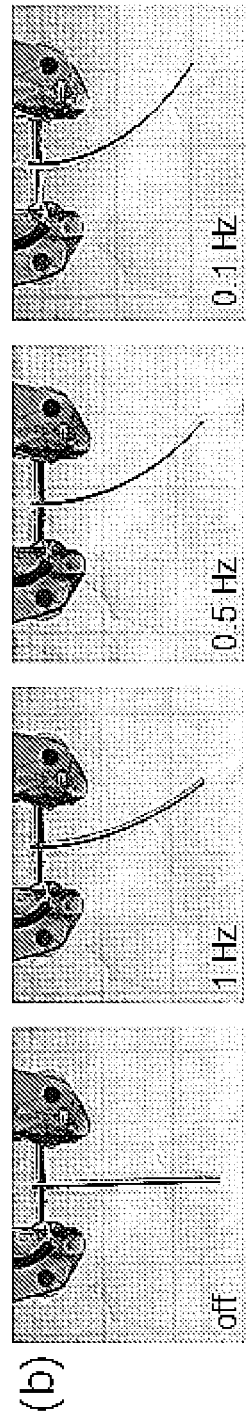
Figure 9C:
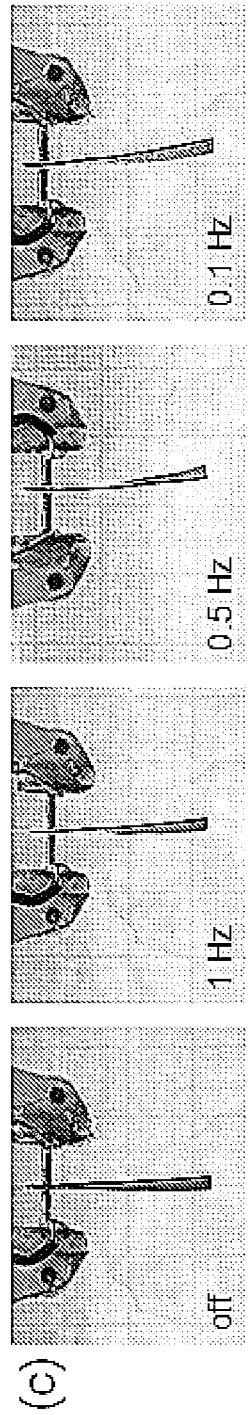

The photographic images of prepared IPMC actuators at maximum displacement with/without applying voltage (+3 V, AC) under varied frequency (0.1, 0.5, and 1.0 Hz) are shown in FIG. 9A-C. It shows that the NPI-18 IPMC actuator demonstrated the similar displacement range compared to Nafion 117 IPMC actuator. NPI-30 IPMC actuator showed lowest degree of deformation among the actuators. The photographic images correspond with the displacement performances.

9. Blocking Forces of IPMCs

Figure 10:
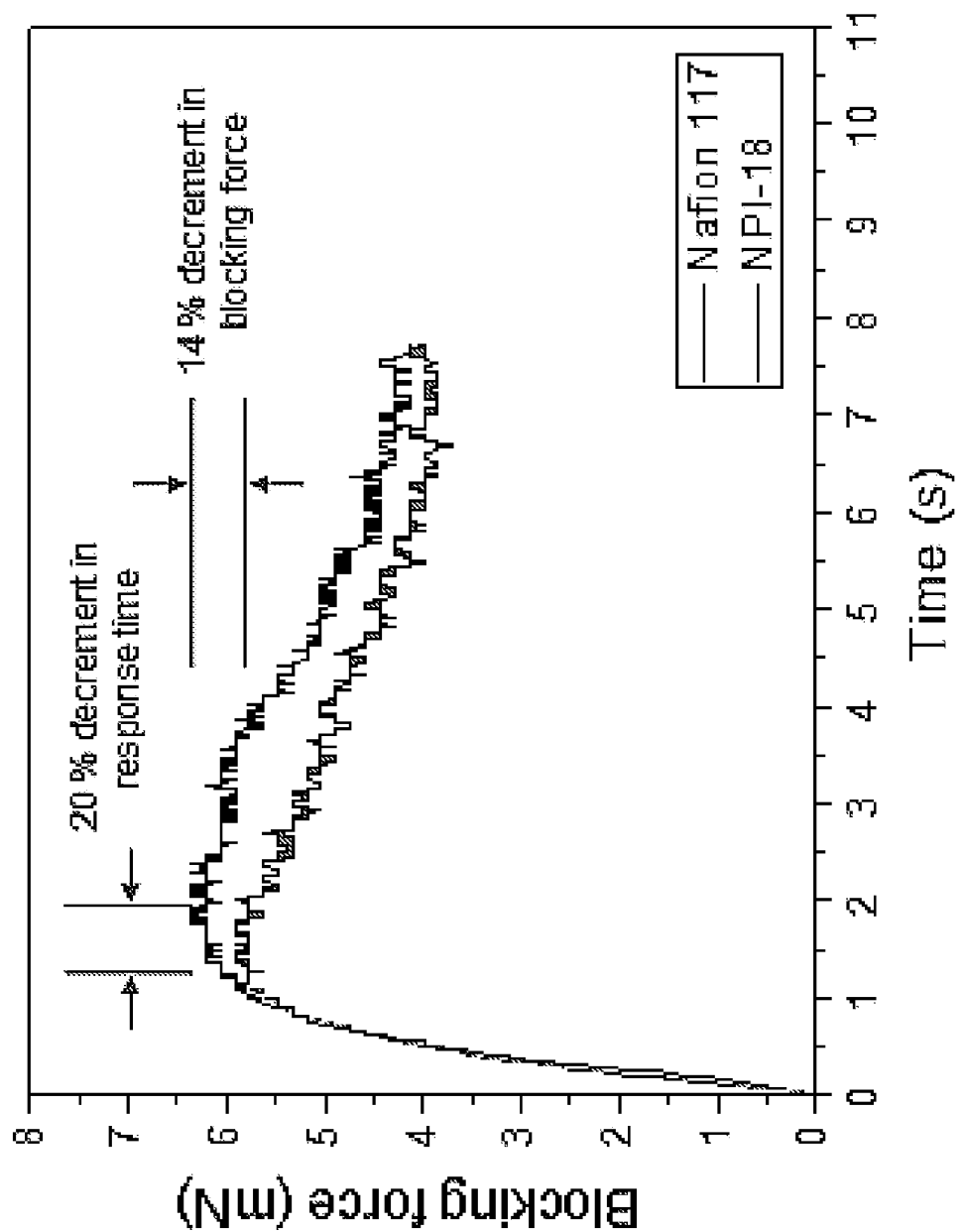
FIG. 10 shows representative blocking force responses in time at 3 V, DC for IPMC actuators comparing Nafion 117 and NPI-18.

The blocking force, which represents the electromechanical force formed at the tip of IPMC at zero displacement, was measured under driving voltage of 3V, DC. FIG. 10 shows the typical blocking force responses measured in time for Nafion 117 and NPI-18 actuators. The highest blocking forces of Nafion 117 and NPI-18 were measured to 6.86 mN at 1.84 s and 5.93 mN at 1.47 s. The blocking for decrease of NPI-18 is likely to come from the increased stiffness of PI incorporated in Nafion. The blocking force is decreased by less than 15% and the response time is also decreased by 20%. While obtaining faster response time of actuators by blending PI is important, the decrease in blocking force that accompanies should also be considered in the fabrication of IPMC actuators.

G. References

Kim S J, Pugal D, Wong J, Kim K J and Yim W 2014 A bio-inspired multi degree of freedom actuator based on a novel cylindrical ionic polymer-metal composite material *Robotics and Autonomous Systems* 62 53-60.

Terasawa N, Hayashi Y, Koga T, Higashi N and Asaka K 2014 High-performance polymer actuators based on poly (ethylene oxide) and single-walled carbon nanotube-ionic liquid-based gels *Sensors and Actuators B* 202 382-387.

Liu Z and Calvert P 2000 Multilayer Hydrogels as Muscle-Like Actuators *Adv. Mater.* 12 288-291.

Shiga T, Hirose Y, Okada A and Kurauchi T 1993 Bending of ionic polymer gel caused by swelling under sinusoidally varying electric fields *Journal of Applied Polymer Science* 47 113-119.

Shahinpoor M 1992 Conceptual design, kinematics and dynamics of swimming robotic structures using ionic polymeric gel muscles *Smart Mater. Struct.* 1 91-94.

Jung K, Kim K J and Choi H R 2008 A self-sensing dielectric elastomer actuator *Sensors and Actuators* A 143 343-351.

Pelrine R, Kornbluh R, Pei Q and Joseph J 2000 High-Speed Electrically Actuated Elastomer with Strain Greater Than 100% *Science* 287 836-839.

Jeon T-I, Kim K-J, Kang C, Maeng I H, Son J-H, An K H, Lee J Y and Lee Y H 2004 Optical and electrical properties of preferentially anisotropic single-walled carbon-nanotube films in terahertz region *Journal of Applied Physics* 95 5736-5740.

Kim J H, Nam K-W, Ma S B and Kim K B 2006 Fabrication and electrochemical properties of carbon nanotube film electrodes *Carbon* 44 1963-1968.

Shahinpoor M and Kim K J 2001 Ionic polymer-metal composites: I. Fundamentals *Smart Mater. Struct.* 10 819-833.

Lee S, Park H C and Kim K J 2005 Equivalent modeling for ionic polymer-metal composite actuators based on beam theories *Smart Mater. Struct.* 14 1363-1368.

Kim S-M and Kim K J 2008 Palladium buffer-layered high performance ionic polymer-metal composites *Smart Mater. Struct.* 17 035011.

Kim D, Kim K J, Nam J-D and Palmre V 2011 Electrochemical operation of ionic polymer-metal composites *Sensors and Actuators* B 155 106-113.

Shen Q, Wang T and Kim K J 2015 A biomimetic underwater vehicle actuated by waves with ionic polymer-metal composite soft sensors *Bioinspir. Biomim.* 10 055007.

Palmre V, Hubbard J J, Fleming M, Pugal D, Kim S, Kim K J and Leand K K 2013 An IPMC-enabled bio-inspired bending/twisting fin for underwater applications *Smart Mater. Struct.* 22 014003.

Lee S and Kim K J 2006 Design of IPMC actuator-driven valve-less micropump and its flow rate estimation at low Reynolds numbers *Smart Mater. Struct.* 15 1103-1109.

Lu J, Kim S-G, Lee S and Oh I-K 2008 A Biomimetic Actuator Based on an Ionic Networking Membrane of Poly(styrene-alt-maleimide)-Incorporated Poly(vinylidene fluoride) *Adv. Func. Mater.* 18 1290-1298.

Shahinpoor M and Kim K J 2005 Ionic polymer-metal composites: IV. Industrial and medical applications *Smart Mater. Struct.* 14 197-214.

Jung K, Nam J and Choi H 2003 Investigations on actuation characteristics of IPMC artificial muscle actuator *Sensors and Actuators A* 107 183-192.

Krishen K 2009 Space applications for ionic polymer-metal composite sensors, actuators, and artificial muscles *Acta Astronautica* 64 1160-1166.

Kim K J and Shahinpoor M 2002 A novel method of manufacturing three-dimensional ionic polymer-metal composites (IPMCs) biomimetic sensors, actuators and artificial muscles *Polymer* 43 797-802.

Lee J H, Lee J H, Nam J-D, Choi H, Jung K, Jeon J W, Lee Y K, Kim K J and Tak Y 2005 Water uptake and migration effects of electroactive ion-exchange polymer metal composite (IPMC) actuator *Sensors and Actuators A* 118 98-106.

Hwang T, Palmre V, Nam J, Lee D-C and Kim K J 2015 A new ionic polymer-metal composite based on Nafion/poly(vinyl alcohol-co-ethylene) blends *Smart Mater. Struct.* 24 105011.

Jo C, Pugal D, Oh I-K, Kim K J and Asaka K 2013 Recent advances in ionic polymer-metal composite actuators and their modeling and applications *Progress in Polymer Science* 38 1037-1066.

Palmre V, Pugal D, Kim K J, Leang K K, Asaka K and Aabloo A 2014 Nanothorn electrodes for ionic polymer-metal composite artificial muscles *Scientific Reports* 4 6176.

Hickner M A, Ghassemi H, Kim Y S, Einsla B R and McGrath J E 2004 Alternative Polymer Systems for Proton Exchange Membranes (PEMs) *Chem. Rev.* 104 4587-4612.

Park S, Panwar V, Kang B and Park J 2011 Blend membranes for ionic polymer-metal composite actuators *SPE Plastics Research Online* DOI: 10.1002/spepro.003706.

Kim S J, Kim M S, Shin S R, Kim I Y, Kim S I, Lee S H, Lee T S and Spinks G M 2005 Enhancement of the electromechanical behavior of IPMCs based on chitosan/polyaniline ion exchange membranes fabricated by freeze-drying *Smart Mater. Struct.* 14 889-894.

Ajayan P M and Tour J M 2007 Materials Science: Nanotube composites *Nature* 447 1066-1068.

Kotov N A 2006 Materials science: Carbon sheet solutions *Nature* 442 254-255.

Giannelis E P 1996 Polymer Layered Silicate Nanocomposites *Adv. Mater.* 8 29-35.

Kumar A, Tateyama S, Yasaki K, Ali M A, Takaya N, Singh R and Kaneko T 2016 1H NMR and FT-IR dataset based structural investigation of poly(amic acid)s and polyimides from 4,4'-diaminostilbene *Data in Brief* 7 123-128.

Laporta M, Pegoraro M and Zanderighi L 1999 Perfluorosulfonated membrane (Nafion): FT-IR study of the state of water with increasing humidity *Physical Chemistry Chemical Physics* 1 4619-4628.

Chen Q, Ringleb S I, Hulshizer T and An K-N 2005 Identification of the testing parameters in high frequency dynamic shear measurement on agarose gels *Journal of Biomechanics* 38 959-963.

Bashaiwoldu A B, Podczeck F and Newton J M 2004 Application of dynamic mechanical analysis (DMA) to determine the mechanical properties of pellets *International Journal of Pharmaceutics* 269 329-342.

Xie Z, Wei Y T, Liu Y and Du X 2004 Dynamic Mechanical Properties of Aged Filled Rubbers *Journal of Macromolecular Science* B 43 805-817.

Shahinpoor M and Kim K J 2000 The effect of surface-electrode resistance on the performance of ionic polymer-metal composite (IPMC) artificial muscles *Smart Mater. Struct.* 9 543-551.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A method of making a polyimide blend, the method comprising:

a) mixing a polymer selected from a perfluorinated ionomer membrane, a poly(acrylic acid) salt, sulfonated polystyrene, sulfonated poly(arylene ether sulfone), sulfonated poly(arylene thioether sulfone), cross-linked poly(styrene-ran-ethylene), sulfonated poly(styrene-b-ethylene-co-butylene-b-styrene), poly(fluoroalkyl methacrylate-co-acrylic acid), poly(fluoroalkyl methacrylate-co-2-acylamido-2-methyl-1-propanesulfonic acid), poly(fluoroalkyl methacrylate-co-sulfonic acid), poly(fluoroalkyl methacrylate-co-sulfonic acid-co-2-hydroxyethyl methacrylate), poly(vinylidene-g-sulfonated N-ethylenecarbazole), poly(vinylidene fluoride-co-hexafluoropropylene), poly(ethylene-co-tetrafluoroethylene), and tetrafluoroethylene-perfluoro-3,6-dioxa-4-methyl-7-octenesulfonic acid copolymer, and a poly(amic acid) comprising at least one residue having a structure represented by a formula selected from:

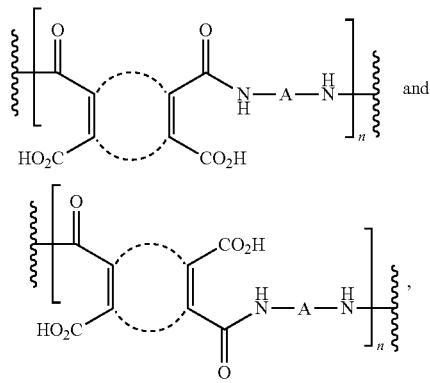

wherein

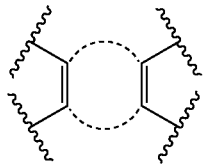

comprises a structure represented by a formula selected from:

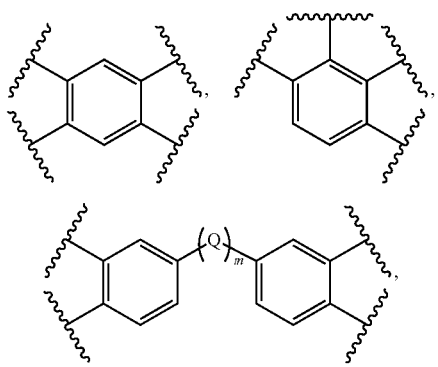

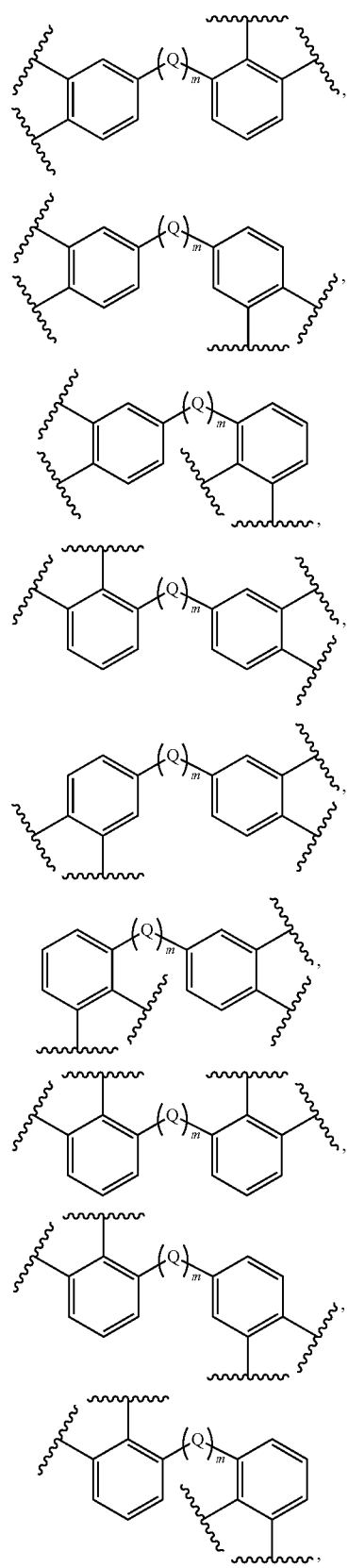
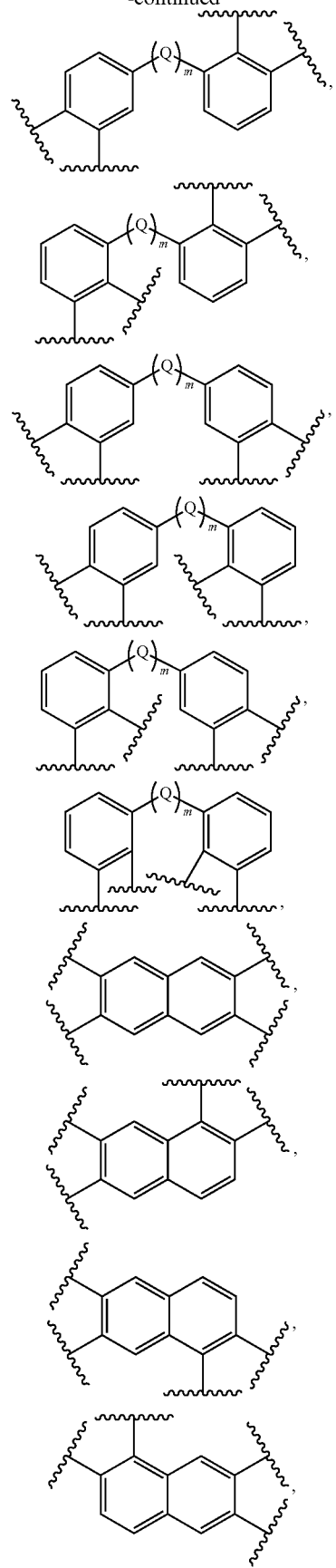

105
-continued

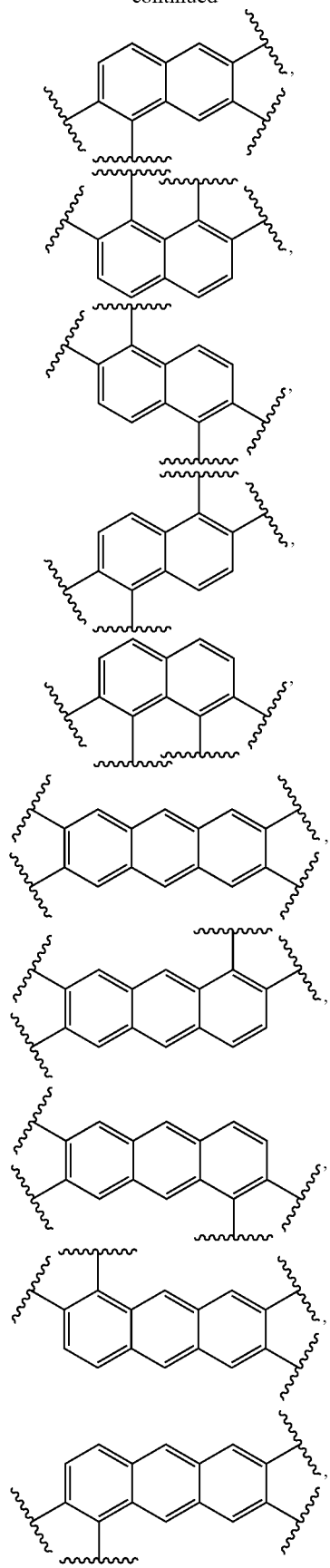

106
-continued

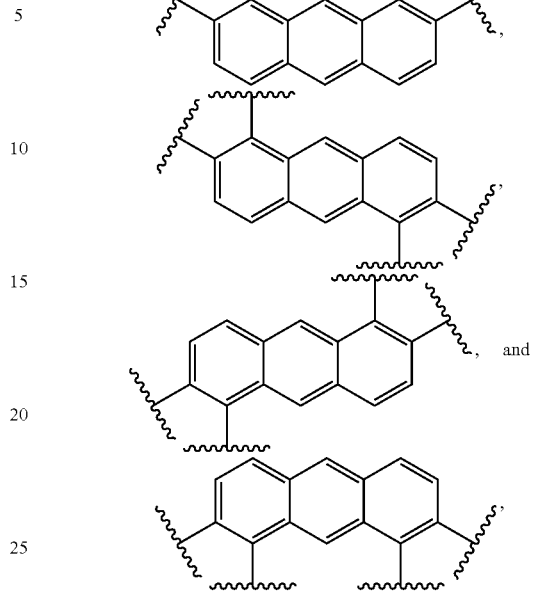

wherein n is an integer greater than 1;
wherein m is 0 or 1;
wherein A is selected from —$Ar^1$— and a structure represented by a formula:

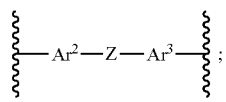

wherein Z, when present, is selected from O, $NR^3$, $CR^{4a}R^{4b}$, CO, and $SO_2$;
wherein each of $R^3$, $R^{4a}$, and $R^{4b}$, when present, is independently selected from hydrogen, C1-C4 alkyl, and C1-C4 haloalkyl;
wherein $Ar^1$, when present, is selected from aryl, 5-membered heteroaryl, and 6-membered heteroaryl and substituted with 0, 1, 2, or 3 groups independently selected from halogen, —OH, —CN, —$NH_2$, C1-C4 alkyl, C1-C4 haloalkyl, and C1-C4 alkoxy;
wherein each of $Ar^2$ and $Ar^3$, when present, is independently selected from aryl, 5-membered heteroaryl, and 6-membered heteroaryl and substituted with 0, 1, 2, or 3 groups independently selected from halogen, —OH, —CN, —$NH_2$, C1-C4 alkyl, C1-C4 haloalkyl, and C1-C4 alkoxy;
wherein Q, when present, is selected from O, $NR^1$, SO, $SO_2$, C(O), and $CR^{2a}R^{2b}$; and
wherein each of $R^1$, $R^{2a}$, and $R^{2b}$, when present, is independently selected from hydrogen, C1-C4 alkyl, and C1-C4 haloalkyl,
thereby making a poly(amic acid) blend; and
b) cyclizing the poly(amic acid) blend.

2. The method of claim 1, wherein the polymer is tetrafluoroethylene-perfluoro-3,6-dioxa-4-methyl-7-octene-sulfonic acid copolymer.

3. The method of claim 1, wherein n is greater than 10,000.

4. The method of claim 1, wherein the poly(amic acid) comprises at least one residue having a structure represented by a formula:

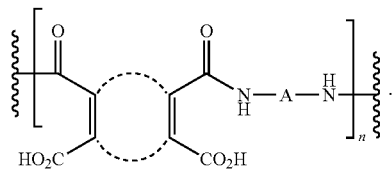

5. The method of claim 1, wherein the poly(amic acid) comprises at least one residue having a structure represented by a formula:

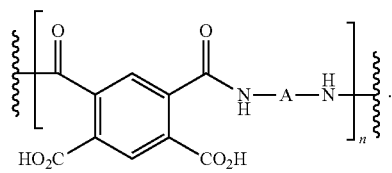

6. The method of claim 1, wherein the poly(amic acid) comprises at least one residue having a structure:

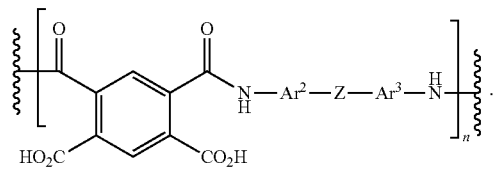

7. The method of claim 1, wherein the poly(amic acid) comprises at least one residue having a structure:

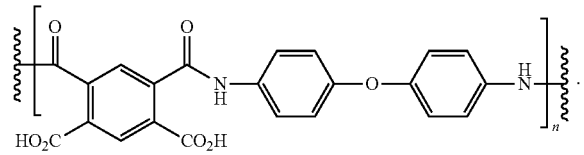

8. The method of claim 1, wherein the poly(amic acid) is present in solution.

9. The method of claim 8, wherein the poly(amic acid) solution is present in an amount of from about 20 wt % to about 50 wt %.

10. The method of claim 8, wherein the poly(amic acid) solution comprises an aprotic polar solvent.

11. The method of claim 10, wherein the aprotic polar solvent is selected from N,N-dimethylformamide and N-methyl-2-pyrrolidone.

12. The method of claim 10, wherein the aprotic polar solvent is present in an amount of from about 95 wt % to about 99 wt % of the poly(amic acid) solution.

13. The method of claim 10, wherein the aprotic polar solvent is present in an amount of about 95 wt % of the poly(amic acid) solution.

14. The method of claim 1, wherein the polymer is present in solution and the poly(amic acid) is present in solution, and wherein the polymer and the poly(amic acid) together have a concentration of from about 0.01 g/mL to about 6 g/mL.

15. The method of claim 1, wherein the polymer is present in solution and the poly(amic acid) is present in solution, and wherein the polymer and the poly(amic acid) together have a concentration of from about 0.03 g/mL to about 6 g/mL.

16. The method of claim 1, wherein mixing is blending.

17. The method of claim 1, wherein mixing is solution-casting.

18. The method of claim 17, wherein solution-casting is performed at a temperature of from about 50° C. to about 100° C.

19. The method of claim 17, wherein solution-casting is performed at a temperature of from about 40° C. to about 90° C.

20. The method of claim 1, wherein cyclizing is via heat.

21. The method of claim 20, wherein the heat is applied at a temperature of from about 180° C. to about 250° C.

22. The method of claim 20, wherein the heat is applied for from about 12 h to about 36 h.

23. The method of claim 20, wherein the heat is applied under vacuum, nitrogen, or helium.

24. The method of claim 1, wherein the polyimide blend comprises a polyimide comprising at least one residue having a structure represented by a formula:

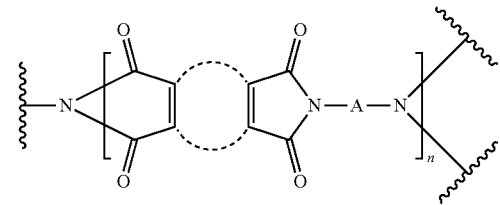

25. The method of claim 24, wherein the polyimide comprises at least one residue having a structure represented by a formula:

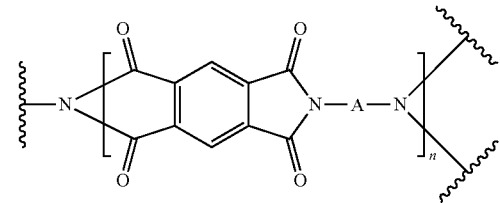

26. The method of claim 24, wherein the polyimide comprises at least one residue having a structure represented by a formula:

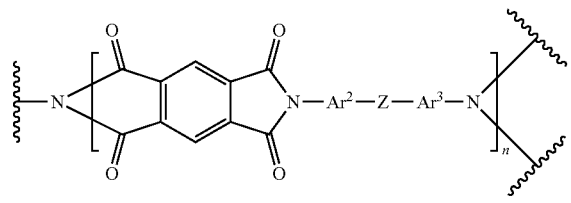

27. The method of claim 24, wherein the polyimide comprises at least one residue having a structure:

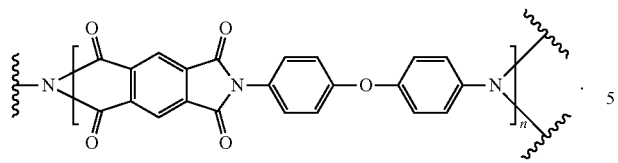

28. The method of claim 24, wherein the polyimide is present in an amount of from about 6 wt % to about 30 wt %.

29. The method of claim 24, wherein the polyimide is present in an amount of from about 18 wt % to about 20 wt %.

30. The method of claim 1, further comprising plating a metal electrode onto the polyimide blend.

31. The method of claim 30, wherein the metal is Pt.

32. The method of claim 30, further comprising modifying at least one surface of a polymeric membrane with the polyimide blend.

33. The method of claim 32, wherein modifying is via a bond.

34. The method of claim 32, wherein modifying comprises coating the surface with the polyimide blend.

35. The method of claim 32, wherein modifying comprises exposing the surface to a light source.

36. The method of claim 1, further comprising modifying at least one surface of a polymeric membrane with the polyimide blend.

37. The method of claim 36, wherein modifying is via covalent bonding.

38. The method of claim 36, wherein modifying comprises coating the surface with the polyimide blend.

39. The method of claim 36, wherein modifying comprises exposing the surface to a light source.

40. A poly(amic acid) blend comprising:
a) a polymer selected from a perfluorinated ionomer membrane, a poly(acrylic acid) salt, sulfonated polystyrene, sulfonated poly(arylene ether sulfone), sulfonated poly(arylene thioether sulfone), cross-linked poly(styrene-ran-ethylene), sulfonated poly(styrene-b-ethylene-co-butylene-b-styrene), poly(fluoroalkyl methacrylate-co-acrylic acid), poly(fluoroalkyl methacrylate-co-2-acylamido-2-methyl-1-propanesulfonic acid), poly(fluoroalkyl methacrylate-co-sulfonic acid), poly(fluoroalkyl methacrylate-co-sulfonic acid-co-2-hydroxyethyl methacrylate), poly(vinylidene-g-sulfonated N-ethylenecarbazole), poly(vinylidene fluoride-co-hexafluoropropylene), poly(ethylene-co-tetrafluoroethylene), and tetrafluoroethylene-perfluoro-3,6-dioxa-4-methyl-7-octenesulfonic acid copolymer; and
b) a poly(amic acid) comprising at least one residue having a structure represented by a formula selected from:

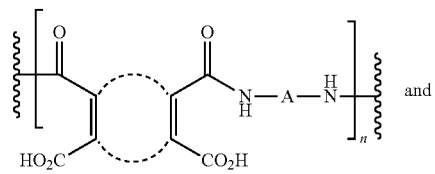 and

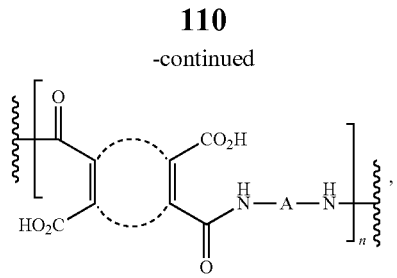

wherein

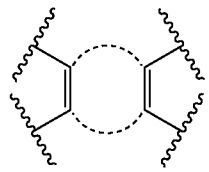

comprises a structure represented by a formula selected from:

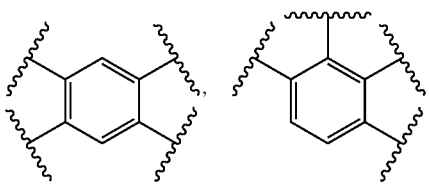

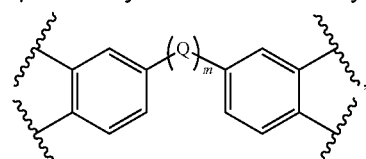

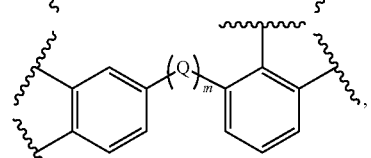

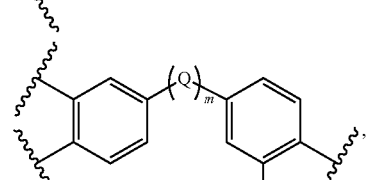

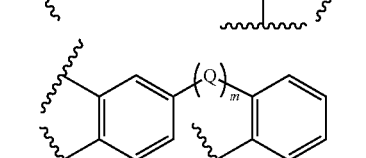

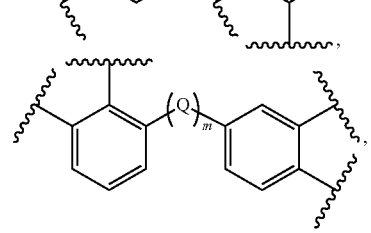

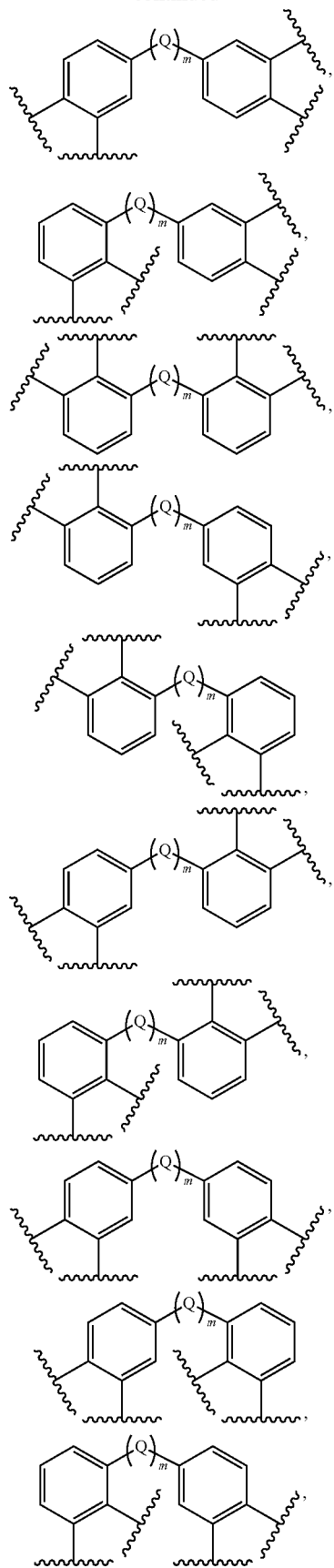
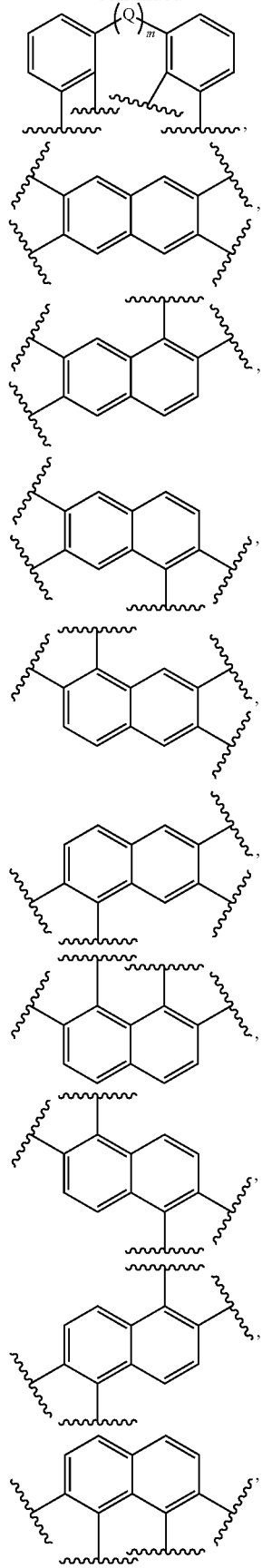

-continued

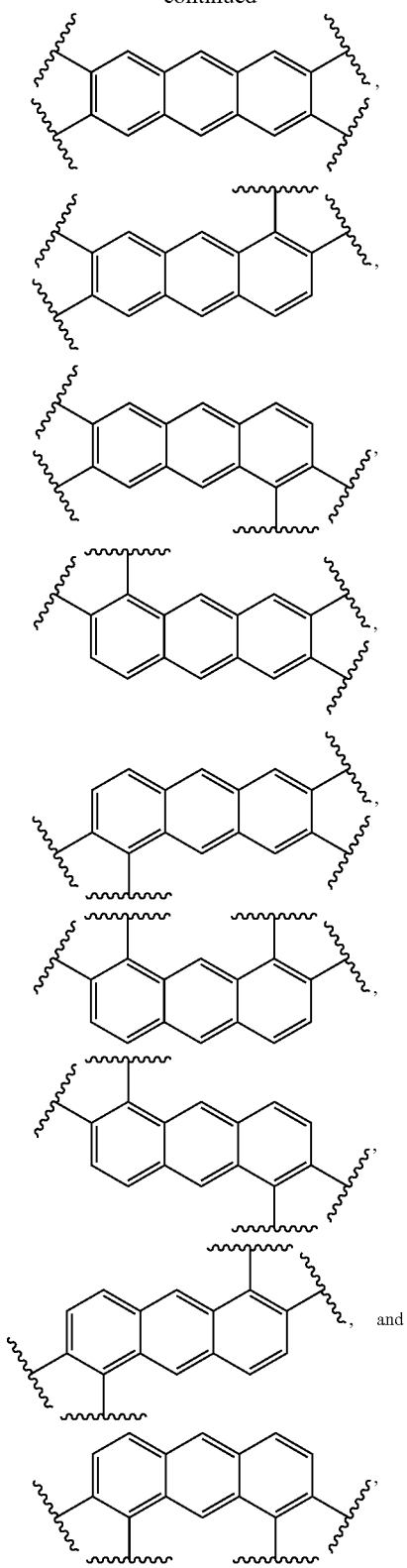

wherein n is an integer greater than 1;
wherein m is 0 or 1;
wherein A is selected from —Ar¹— and a structure represented by a formula:

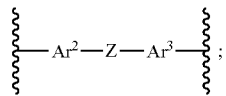

wherein Z, when present, is selected from O, $NR^3$, $CR^{4a}R^{4b}$, CO, and $SO_2$;
wherein each of $R^3$, $R^{4a}$, and $R^{4b}$, when present, is independently selected from hydrogen, C1-C4 alkyl, and C1-C4 haloalkyl;
wherein $Ar^1$, when present, is selected from aryl, 5-membered heteroaryl, and 6-membered heteroaryl and substituted with 0, 1, 2, or 3 groups independently selected from halogen, —OH, —CN, —NH₂, C1-C4 alkyl, C1-C4 haloalkyl, and C1-C4 alkoxy;
wherein each of $Ar^2$ and $Ar^3$, when present, is independently selected from aryl, 5-membered heteroaryl, and 6-membered heteroaryl and substituted with 0, 1, 2, or 3 groups independently selected from halogen, —OH, —CN, —NH₂, C1-C4 alkyl, C1-C4 haloalkyl, and C1-C4 alkoxy;
wherein Q, when present, is selected from O, $NR^1$, SO, $SO_2$, C(O), and $CR^{2a}R^{2b}$; and
wherein each of $R^1$, $R^{2a}$, and $R^{2b}$, when present, is independently selected from hydrogen, C1-C4 alkyl, and C1-C4 haloalkyl.

41. A polyimide blend comprising:
c) a polymer selected from a perfluorinated ionomer membrane, a poly(acrylic acid) salt, sulfonated polystyrene, sulfonated poly(arylene ether sulfone), sulfonated poly(arylene thioether sulfone), cross-linked poly(styrene-ran-ethylene), sulfonated poly(styrene-b-ethylene-co-butylene-b-styrene), poly(fluoroalkyl methacrylate-co-acrylic acid), poly(fluoroalkyl methacrylate-co-2-acylamido-2-methyl-1-propanesulfonic acid), poly(fluoroalkyl methacrylate-co-sulfonic acid), poly(fluoroalkyl methacrylate-co-sulfonic acid-co-2-hydroxyethyl methacrylate), poly(vinylidene-g-sulfonated N-ethylenecarbazole), poly(vinylidene fluoride-co-hexafluoropropylene), poly(ethylene-co-tetrafluoroethylene), and tetrafluoroethylene-perfluoro-3,6-dioxa-4-methyl-7-octenesulfonic acid copolymer Naftali; and
d) a polyimide comprising at least one residue having a structure represented by a formula:

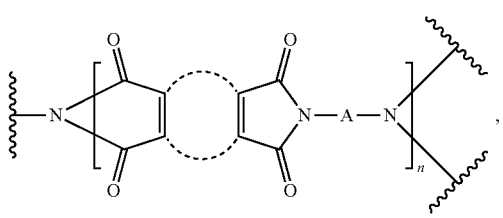

wherein

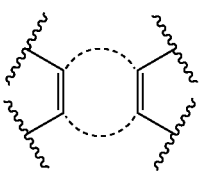

comprises a structure represented by a formula selected from:
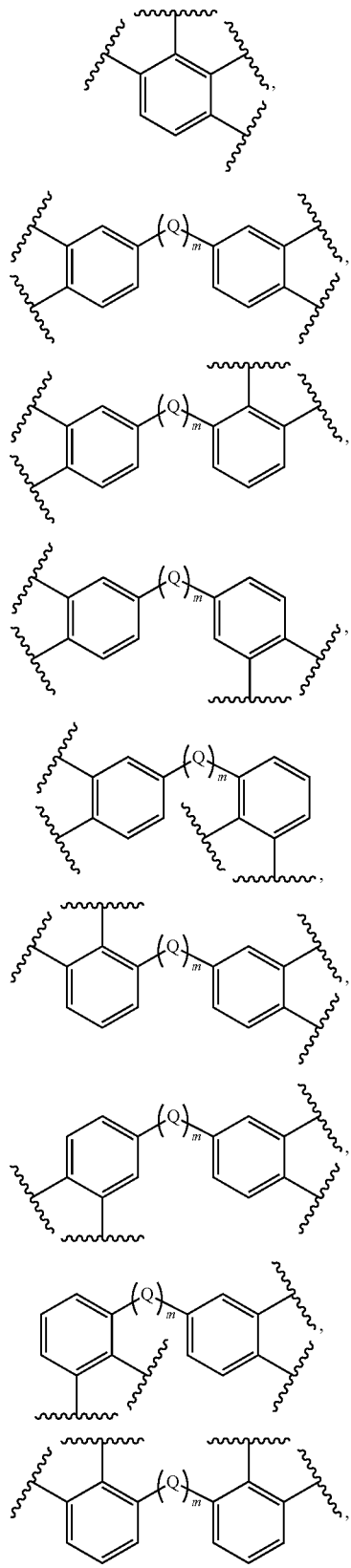
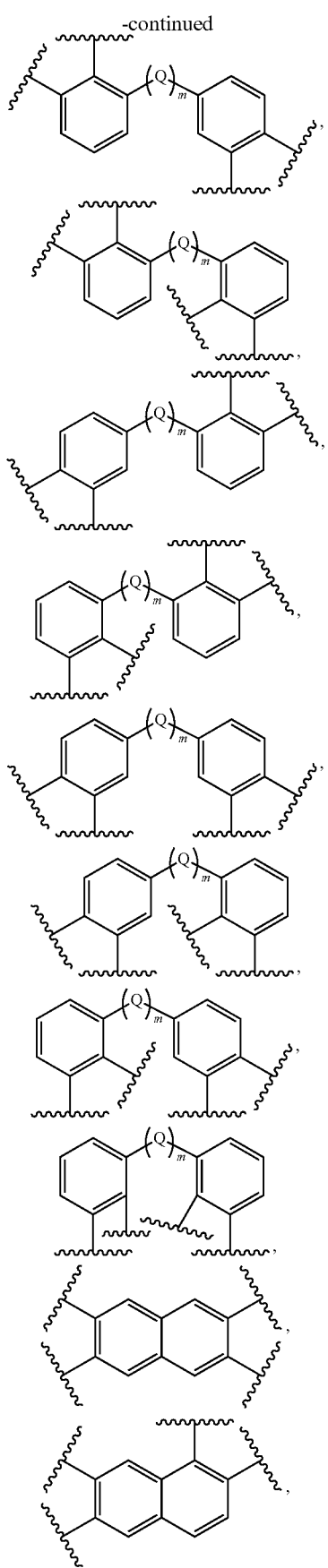
-continued -continued

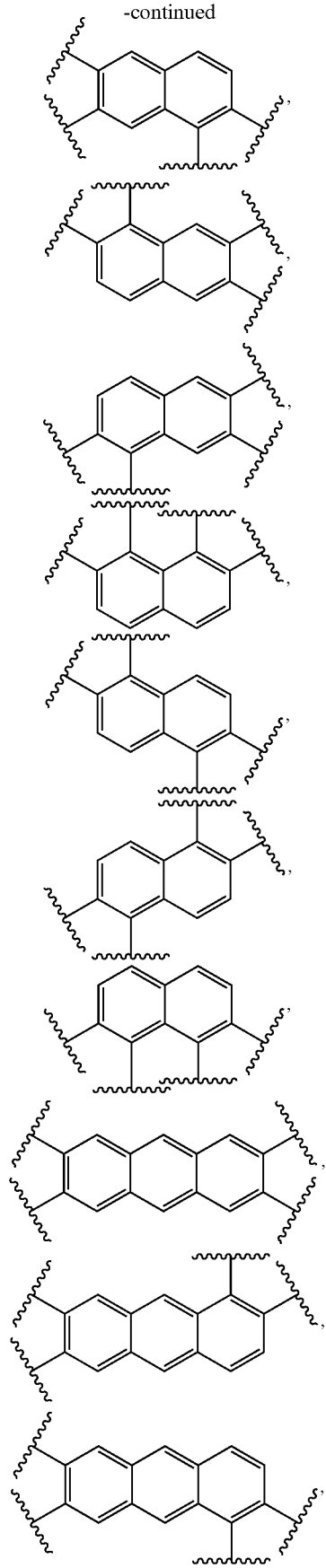

-continued

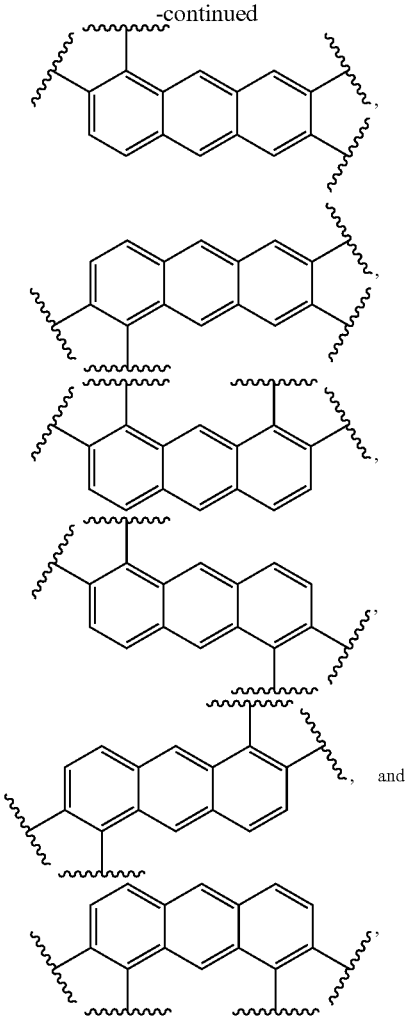

wherein n is an integer greater than 1;
wherein m is 0 or 1;
wherein A is selected from —Ar¹— and a structure represented by a formula:

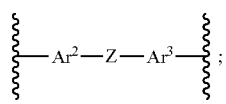

wherein Z, when present, is selected from O, NR³, CR$^{4a}$R$^{4b}$, CO, and SO$_2$;
wherein each of R³, R$^{4a}$, and R$^{4b}$, when present, is independently selected from hydrogen, C1-C4 alkyl, and C1-C4 haloalkyl;
wherein Ar¹, when present, is selected from aryl, 5-membered heteroaryl, and 6-membered heteroaryl and substituted with 0, 1, 2, or 3 groups independently selected from halogen, —OH, —CN, —NH$_2$, C1-C4 alkyl, C1-C4 haloalkyl, and C1-C4 alkoxy;
wherein each of Ar² and Ar³, when present, is independently selected from aryl, 5-membered heteroaryl, and 6-membered heteroaryl and substituted with 0, 1, 2, or 3 groups independently selected from halogen, —OH, —CN, —NH$_2$, C1-C4 alkyl, C1-C4 haloalkyl, and C1-C4 alkoxy;

wherein Q, when present, is selected from O, $NR^1$, SO, $SO_2$, C(O), and $CR^{2a}R^{2b}$; and
wherein each of $R^1$, $R^{2a}$, and $R^{2b}$, when present, is independently selected from hydrogen, C1-C4 alkyl, and C1-C4 haloalkyl.

* * * * *